US011983846B2

(12) United States Patent
Dangi et al.

(10) Patent No.: US 11,983,846 B2
(45) Date of Patent: May 14, 2024

(54) MACHINE LEARNING BASED IMAGE ADJUSTMENT

(71) Applicant: QUALCOMM Incorporated, San Diego, CA (US)

(72) Inventors: Shusil Dangi, San Diego, CA (US); Hau Hwang, San Diego, CA (US); Venkata Ravi Kiran Dayana, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 206 days.

(21) Appl. No.: 17/316,567

(22) Filed: May 10, 2021

(65) Prior Publication Data

US 2021/0360179 A1 Nov. 18, 2021

Related U.S. Application Data

(60) Provisional application No. 63/024,417, filed on May 13, 2020.

(51) Int. Cl.
*G06T 5/00* (2006.01)
*G06N 3/045* (2023.01)
(Continued)

(52) U.S. Cl.
CPC ............. *G06T 5/00* (2013.01); *G06N 3/045* (2023.01); *G06N 3/084* (2013.01); *G06T 5/70* (2024.01);
(Continued)

(58) Field of Classification Search
CPC ......... G06T 5/001; G06T 5/002; G06T 5/003; G06T 2207/10024; G06T 2207/20081;
(Continued)

(56) References Cited

U.S. PATENT DOCUMENTS 8,649,555 B1 * 2/2014 Bregler .............. G06V 40/165
382/103
2006/0239509 A1 * 10/2006 Saito .................. G06V 10/753
701/1
(Continued)

OTHER PUBLICATIONS

Ebrahimpour-Komleh, Hossein, Vinod Chandran, and Sridha Sridharan. "Face recognition using fractal codes." Proceedings 2001 International Conference on Image Processing (Cat. No. 01CH37205). vol. 3. IEEE, 2001. (Year: 2001).*

(Continued)

*Primary Examiner* — Andrae S Allison
(74) *Attorney, Agent, or Firm* — QUALCOMM Incorporated

(57) ABSTRACT

An imaging system can obtain image data, for instance from an image sensor. The imaging system can supply the image data as input data to a machine learning system, which can generate one or more maps based on the image data. Each map can identify strengths at which a certain image processing function is to be applied to each pixel of the image data. Different maps can be generated for different image processing functions, such as noise reduction, sharpening, or color saturation. The imaging system can generate a modified image based on the image data and the one or more maps, for instance by applying each of one or more image processing functions in accordance with each of the one or more maps. The imaging system can supply the image data and the one or more maps to a second machine learning system to generate the modified image.

30 Claims, 52 Drawing Sheets

(51) Int. Cl.

| | |
|---|---|
| *G06N 3/084* | (2023.01) |
| *G06T 5/70* | (2024.01) |
| *G06T 5/73* | (2024.01) |
| *H04N 9/64* | (2023.01) |
| *H04N 9/68* | (2023.01) |
| *H04N 25/60* | (2023.01) |

(52) U.S. Cl.
CPC ............... *G06T 5/73* (2024.01); *H04N 9/643* (2013.01); *H04N 9/646* (2013.01); *H04N 9/68* (2013.01); *H04N 25/60* (2023.01); *G06T 2207/10024* (2013.01); *G06T 2207/20081* (2013.01); *G06T 2207/20084* (2013.01); *G06T 2207/20182* (2013.01)

(58) Field of Classification Search
CPC . G06T 2207/20084; G06T 2207/20182; G06T 2207/10004; G06T 1/20; G06T 5/007; G06N 3/045; G06N 3/084; H04N 9/643; H04N 9/646; H04N 9/68; H04N 25/60; H04N 9/64; H04N 23/88
See application file for complete search history.

(56) References Cited

U.S. PATENT DOCUMENTS

| | | | |
|---|---|---|---|
| 2015/0124084 A1* | 5/2015 | Ikenoue | G06F 3/0325 348/135 |
| 2019/0108618 A1 | 4/2019 | Hwang et al. | |
| 2020/0143230 A1 | 5/2020 | Su et al. | |
| 2020/0145651 A1* | 5/2020 | Abe | H04N 19/109 |
| 2020/0211229 A1* | 7/2020 | Hwang | G06T 3/4015 |
| 2022/0189029 A1* | 6/2022 | Mequanint | G06V 10/764 |
| 2022/0215588 A1* | 7/2022 | Hwang | G06N 3/084 |

OTHER PUBLICATIONS

Syu, Nai-Sheng, Yu-Sheng Chen, and Yung-Yu Chuang. "Learning deep convolutional networks for demosaicing." arXiv preprint arXiv:1802.03769 (2018). (Year: 2018).*

Moran, Sean, et al. "Deeplpf: Deep local parametric filters for image enhancement." Proceedings of the IEEE/CVF conference on computer vision and pattern recognition. 2020. (Year: 2020).*

Michaël Gharbi, Jiawen Chen, Jonathan T. Barron, Samuel W. Hasinoff, and Frédo Durand. 2017. Deep Bilateral Learning for Real-Time Image Enhancement. ACM Trans. Graph. 36, 4, Article 118 (Jul. 2017), 12 pages (Year: 2017).*

Y.-K. Wang and C.-T. Fan, "Single Image Defogging by Multiscale Depth Fusion," in IEEE Transactions on Image Processing, vol. 23, No. 11, pp. 4826-4837, Nov. 2014, doi: 10.1109/TIP.2014.2358076. (Year: 2014).*

Ge, Tian, et al. "Analysis of multiple sclerosis lesions via spatially varying coefficients." The annals of applied statistics 8.2 (2014): 1095. (Year: 2014).*

Huikai W., et al., "Fast End-to-End Trainable Guided Filter", 2018 IEEE/CVF Conference on Computer Vision and Pattern Recognition, IEEE, Jun. 18, 2018 (Jun. 18, 2018), pp. 1838-1847, XP033476148, DOI: 10.1109/CVPR.2018.00197 [Retrieved on Dec. 14, 2018] Abstract, Figures 1,3,6 p. 1838-p. 1841.

International Search Report and Written Opinion—PCT/US2021/032316—ISA/EPO—dated Aug. 25, 2021.

Jiang H., et al., "Learning the Image Processing Pipeline", arxiv.org, Cornell University Library, 201 Olin Library Cornell University Ithaca, NY 14853, May 30, 2016, XP080704560, 10 pages.

Moran S., et al., "DeepLPF: Deep Local Parametric Filters for Image Enhancement", arxiv.org, Cornell University Library, 201 Olin Library Cornell University Ithaca, NY, 14853, Mar. 31, 2020 (Mar. 31, 2020), XP081635406, 10 Pages, Abstract, Figures 1-5 pp. 3-5.

* cited by examiner

| V7 | V15 | V23 | V31 | V39 | V47 | V55 | V63 |
|---|---|---|---|---|---|---|---|
| V6 | V14 | V22 | V30 | V38 | V46 | V54 | V62 |
| V5 | V13 | V21 | V29 | V37 | R45 | R53 | V61 |
| V4 | V12 | V20 | V28 | V36 | V44 | V52 | V60 |
| V3 | V11 | V19 | V27 | V35 | V43 | V51 | V59 |
| V2 | V10 | V18 | V26 | V34 | V42 | V50 | V58 |
| V1 | V9 | V17 | V25 | V33 | V41 | V49 | V57 |
| V0 | V8 | V16 | V24 | V32 | V40 | V48 | V56 |

| P7 | P15 | P23 | P31 | P39 | P47 | P55 | P63 |
|---|---|---|---|---|---|---|---|
| P6 | P14 | P22 | P30 | P38 | P46 | P54 | P62 |
| P5 | P13 | P21 | P29 | P37 | P45 | P53 | P61 |
| P4 | P12 | P20 | P28 | P36 | P44 | P52 | P60 |
| P3 | P11 | P19 | P27 | P35 | P43 | P51 | P59 |
| P2 | P10 | P18 | P26 | P34 | P42 | P50 | P58 |
| P1 | P9 | P17 | P25 | P33 | P41 | P49 | P57 |
| P0 | P8 | P16 | P24 | P32 | P40 | P48 | P56 |

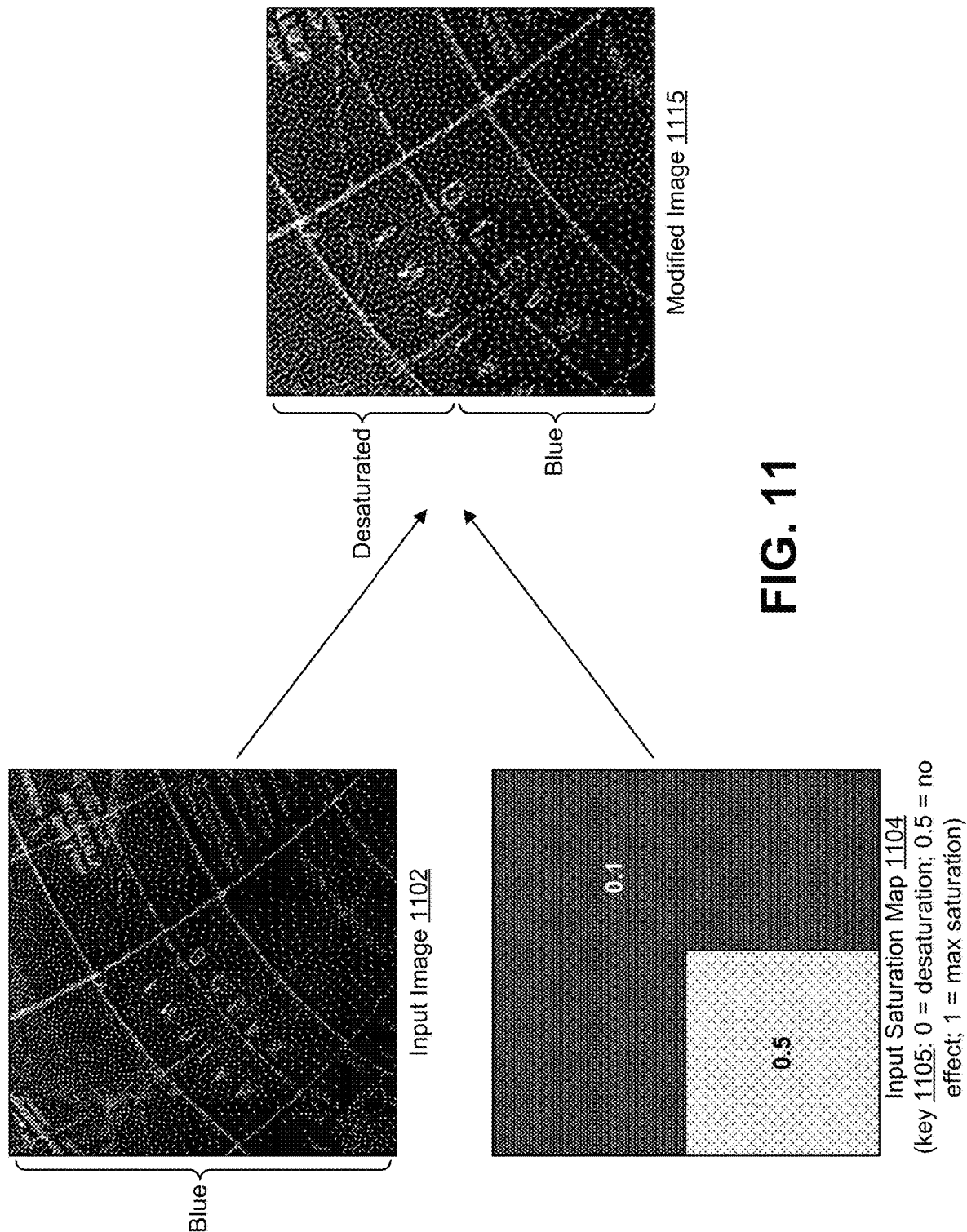

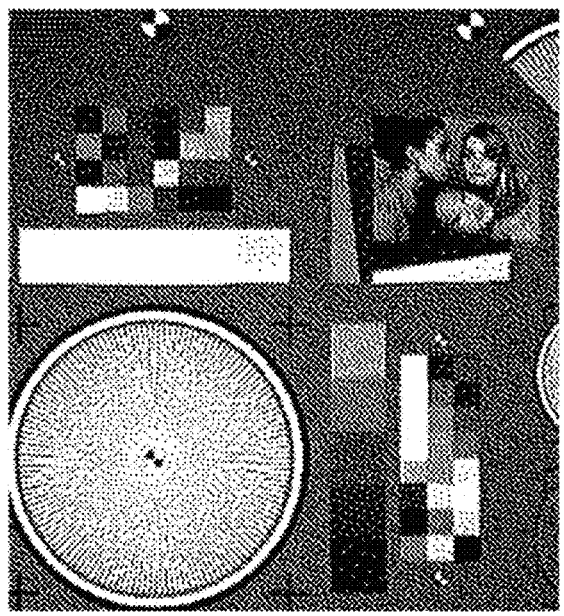 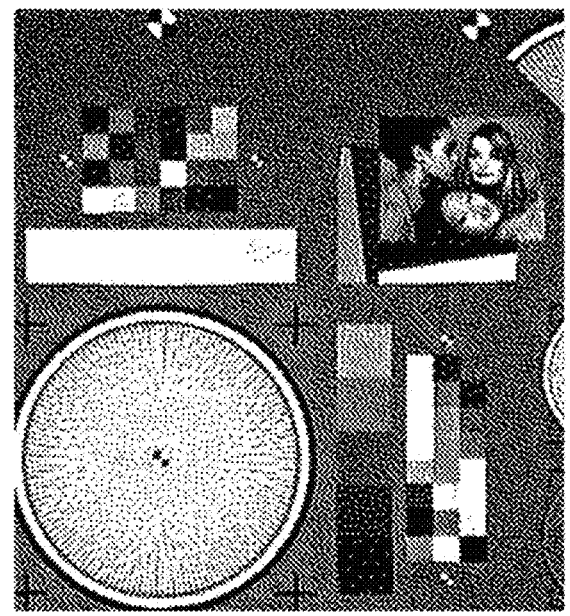
Tone: 0.0　　　　　　　　　　　　　Tone: 0.5
FIG. 25A　　　　　　　　　　FIG. 25B

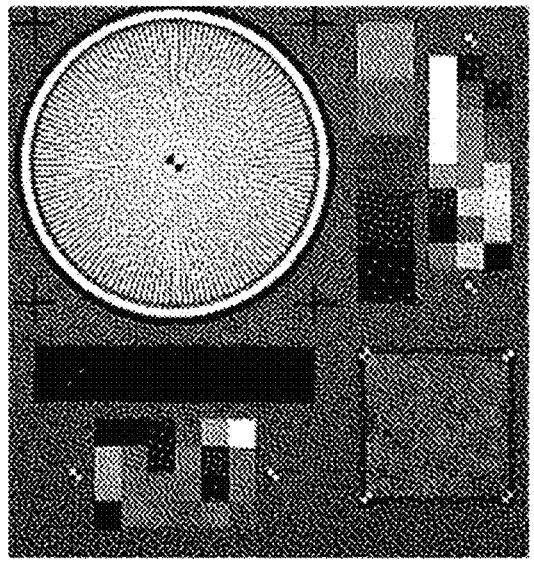 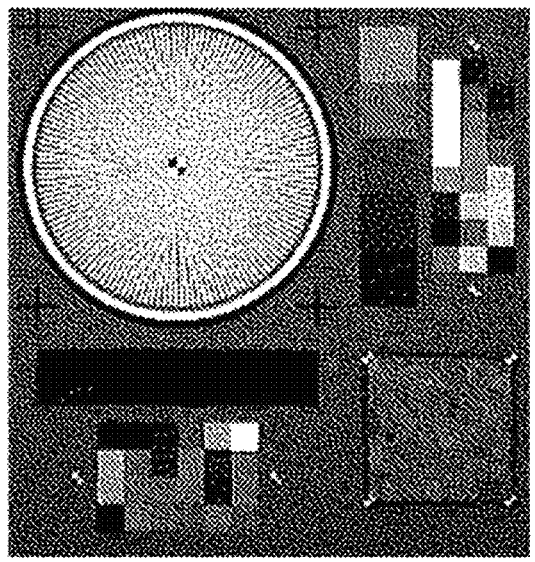
Detail: 0.0         Detail: 0.5
FIG. 26A         FIG. 26B

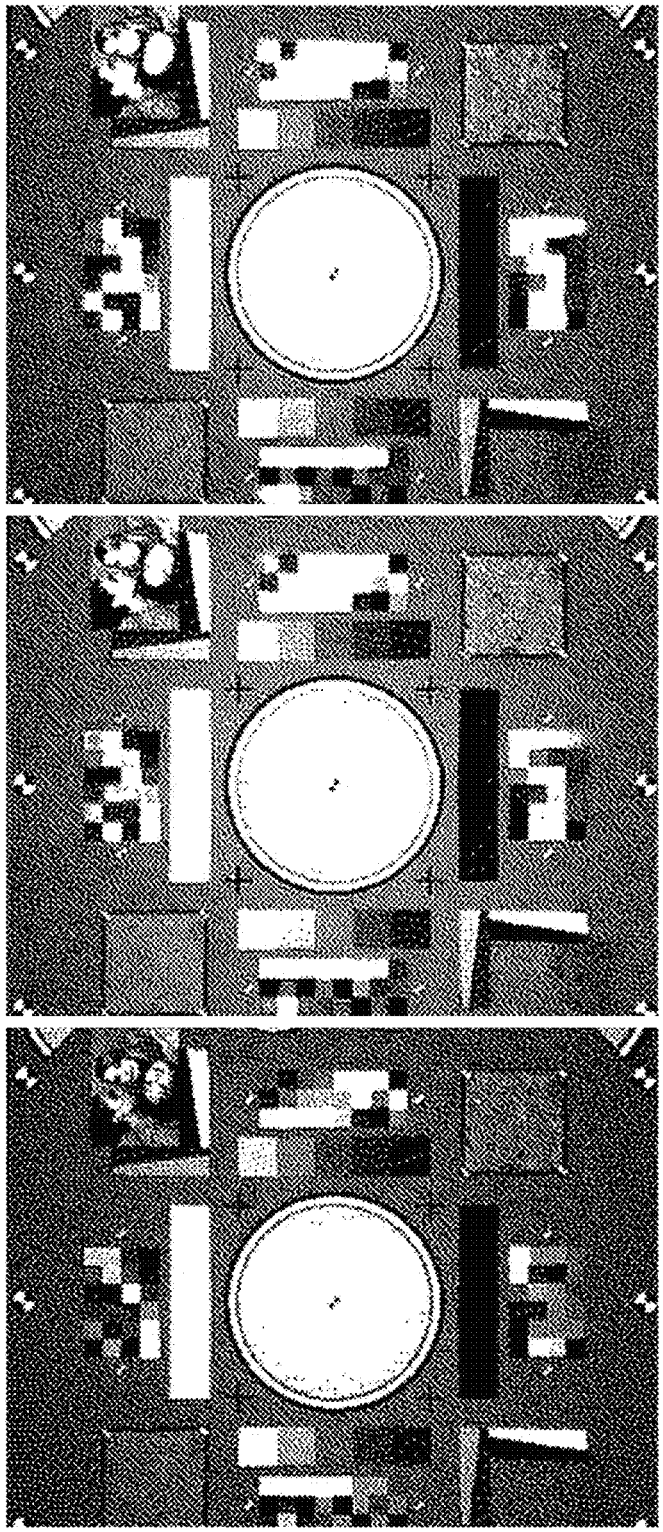
FIG. 27A  Saturation: 0.0
FIG. 27B  Saturation: 1.0
FIG. 27C  Saturation: 2.0

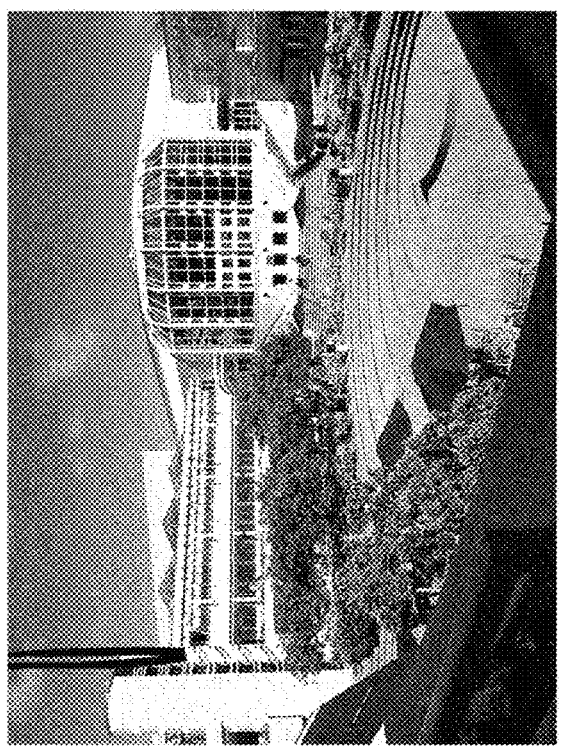
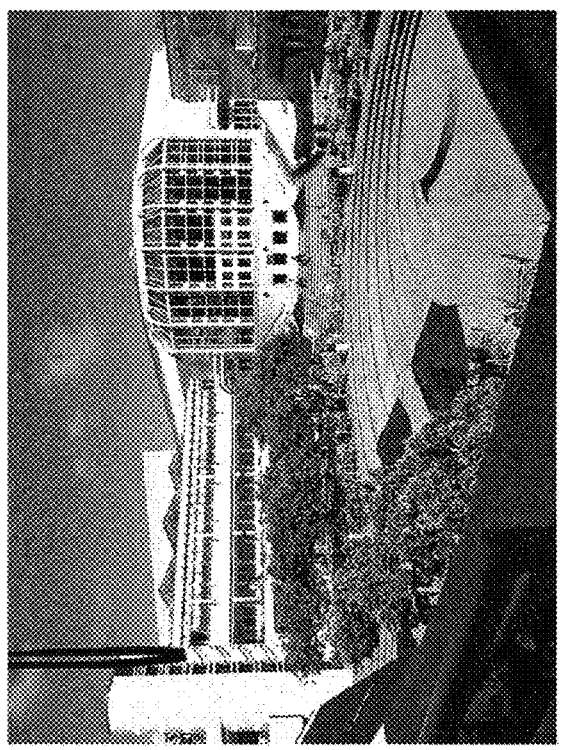
FIG. 39

MACHINE LEARNING BASED IMAGE ADJUSTMENT

CROSS-REFERENCE TO RELATED APPLICATIONS

This application claims the benefit of U.S. Provisional Application No. 63/024,417, filed May 13, 2020 and titled "Machine Learning Based Image Adjustment," which is hereby incorporated by reference in its entirety and for all purposes.

FIELD

The present disclosure generally relates to image processing, and more specifically to systems and techniques for performing machine learning based image adjustment.

BACKGROUND

A camera is a device that receives light and captures image frames, such as still images or video frames, using an image sensor. Cameras may include processors, such as image signal processors (ISPs), that can receive one or more image frames and process the one or more image frames. For example, a raw image frame captured by a camera sensor can be processed by an ISP to generate a final image. Cameras can be configured with a variety of image capture and image processing settings to alter the appearance of an image. Some camera settings are determined and applied before or during capture of the photograph, such as ISO, exposure time, aperture size, f/stop, shutter speed, focus, and gain. Other camera settings can configure post-processing of a photograph, such as alterations to contrast, brightness, saturation, sharpness, levels, curves, or colors.

Traditional image signal processors (ISPs) have separate discrete blocks that address the various partitions of the image-based problem space. For example, a typical ISP has discrete functional blocks that each apply a specific operation to raw camera sensor data to create a final output image. Such functional blocks can include blocks for demosaicing, noise reduction (denoising), color processing, tone mapping, among many other image processing functions. Each of these functional blocks contains many hand-tuned parameters, resulting in an ISP with a large number of hand-tuned parameters (e.g., over 10,000) that must be re-tuned according to the tuning preference of each customer. Such hand-tuning of parameters is very time-consuming and expensive, and thus is generally performed once. Once tuned, a traditional ISP generally uses the same parameters for every image.

BRIEF SUMMARY

In some examples, systems and techniques are described for performing machine learning based image adjustment using one or more machine learning systems. An imaging system can obtain image data, for instance from an image sensor. The imaging system can supply the image data as input data to a machine learning system, which can generate one or more maps based on the image data. Each map can identify strengths at which a certain image processing function is to be applied to each pixel of the image data. Different maps can be generated for different image processing functions, such as noise reduction, sharpening, or color saturation. The imaging system can generate a modified image based on the image data and the one or more maps, for instance by applying each of one or more image processing functions in accordance with each of the one or more maps. The imaging system can supply the image data and the one or more maps to a second machine learning system to generate the modified image.

In one example, an apparatus for image processing is provided. The apparatus includes a memory and one or more processors (e.g., implemented in circuitry) coupled to the memory. The one or more processors are configured to and can: obtain image data; generate, using the image data as input to one or more trained neural networks, one or more maps, wherein each map of the one or more maps is associated with a respective image processing function; and generate an image based on the image data and the one or more maps, the image including a characteristic based on the respective image processing function associated with each map of the one or more maps.

In another example, a method of image processing is provided. The method includes obtaining image data; generating, using the image data as input to one or more trained neural networks, one or more maps, wherein each map of the one or more maps is associated with a respective image processing function; and generating an image based on the image data and the one or more maps, the image including a characteristic based on the respective image processing function associated with each map of the one or more maps.

In another example, a non-transitory computer-readable medium is provided that has stored thereon instructions that, when executed by one or more processors, cause the one or more processors to: obtain image data; generate, using the image data as input to one or more trained neural networks, one or more maps, wherein each map of the one or more maps is associated with a respective image processing function; and generate an image based on the image data and the one or more maps, the image including a characteristic based on the respective image processing function associated with each map of the one or more maps.

In another example, an apparatus for image processing is provided. The apparatus includes means for obtaining image data; means for generating, using the image data as input to one or more trained neural networks, one or more maps, wherein each map of the one or more maps is associated with a respective image processing function; and means for generating an image based on the image data and the one or more maps, the image including a characteristic based on the respective image processing function associated with each map of the one or more maps.

In some aspects, a map of the one or more maps includes a plurality of values and is associated with an image processing function, each value of the plurality of values of the map indicating a strength with which to apply the image processing function to a corresponding region of the image data. In some aspects, the corresponding region of the image data corresponds to a pixel of the image.

In some aspects, the one or more maps include a plurality of maps, a first map of the plurality of maps being associated with a first image processing function, and a second map of the plurality of maps being associated with a second image processing function. In some aspects, one or more image processing functions associated with at least one of the plurality of maps include at least one of a noise reduction function, a sharpness adjustment function, a detail adjustment function, a tone adjustment function, a saturation adjustment function, and a hue adjustment function. In some aspects, the first map includes a first plurality of values, each value of the first plurality of values of the first map indicating a strength at which to apply the first image processing function to a corresponding region of the image data, and wherein the second map includes a second plurality of values, each value of the second plurality of values of the second map indicating a strength at which to apply the second image processing function to a corresponding region of the image data.

In some aspects, the image data includes luminance channel data corresponding to an image, wherein using the image data as input to the one or more trained neural networks includes using the luminance channel data corresponding to the image as input to the one or more trained neural networks. In some aspects, generating the image based on the image data includes generating the image based on the luminance channel data as well as chroma data corresponding to the image.

In some aspects, the one or more trained neural networks output one or more affine coefficients based on use of the image data as input to the one or more trained neural networks, wherein generating the one or more maps includes generating a first map at least by transforming the image data using the one or more affine coefficients. In some aspects, the image data includes luminance channel data corresponding to an image, wherein transforming the image data using the one or more affine coefficients includes transforming the luminance channel data using the one or more affine coefficients. In some aspects, the one or more affine coefficients include a multiplier, wherein transforming the image data using the one or more affine coefficients includes multiplying a luminance value of at least a subset of the image data by the multiplier. In some aspects, the one or more affine coefficients include an offset, wherein transforming the image data using the one or more affine coefficients includes offsetting a luminance value of at least a subset of the image data by the offset. In some aspects, the one or more trained neural networks output the one or more affine coefficients based also on a local linearity constraint that aligns one or more gradients in the first map with one or more gradients in the image data.

In some aspects, generating the image based on the image data and the one or more maps includes using the image data and the one or more maps as inputs to a second set of one or more trained neural networks distinct from the one or more trained neural networks. In some aspects generating the image based on the image data and the one or more maps includes demosaicking the image data using the second set of one or more trained neural networks.

In some aspects, each map of the one or more maps is spatially varied based on different types of objects depicted in the image data. In some aspects, the image data includes an input image having a plurality of color components for each pixel of a plurality of pixels of the image data. In some aspects, the image data includes raw image data from one or more image sensors, the raw image data including at least one color component for each pixel of a plurality of pixels of the image data.

In some aspects, the methods, apparatuses, and computer-readable medium described above further comprise: an image sensor that captures the image data, wherein obtaining the image data includes obtaining the image data from the image sensor. In some aspects, the methods, apparatuses, and computer-readable medium described above further comprise: a display screen, wherein the one or more processors are configured to display the image on the display screen. In some aspects, the methods, apparatuses, and computer-readable medium described above further comprise: a communication transceiver, wherein the one or more processors are configured to transmit the image to a recipient device using the communication transceiver.

In some aspects, the apparatus comprises a camera, a mobile device (e.g., a mobile telephone or so-called "smart phone" or other mobile device), a wearable device, an extended reality device (e.g., a virtual reality (VR) device, an augmented reality (AR) device, or a mixed reality (MR) device), a personal computer, a laptop computer, a server computer, or other device. In some aspects, the apparatus includes a camera or multiple cameras for capturing one or more images. In some aspects, the apparatus further includes a display for displaying one or more images, notifications, and/or other displayable data.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following drawing figures:

FIG. 3A is a conceptual diagram illustrating an example of an input image that includes a plurality of pixels labeled P0 through P63, in accordance with some examples;

FIG. 3B is a conceptual diagram illustrating an example of a spatial tuning map, in accordance with some examples;

FIG. 11 is a conceptual diagram illustrating an example of an input saturation map applied to saturation adjustment strength and direction in an input image to generate a modified image, in accordance with some examples;

FIG. 25A is a conceptual diagram illustrating an example of a first tone adjustment strength applied to an example input image to generate a modified image, in accordance with some examples;

FIG. 25B is a conceptual diagram illustrating an example of a second tone adjustment strength applied to the example input image of FIG. 25A to generate a modified image, in accordance with some examples;

FIG. 26A is a conceptual diagram illustrating an example of a first detail adjustment strength applied to the example input image of FIG. 25A to generate a modified image, in accordance with some examples;

FIG. 26B is a conceptual diagram illustrating an example of a second detail adjustment strength applied to the example input image of FIG. 25A to generate a modified image, in accordance with some examples;

FIG. 27A is a conceptual diagram illustrating an example of a first color saturation adjustment strength applied to the example input image of FIG. 25A to generate a modified image, in accordance with some examples;

FIG. 27B is a conceptual diagram illustrating an example of a second color saturation adjustment strength applied to the example input image of FIG. 25A to generate a modified image, in accordance with some examples;

FIG. 27C is a conceptual diagram illustrating an example of a third color saturation adjustment strength applied to the example input image of FIG. 25A to generate a modified image, in accordance with some examples;

FIG. 39 is a conceptual diagram illustrating an automatically adjusted image generated by an image processing system using one or more tuning maps to adjust an input image, in accordance with some examples;

DETAILED DESCRIPTION

Figure 1:
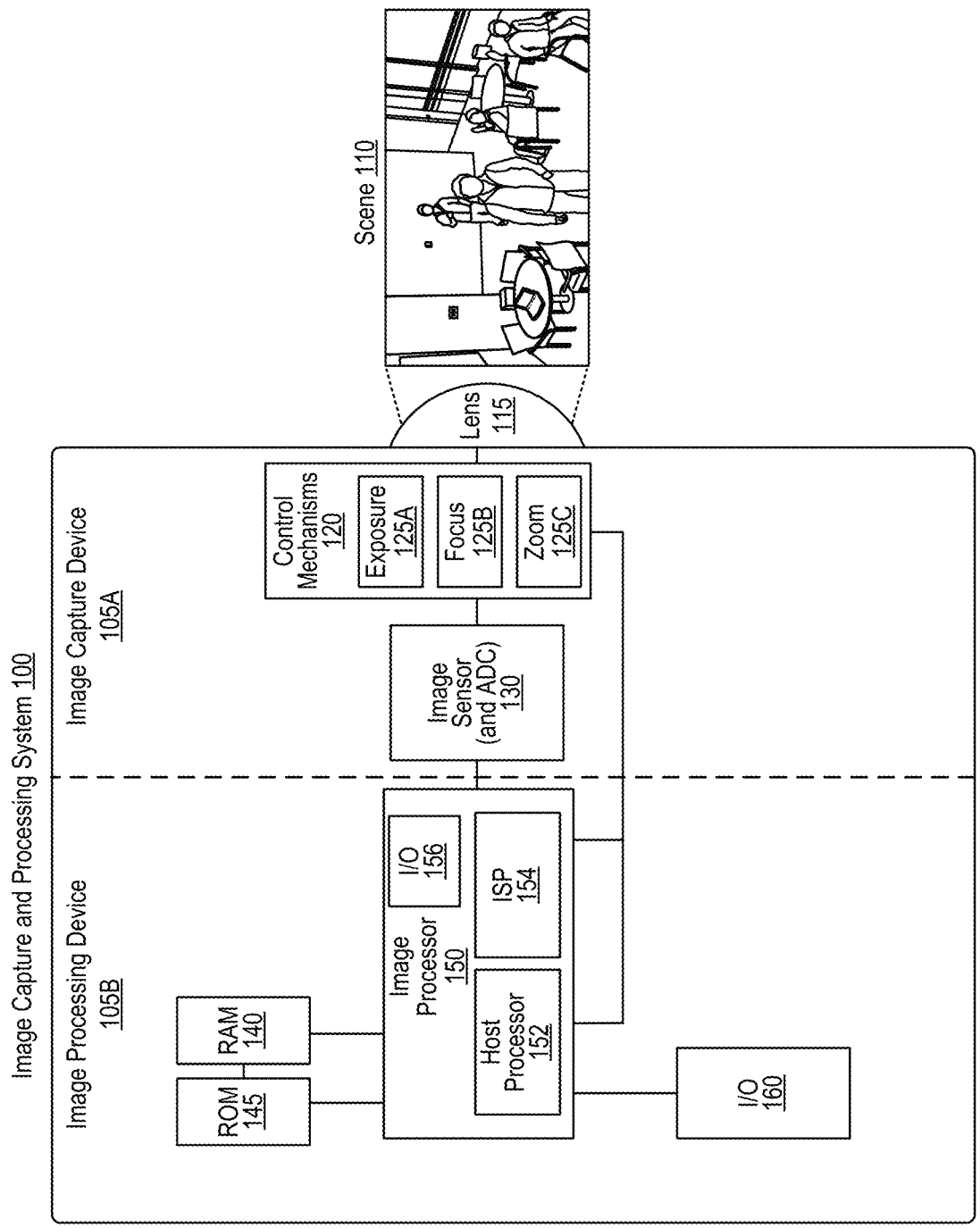
FIG. 1 is a block diagram illustrating an example architecture of an image capture and processing system, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

A camera is a device that receives light and captures image frames, such as still images or video frames, using an image sensor. The terms "image," "image frame," and "frame" are used interchangeably herein. Cameras can be configured with a variety of image capture and image processing settings. The different settings result in images with different appearances. Some camera settings are determined and applied before or during capture of one or more image frames, such as ISO, exposure time, aperture size, f/stop, shutter speed, focus, and gain. For example, settings or parameters can be applied to an image sensor for capturing the one or more image frames. Other camera settings can configure post-processing of one or more image frames, such as alterations to contrast, brightness, saturation, sharpness, levels, curves, or colors. For example, settings or parameters can be applied to a processor (e.g., an image signal processor or ISP) for processing the one or more image frames captured by the image sensor.

Cameras may include processors, such as ISPs, that can receive one or more image frames from an image sensor and process the one or more image frames. For instance, a raw image frame captured by a camera sensor can be processed by an ISP to generate a final image. In some examples, an ISP can process an image frame using a plurality of filters or processing blocks that are applied to the captured image frame, such as demosaicing, gain adjustment, white balance adjustment, color balancing or correction, gamma compression, tone mapping or adjustment, denoising or noise filtering, edge enhancement, contrast adjustment, intensity adjustment (such as darkening or lightening), among others. In some examples, an ISP can include a machine learning system (e.g., one or more trained neural networks, one or more trained machine learning models, one or more artificial intelligence algorithms, and/or one or more other machine learning components) that can process an image frame and output a processed image frame.

Systems, apparatuses, processes (also referred to as methods), and computer-readable media (collectively referred to herein as "systems and techniques") are described for performing machine learning based automatic image adjustment using one or more machine learning systems. An imaging system can obtain image data, for instance from an image sensor. The imaging system can supply the image data as input data to a machine learning system. The machine learning system can generate one or more maps based on the image data. Each map of the one or more maps can identify strengths at which a certain image processing function is to be applied to each pixel of the image data. Different maps can be generated for different image processing functions, such as noise reduction, noise addition, a sharpening, desharpening, a detail enhancement, detail reduction, tone adjustment, color desaturation, color saturation enhancement, hue adjustment, or combinations thereof. The one or more maps can be spatially varying, so that different pixels of the image correspond to different strengths for application of an image processing function in each map. The imaging system can generate a modified image based on the image data and the one or more maps, for instance by applying each of one or more image processing functions in accordance with each of the one or more maps. In some examples, the imaging system can supply the image data and the one or more maps to a second machine learning system to generate the modified image. The second machine learning system can be distinct from the machine learning system.

In some camera systems, a host processor (HP) (also referred to as an application processor (AP) in some cases) is used to dynamically configure an image sensor with new parameter settings. The HP can be used to dynamically configure parameter settings of an ISP pipelines to match the exact settings of an input image sensor frame so that the image data is processed correctly. In some examples, HP can be used to dynamically configure parameter settings based on the one or more maps. For instance, parameter settings may be determined based on the values in the maps.

Generating maps and using maps for image processing can provide various technical benefits to image processing systems. Spatially varying image processing maps can allow an imaging system to apply an image processing function at different strengths in different regions of an image. For example, a region of an image depicting the sky can be processed differently with respect to one or more image processing functions than another region of the same image depicting grass. Maps can be generated in parallel, increasing efficiency in image processing.

In some examples, the machine learning system can generate one or more affine coefficients, such as a multiplier and an offset, which the imaging system can use to modify a component of the image data (e.g., the luminance channel of the image data) to generate each map. A local linearity constraint can ensure that one or more gradients in a map align with one or more gradients in the image data, which can reduce halo effects in application of image processing functions. Use of affine coefficients and/or local linearity constraints for generating maps can produce higher quality spatially varying image modifications than systems that do not use affine coefficients and/or local linearity constraints for generating maps, for instance due to better alignment between the image data and the maps, and reduced halo effects at the boundaries of depicted objects.

FIG. 1 is a block diagram illustrating an architecture of an image capture and processing system 100. The image capture and processing system 100 includes various components that are used to capture and process images of scenes (e.g., an image of a scene 110). The image capture and processing system 100 can capture standalone images (or photographs) and/or can capture videos that include multiple images (or video frames) in a particular sequence. A lens 115 of the system 100 faces a scene 110 and receives light from the scene 110. The lens 115 bends the light toward the image sensor 130. The light received by the lens 115 passes through an aperture controlled by one or more control mechanisms 120 and is received by an image sensor 130.

The one or more control mechanisms 120 may control exposure, focus, and/or zoom based on information from the image sensor 130 and/or based on information from the image processor 150. The one or more control mechanisms 120 may include multiple mechanisms and components; for instance, the control mechanisms 120 may include one or more exposure control mechanisms 125A, one or more focus control mechanisms 125B, and/or one or more zoom control mechanisms 125C. The one or more control mechanisms 120 may also include additional control mechanisms besides those that are illustrated, such as control mechanisms controlling analog gain, flash, HDR, depth of field, and/or other image capture properties.

The focus control mechanism 125B of the control mechanisms 120 can obtain a focus setting. In some examples, focus control mechanism 125B store the focus setting in a memory register. Based on the focus setting, the focus control mechanism 125B can adjust the position of the lens 115 relative to the position of the image sensor 130. For example, based on the focus setting, the focus control mechanism 125B can move the lens 115 closer to the image sensor 130 or farther from the image sensor 130 by actuating a motor or servo, thereby adjusting focus. In some cases, additional lenses may be included in the system 100, such as one or more microlenses over each photodiode of the image sensor 130, which each bend the light received from the lens 115 toward the corresponding photodiode before the light reaches the photodiode. The focus setting may be determined via contrast detection autofocus (CDAF), phase detection autofocus (PDAF), or some combination thereof. The focus setting may be determined using the control mechanism 120, the image sensor 130, and/or the image processor 150. The focus setting may be referred to as an image capture setting and/or an image processing setting.

The exposure control mechanism 125A of the control mechanisms 120 can obtain an exposure setting. In some cases, the exposure control mechanism 125A stores the exposure setting in a memory register. Based on this exposure setting, the exposure control mechanism 125A can control a size of the aperture (e.g., aperture size or f/stop), a duration of time for which the aperture is open (e.g., exposure time or shutter speed), a sensitivity of the image sensor 130 (e.g., ISO speed or film speed), analog gain applied by the image sensor 130, or any combination thereof. The exposure setting may be referred to as an image capture setting and/or an image processing setting.

The zoom control mechanism 125C of the control mechanisms 120 can obtain a zoom setting. In some examples, the zoom control mechanism 125C stores the zoom setting in a memory register. Based on the zoom setting, the zoom control mechanism 125C can control a focal length of an assembly of lens elements (lens assembly) that includes the lens 115 and one or more additional lenses. For example, the zoom control mechanism 125C can control the focal length of the lens assembly by actuating one or more motors or servos to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 115 in some cases) that receives the light from the scene 110 first, with the light then passing through an afocal zoom system between the focusing lens (e.g., lens 115) and the image sensor 130 before the light reaches the image sensor 130. The afocal zoom system may, in some cases, include two positive (e.g., converging, convex) lenses of equal or similar focal length (e.g., within a threshold difference) with a negative (e.g., diverging, concave) lens between them. In some cases, the zoom control mechanism 125C moves one or more of the lenses in the afocal zoom system, such as the negative lens and one or both of the positive lenses.

The image sensor 130 includes one or more arrays of photodiodes or other photosensitive elements. Each photodiode measures an amount of light that eventually corresponds to a particular pixel in the image produced by the image sensor 130. In some cases, different photodiodes may be covered by different color filters, and may thus measure light matching the color of the filter covering the photodiode. For instance, Bayer color filters include red color filters, blue color filters, and green color filters, with each pixel of the image generated based on red light data from at least one photodiode covered in a red color filter, blue light data from at least one photodiode covered in a blue color filter, and green light data from at least one photodiode covered in a green color filter. Other types of color filters may use yellow, magenta, and/or cyan (also referred to as "emerald") color filters instead of or in addition to red, blue, and/or green color filters. Some image sensors may lack color filters altogether, and may instead use different photodiodes throughout the pixel array (in some cases vertically stacked). The different photodiodes throughout the pixel array can have different spectral sensitivity curves, therefore responding to different wavelengths of light. Monochrome image sensors may also lack color filters and therefore lack color depth.

In some cases, the image sensor 130 may alternately or additionally include opaque and/or reflective masks that block light from reaching certain photodiodes, or portions of certain photodiodes, at certain times and/or from certain angles, which may be used for phase detection autofocus (PDAF). The image sensor 130 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 120 may be included instead or additionally in the image sensor 130. The image sensor 130 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

The image processor 150 may include one or more processors, such as one or more image signal processors (ISPs) (including ISP 154), one or more host processors (including host processor 152), and/or one or more of any other type of processor 5010 discussed with respect to the computing device 5000. The host processor 152 can be a digital signal processor (DSP) and/or other type of processor. In some implementations, the image processor 150 is a single integrated circuit or chip (e.g., referred to as a system-on-chip or SoC) that includes the host processor 152 and the ISP 154. In some cases, the chip can also include one or more input/output ports (e.g., input/output (I/O) ports 156), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 156 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 152 can communicate with the image sensor 130 using an I2C port, and the ISP 154 can communicate with the image sensor 130 using an MIPI port.

The image processor 150 may perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The image processor 150 may store image frames and/or processed images in random access memory (RAM) 140/5020, read-only memory (ROM) 145/5025, a cache, a memory unit, another storage device, or some combination thereof.

Various input/output (I/O) devices 160 may be connected to the image processor 150. The I/O devices 160 can include a display screen, a keyboard, a keypad, a touchscreen, a trackpad, a touch-sensitive surface, a printer, any other output devices 5035, any other input devices 5045, or some combination thereof. In some cases, a caption may be input into the image processing device 105B through a physical keyboard or keypad of the I/O devices 160, or through a virtual keyboard or keypad of a touchscreen of the I/O devices 160. The I/O 160 may include one or more ports, jacks, or other connectors that enable a wired connection between the system 100 and one or more peripheral devices, over which the system 100 may receive data from the one or more peripheral device and/or transmit data to the one or more peripheral devices. The I/O 160 may include one or more wireless transceivers that enable a wireless connection between the system 100 and one or more peripheral devices, over which the system 100 may receive data from the one or more peripheral device and/or transmit data to the one or more peripheral devices. The peripheral devices may include any of the previously-discussed types of I/O devices 160 and may themselves be considered I/O devices 160 once they are coupled to the ports, jacks, wireless transceivers, or other wired and/or wireless connectors.

In some cases, the image capture and processing system 100 may be a single device. In some cases, the image capture and processing system 100 may be two or more separate devices, including an image capture device 105A (e.g., a camera) and an image processing device 105B (e.g., a computing device coupled to the camera). In some implementations, the image capture device 105A and the image processing device 105B may be coupled together, for example via one or more wires, cables, or other electrical connectors, and/or wirelessly via one or more wireless transceivers. In some implementations, the image capture device 105A and the image processing device 105B may be disconnected from one another.

As shown in FIG. 1, a vertical dashed line divides the image capture and processing system 100 of FIG. 1 into two portions that represent the image capture device 105A and the image processing device 105B, respectively. The image capture device 105A includes the lens 115, control mechanisms 120, and the image sensor 130. The image processing device 105B includes the image processor 150 (including the ISP 154 and the host processor 152), the RAM 140, the ROM 145, and the I/O 160. In some cases, certain components illustrated in the image capture device 105A, such as the ISP 154 and/or the host processor 152, may be included in the image capture device 105A.

The image capture and processing system 100 can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the image capture and processing system 100 can include one or more wireless transceivers for wireless communications, such as cellular network communications, 802.11 wi-fi communications, wireless local area network (WLAN) communications, or some combination thereof. In some implementations, the image capture device 105A and the image processing device 105B can be different devices. For instance, the image capture device 105A can include a camera device and the image processing device 105B can include a computing device, such as a mobile handset, a desktop computer, or other computing device.

While the image capture and processing system 100 is shown to include certain components, one of ordinary skill will appreciate that the image capture and processing system 100 can include more components than those shown in FIG. 1. The components of the image capture and processing system 100 can include software, hardware, or one or more combinations of software and hardware. For example, in some implementations, the components of the image capture and processing system 100 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture and processing system 100.

Traditional camera systems (e.g., image sensors and ISPs) are tuned with parameters and process images according to the tuned parameters. ISPs are typically tuned during production using fixed tuning methods. Camera systems (e.g., image sensors and ISP) also typically perform global image adjustment based on pre-defined conditions, such as light level, color temperature, exposure time, among others. Typical camera systems are also tuned using heuristics-based tuning with coarse precision (e.g., window based local tone mapping). As a result, traditional camera systems are not able to enhance images based on the content contained in the images.

Systems, apparatuses, processes, and computer-readable media are described herein for performing machine learning based image adjustment. The machine learning based image adjustment techniques can be applied to processed images (e.g., output by an ISP and/or image post-processing system) and/or can be applied to raw image data from an image sensor. The machine learning based image adjustment techniques can provide dynamic tuning (rather than the fixed tuning of traditional camera systems) for each image based on the scene content contained in the image. The machine learning based image adjustment techniques can also provide the ability to incorporate additional semantic context based tuning (e.g. segmentation information), as opposed to providing only heuristics-based tuning.

In some examples, one or more tuning maps can also be used for performing the machine learning based image adjustment techniques. In some examples, a tuning map can have a same resolution as an input image, with each value within the tuning map corresponding to a pixel in the input image. In some examples, a tuning map can be based on a downsampled variant of the input image and can thus have a lower resolution than the input image, with each value within the tuning map corresponding to more than one pixel in the input image (e.g., four or more adjacent pixels in a square or rectangular formation if the a downsampled variant of the input image has half the length and half the width of the input image). A tuning map can also be referred to as a spatial tuning map or spatially varying tuning map, referring to the ability of the values of the tuning map to spatially vary for each location in the tuning map. In some examples, each value within the tuning map can correspond a predetermined subset of the input image. In some examples, each value within the tuning map can correspond the entire input image, in which case the tuning map may be referred to as a spatially fixed tuning map.

The tuning maps provide the ability for an image processing machine learning system to provide a pixel-level adjustment of each image, allowing high precision adjustment of images rather than only global image adjustment. In some examples, the tuning maps can be automatically generated by the image processor 150, the host processor 152, the ISP 154, or a combination thereof. In some examples, the tuning maps can be automatically generated using a machine learning system. In some examples, the tuning maps can be with per-pixel precision using the machine learning system. For example, a first machine learning system can be used to generate the pixel-level tuning maps, and a second machine learning system can process input images and one or more tuning maps to generate a modified image (also referred to as an adjusted image or processed image). In some examples, the first machine learning system can be at least partially run by, and/or can interface with, the image processor 150, the host processor 152, the ISP 154, or a combination thereof. In some examples, the second machine learning system can be at least partially run by, and/or can interface with, the image processor 150, the host processor 152, the ISP 154, or a combination thereof.

Figure 2:
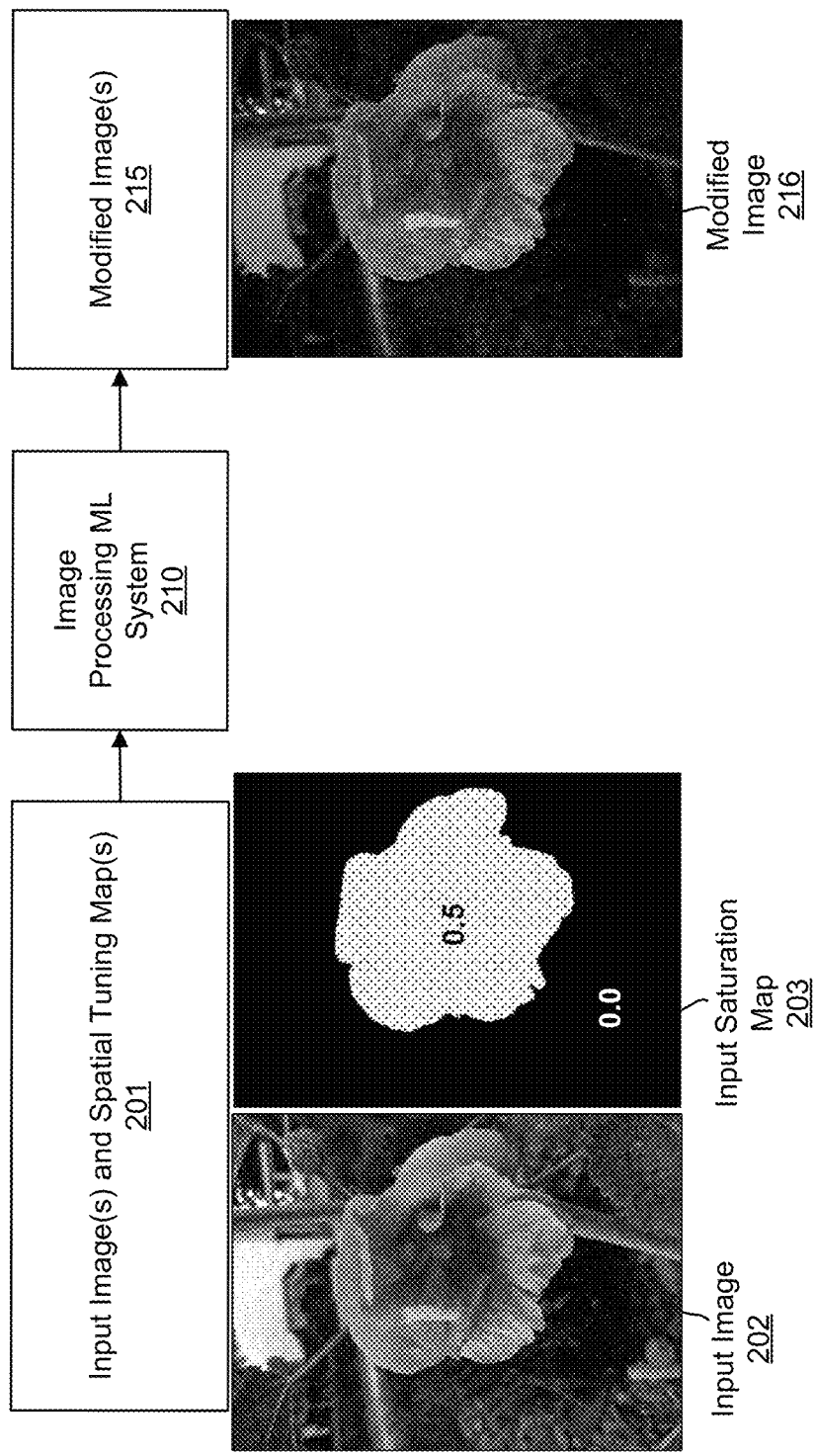
FIG. 2 is a block diagram illustrating an example of a system including an image processing machine learning (ML) system, in accordance with some examples.

FIG. 2 is a block diagram illustrating an example of a system including an image processing machine learning (ML) system 210. The image processing ML system 210 obtains as input one or more input images and one or more spatial tuning maps 201. An example input image 202 is shown in FIG. 2. The image processing ML system 210 can process any type of image data. For instance, in some examples, an input image provided to the image processing ML system 210 can include an image that has been captured by the image sensor 130 of the image capture device 105A of FIG. 1 and/or processed by an ISP (e.g., the ISP 154 of FIG. 1) and/or any post-processing components of a camera system. The image processing ML system 210 can be implemented using one or more convolutional neural networks (CNNs), one or more CNNs, one or more trained neural networks (NNs), one or more NNs, one or more trained support vector machines (SVMs), one or more SVMs, one or more trained random forests, one or more random forests, one or more trained decision trees, one or more decision trees, one or more trained gradient boosting algorithms, one or more gradient boosting algorithms, one or more trained regression algorithms, one or more regression algorithms, or a combination thereof. The image processing ML system 210, and/or any of the machine learning elements listed above, can be trained using supervised learning (that may be parts of the image processing ML system 210), unsupervised learning, reinforcement learning, deep learning, or a combination thereof.

In some examples, the input image 202 can include a plurality of chrome components and/or color components (e.g., a red (R) color component or sample, a green (G) color component or sample, and a blue (B) color component or sample) for each pixel of the image data. In some cases, a device can include multiple cameras, and the image processing ML system 210 can process images obtained by one or more of the multiple cameras. In one illustrative example, a dual-camera mobile phone, tablet, or other device can be used to capture larger images with wider angles (e.g., with a wider field-of-view (FOV)), capture more amount of light (resulting in more sharpness, clarity, among other benefits), to generate 360-degree (e.g., virtual reality) video, and/or to perform other enhanced functionality than that achieved by a single-camera device.

In some examples, the image processing ML system 210 can process raw image data provided by one or more image sensors. For instance, an input image provided to the image processing ML system 210 can include raw image data generated by an image sensor (e.g., the image sensor 130 of FIG. 1). In some cases, the image sensor can include an array of photodiodes that can capture a frame of raw image data. Each photodiode can represent a pixel location and can generate a pixel value for that pixel location. Raw image data from photodiodes may include a single color or grayscale value for each pixel location in the frame. For example, a color filter array can be integrated with the image sensor or can be used in conjunction with the image sensor (e.g., laid over the photodiodes) to convert the monochromatic information to color values. One illustrative example of a color filter array includes a Bayer pattern color filter array (or Bayer color filter array), allowing the image sensor to capture a frame of pixels having a Bayer pattern with one of either red, green, or blue filters at each pixel location. In some cases, a device can include multiple image sensors, in which case the image processing ML system 210 can process raw image data obtained by the multiple image sensors. For example, a device with multiple cameras can capture image data using the multiple cameras, and the image processing ML system 210 can process the raw image data from the multiple cameras.

Various types of spatial tuning maps can be provided as input to the image processing ML system 210. Each type of spatial tuning map can be associated with a respective image processing function. The spatial tuning maps can include, for example, a noise tuning map, a sharpness tuning map, a tone tuning map, a saturation tuning map, a hue tuning map, any combination thereof, and/or other tuning maps for other image processing functions. For example, a noise tuning map can include values corresponding to a strength at which noise augmentation (e.g., noise reduction, noise addition) is to be applied to different parts of an input image (e.g., different pixels) mapped to the positions (e.g., coordinates) of the different parts of the input image. A sharpness tuning map can include values corresponding to a strength at which sharpness augmentation (e.g., sharpening) is to be applied to different parts of an input image (e.g., different pixels) mapped to the positions (e.g., coordinates) of the different parts of the input image. A tone tuning map can include values corresponding to a strength at which tone augmentation (e.g., tone mapping) is to be applied to different parts of an input image (e.g., different pixels) mapped to the positions (e.g., coordinates) of the different parts of the input image. A saturation tuning map can include values corresponding to a strength at which saturation augmentation (e.g., increasing saturation or decreasing saturation) is to be applied to different parts of an input image (e.g., different pixels) mapped to the positions (e.g., coordinates) of the different parts of the input image. A hue tuning map can include values corresponding to a strength at which hue augmentation (e.g., hue shifting) is to be applied to different parts of an input image (e.g., different pixels) mapped to the positions (e.g., coordinates) of the different parts of the input image.

In some examples, the values in the tuning maps can range from a value of 0 to a value of 1. The range can be inclusive and therefore include 0 and/or 1 as possible values. The range can be exclusive and therefore not include 0 and/or 1 as possible values. For example, each location in a tuning map can include any value between 0 and 1. In some examples, one or more of the tuning maps can include values other than values between 0 and 1. The various tuning maps are described in more detail below. An input saturation map 203 is shown in FIG. 2 as an example of a spatial tuning map.

While all of the figures herein are illustrated in black-and-white, the input image 202 represents a colorful image depicting a pink and red flower in the foreground, with green leaves as part of the background and a white wall as another part of the background. The input saturation map 203 includes a value of 0.5 corresponding to an area of pixels in the input image 202 depicting the pink and red flower in the foreground. This area with a value of 0.5 is illustrated in grey in the input saturation map 203. A value of 0.5 in the input saturation map 203 indicates that saturation in that area is to remain the same, with no increase or decrease. The input saturation map 203 includes a value of 0.0 corresponding to the area of pixels in the input image 202 depicting the background (both the green leaves and the white wall). This area with a value of 0.0 is illustrated in black in the input saturation map 203. A value of 0.0 in the input saturation map 203 indicates that saturation in that area is to be completely desaturated. The modified image 216 represents an image in which the flower in the foreground is still saturated (is still pink and red) to the same extent as in the input image 202, but the background (both the green leaves and the white wall) are completely desaturated and therefore depicted in greyscale.

Each tuning map (such as the input saturation map 203) can have a same size and/or a same resolution as the sizes and/or resolutions of one or more input images (such as the input image 202) that are provided as input to the image processing ML system 210 to be processed to generate modified images (such as the modified image 216). Each tuning map (such as the input saturation map 203) can have a same size and/or a same resolution as the sizes and/or resolutions of the modified images (such as the modified image 216) generated based on the tuning map. In some examples, a tuning map (such as the input saturation map 203) may be smaller or larger than an input image (such as the input image 202), in which case either the tuning map or the input image (or both) can be downscaled or upscaled and/or upsampled before the modified image 216 is generated.

In some examples, a tuning map 303 may be stored as an image, such as a greyscale image. In a tuning map 303, the shade of grey at a pixel of the tuning map 303 may indicate the value for that pixel. In an illustrative example, black may encode a value of 0.0, a medium grey or middle grey can encode a value of 0.5, and white may encode a value of 1.0. Other shades of grey may encode values between those described above. For example, a light grey can encode a value between 0.5 and 1.0 (e.g., 0.6, 0.7, 0.8, 0.9). A dark grey can encode a value between 0.5 and 0.0 (e.g., 0.1, 0.2, 0.3, 0.4). In some examples, the opposite scheme can be used, with white encoding a value of 0.0 and black encoding a value of 1.0.

FIG. 3A is a conceptual diagram illustrating an example of an input image 302 that includes a plurality of pixels labeled P0 through P63, in accordance with some examples. The input image is 7 pixels wide and 7 pixels in height. The pixels are numbered sequentially from P0 to P63 from left to right within each row, starting from the top row and counting up toward the bottom row.

FIG. 3B is a conceptual diagram illustrating an example of a spatial tuning map 303, in accordance with some examples. The tuning map 303 includes a plurality of values labeled V0 through V63. The tuning map is 7 pixels wide and 7 pixels in height. The pixels are numbered sequentially from V0 to V63 from left to right within each row, starting from the top row and counting up toward the bottom row.

Each value within the tuning map 303 corresponds to a pixel in the input image 302. For example, the value V0 in the tuning map 303 corresponds to the pixel P0 in the input image 302. A value in the tuning map 303 is used to adjust or modify its corresponding pixel in the input image 302. In some examples, each value in the tuning map 303 indicates a strength and/or direction at which to apply the image processing function to a corresponding pixel of the image data. In some examples, each value in the tuning map 303 indicates an amount of the image processing function to apply to the corresponding pixel. For example, a first value (e.g., a value of 0, a value of 1, or other value) for V0 in the tuning map 303 can indicate that the image processing function of the tuning map is to be applied at a strength of zero (will not be applied at all) to the corresponding pixel P0 in the input image 302. In another example, a second value (e.g., a value of 0, a value of 1, or other value) for V15 in the tuning map 303 indicates that a the image processing function is be applied at a maximum strength (a maximum amount of the image processing function) to the corresponding pixel P15 in the input image 302. Values in different types of tuning maps can indicate different levels of applicability of the respective image processing functions. In one illustrative example, the tuning map 303 may be a saturation map, a value of 0 in the saturation map can indicate complete desaturation for the corresponding pixel causing the pixel to be grayscaled or monochrome (a maximum strength in a desaturating or negative saturation direction), a value of 0.5 in the saturation map can indicate that no saturation or desaturation effect will be applied to the corresponding pixel (a zero strength of saturation), and a value of 1 in the saturation map can indicate maximum saturation (a maximum strength in a saturating or positive saturation direction). Values between 0 and 1 in the saturation map will indicate varying levels of saturation in between the above-described levels. For example, a value of 0.2 would represent a slight desaturation (a low strength in a desaturating or negative saturation direction), while a value of 0.8 would represent a slight saturation increase (a low strength in a saturating or positive saturation direction), The image processing ML system 210 processes the one or more input images and one or more spatial tuning maps 201 to generate a modified image 215. An example modified image 216 is shown in FIG. 2. The modified image 216 is a modified version of the input image 202. As discussed above, the saturation map 203 includes a value of 0.5 for an area in the saturation map 203 that correspond to the pixels depicting the pink and red flower shown in the foreground of the input image 202. The saturation map 203 includes a value of 0 for locations that correspond to pixels of the image 202 that do not depict the flower in the foreground of the image 202 (and that instead depict the background). The value of 0 in the saturation map 203 indicates that the pixels corresponding to those values will be completely desaturated (a maximum strength in a desaturating or negative saturation direction). As a result, all pixels in the modified image 215 except the pixels representing the flower are depicted in grayscale (black and white). The value of 0.5 in the saturation map 203 indicates that the pixels corresponding to those values will have a no change in saturation (a zero strength of saturation).

The image processing ML system 210 can include one or more neural networks that are trained to process the one or more input images and one or more spatial tuning maps 201 to generate a modified image 215. In one illustrative example, supervised learning techniques can be used to train the image processing ML system 210. For instance, a backpropagation training process can be used to adjust weights (and in some cases other parameters, such as biases) of the nodes of the neural network of the image processing ML system 210. Backpropagation includes a forward pass, a loss function, a backward pass, and a weight update. The forward pass, loss function, backward pass, and parameter update is performed for one training iteration. The process is repeated for a certain number of iterations for each set of training data until the weights of the parameters of the neural network are accurately tuned. Further details regarding the image processing ML system 210 are provided herein.

As described above, various types of spatial tuning maps can be provided for use by the image processing ML system 210. One example of a spatial tuning map is a noise map that indicates an amount of denoising (noise reduction) to apply to the pixels of an input image.

Figure 4:
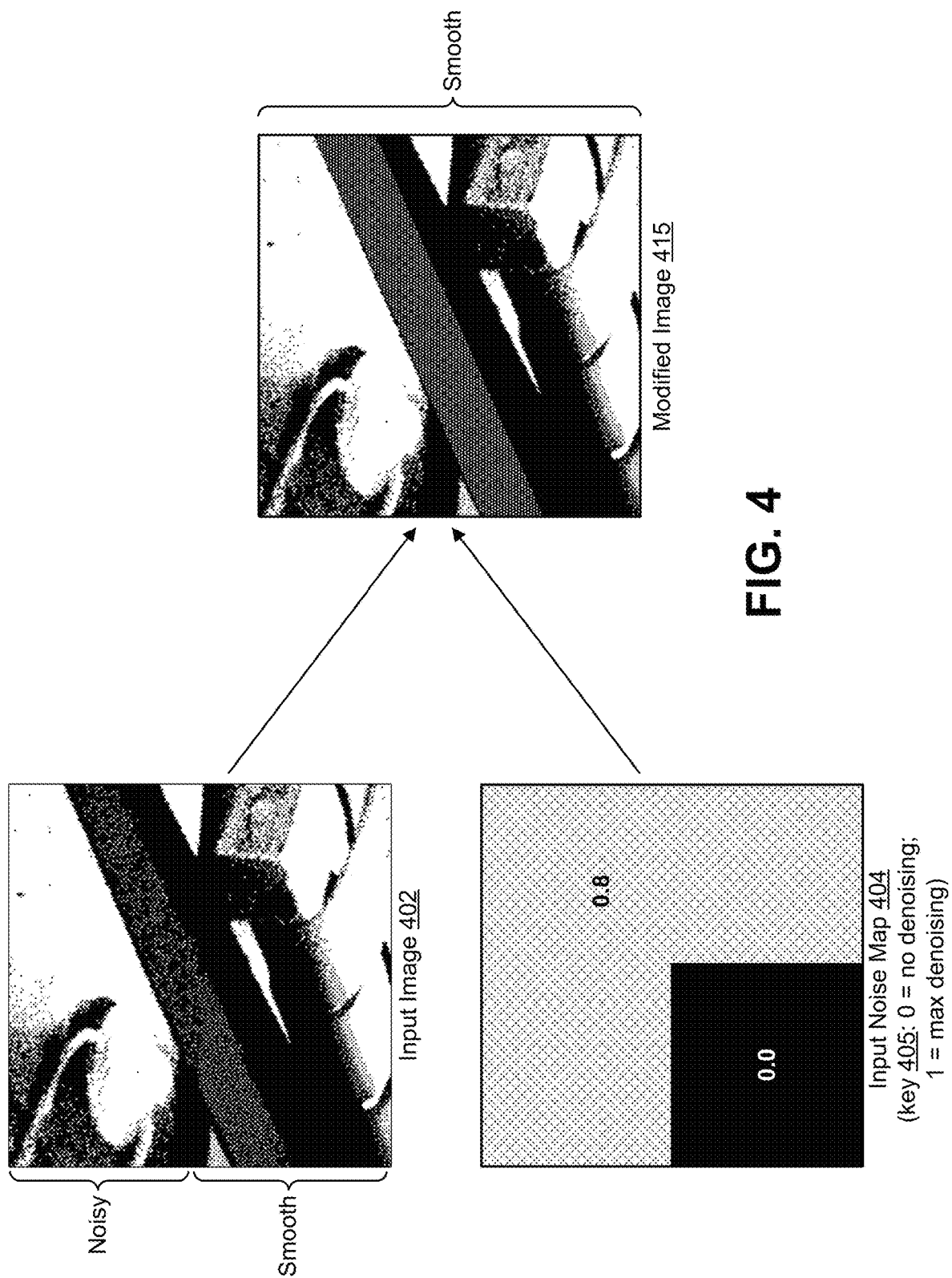
FIG. 4 is a conceptual diagram illustrating an example of an input noise map applied to adjust noise reduction strength in an input image to generate a modified image, in accordance with some examples.

FIG. 4 is a conceptual diagram illustrating an example of an input noise map 404 applied to adjust noise reduction strength in an input image 402 to generate a modified image 415. A portion in the lower-left corner of the input image 402 is labeled with a bracket as "smooth" has little to no visible noise. The remaining portion of the input image 402 is labeled with a bracket as "noisy" and includes visible noise (with a grainy appearance).

A noise map key 405 is shown in FIG. 4. The noise map key 405 indicates that a value of 0 in the noise map 404 indicates no denoising will be applied, and a value of 1 indicates that maximum denoising will be applied. As shown, the input noise map 404 includes a value of 0 for a black-colored area of the noise map 404 that corresponds to the "smooth" area of pixels in the lower-left region of the input image 402 that has little or no noise (the pixels in the lower-left region of the image 402). The input noise map 404 includes a value of 0.8 for the remaining light-grey-shaded area in the noise map 404 that corresponds to the "noisy" area of pixels in the input image 402 that have noise. The image processing ML system 210 can process the input image 402 and the input noise map 404 to produce a modified image 415. As shown, the modified image 415 includes no noise based on the denoising performed by the image processing ML system 210 for the pixels in the input image 402 that correspond to the locations in the noise map 404 having a value of 0.8.

Another example of a spatial tuning map is a sharpness map that indicates an amount of sharpening that will be applied to the pixels of an input image. For example, a blurry image can be brought into focus by sharpening the pixels of the image.

Figure 5:
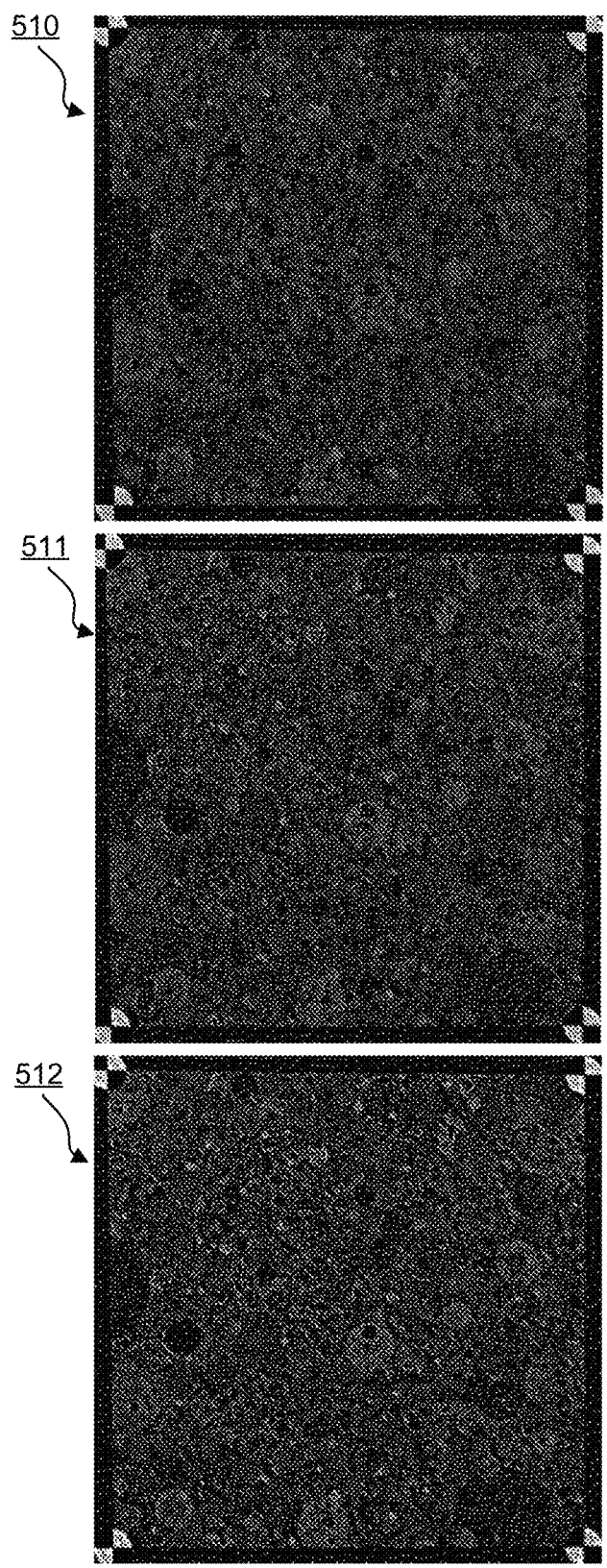
FIG. 5 is a conceptual diagram illustrating examples of the effects of different strengths of application of a sharpness adjustment image processing function on an example image, in accordance with some examples.

FIG. 5 is a conceptual diagram illustrating examples of the effects of different strengths of application of a sharpness adjustment image processing function on an example image, in accordance with some examples. In some examples, a value of 0 in the sharpness map indicates that no sharpening will be applied to the corresponding pixel in an input image to generate a corresponding output image, and a value of 1 in the sharpness map indicates that maximum sharpening will be applied to the corresponding pixel in the input image to generate a corresponding output image. The image 510 is generated by the image processing ML system 210 when the values in a sharpness adjustment map are set to 0, where no sharpening (or sharpening at strength zero) is applied to the image 510. The image 511 is generated by the image processing ML system 210 when the values in the sharpness map are set to 0.4, in which case a moderate amount of sharpening (sharpening at a moderate strength) is applied to the pixels of the image 511. The image 512 is generated when the values in the sharpness map are set to 1.0, where a maximum amount of sharpening (sharpening at a maximum strength) is applied to the pixels of the image 512.

An enhanced image (or sharpened image) can be generated by the image processing ML system 210 based on the input image and the sharpness map. For instance, the image processing ML system 210 can use the sharpness map to sharpen the input image and produce a sharpened image (also referred to as an enhanced image). The sharpened (or enhanced) image depends on image detail as well as an alpha ($\alpha$) parameter. For instance, the following equation can be used to generate a sharpened (or enhanced) image: Enhanced Image=Original Input Image+$\alpha$*Detail. The values in the sharpness map can cause the image processing ML system 210 to modify both the alpha ($\alpha$) and image detail parameters to obtain the sharpened image. As an illustrative example of generating a sharpened (or enhanced) image, the image processing ML system 210 can apply edge preserving filtering to the input image, such as by applying an edge preserving non-linear filter. An example of an edge preserving non-linear filter includes a bilateral filter. In some cases, the bilateral filter has two hyper-parameters, including spatial sigma and range sigma. The spatial sigma controls the filter window size (where a larger window size results in more smoothing). The range sigma controls the filter size along the intensity dimension (where a larger value results in blurring different intensities together). In some examples, the image detail can be obtained by subtracting the filtered image (the smoothed image resulting from the edge-preserving filtering) from the input image. The sharpened (or enhanced) image can then be obtained by adding a certain fraction (represented by the alpha ($\alpha$) parameter) of the image detail to the original input image. Using the image detail and the alpha ($\alpha$), the sharpened (enhanced) image can be obtained as follows: Enhanced Image=Original Input Image+$\alpha$*Detail.

Figure 6:
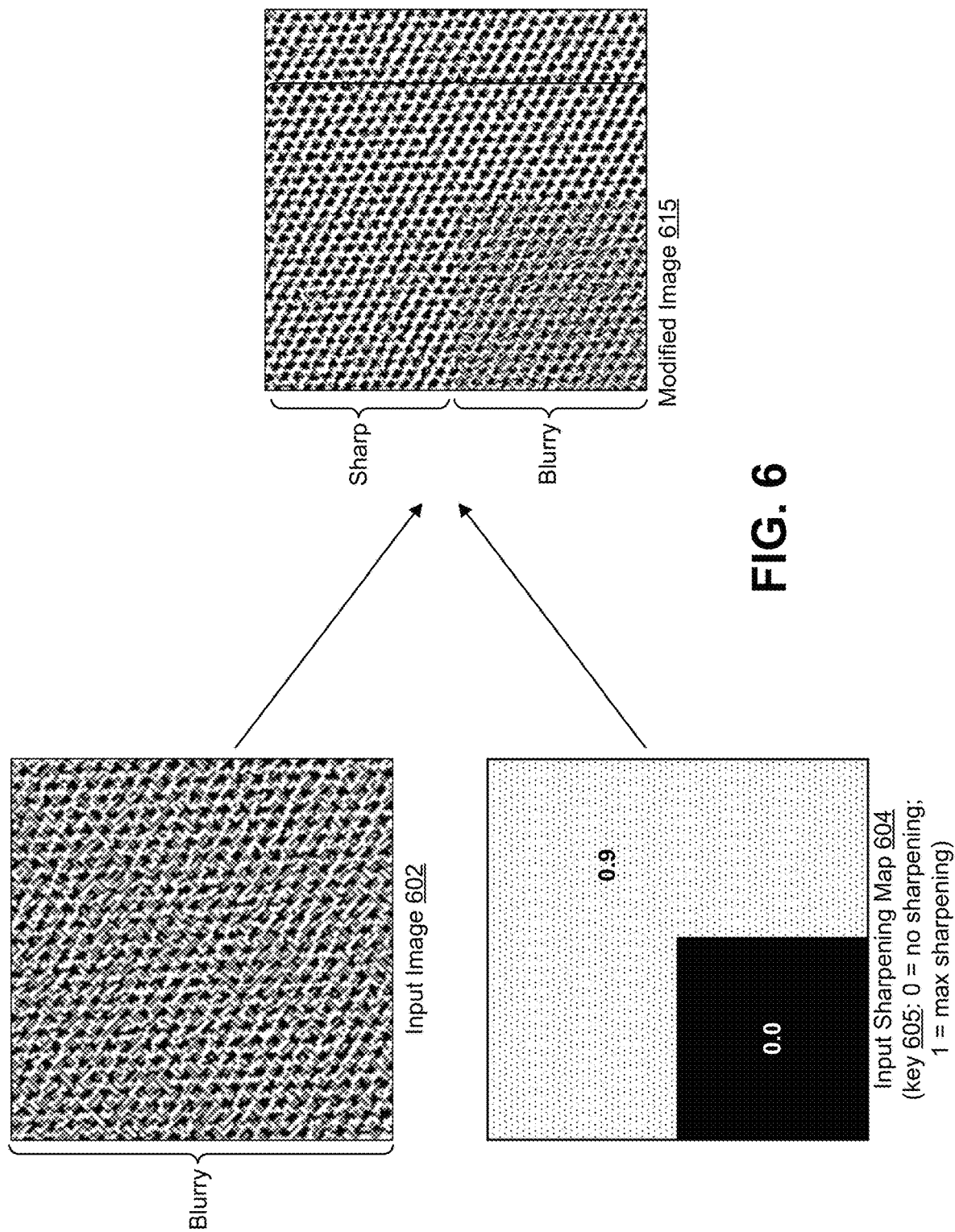
FIG. 6 is a conceptual diagram illustrating an example of an input sharpness map applied to adjust sharpening strength in an input image to generate a modified image, in accordance with some examples.

FIG. 6 is a conceptual diagram illustrating an example of an input sharpness map 604 applied to adjust sharpening strength in an input image 602 to generate a modified image 615, in accordance with some examples. As can be seen, the input image 602 has a blurry appearance. A sharpness map key 605 specifies that a value of 0 in the noise map 604 indicates that no sharpening will be applied (sharpening will be applied at a strength of zero) to the corresponding pixels of the input image 602, and a value of 1 indicates that maximum sharpening will be applied (sharpening will be applied at a maximum strength) to the corresponding pixels. As shown, the input sharpness map 604 includes a value of 0 for black-shaded area in a lower-left portion the sharpness map 604. The input sharpness map 604 includes a value of 0.9 for a remaining area (shaded in light grey) in the sharpness map 604. The image processing ML system 210 can process the input image 602 and the input sharpness map 604 to produce a modified image 615. As shown, the pixels of the modified image 615 corresponding to the locations in the sharpness map 604 that have a value of 0 are blurry (since sharpening was applied at strength zero), while the pixels of the modified image 615 corresponding to the locations in the sharpness map 604 that have a value of 0.9 are sharp (not blurry) due to sharpening performed at a high strength by the image processing ML system 210 in that area.

A tone map is another example of a spatial tuning map. The tone map indicates an amount of luminance adjustment that will be applied to the pixels of an input image, resulting in an image with darker or lighter tones. The Gamma value controls the amount of luminance for the pixels, which is referred to as Gamma correction. For example, the Gamma correction can be defined as a transformation denoted as $I_{out}=I_{in}^{\gamma}$, where $I_{in}$ is the input value (e.g., a pixel or an entire image), $\gamma$ is the Gamma value, and $I_{out}$ is the output value (e.g., a pixel or an entire output image). The Gamma transformation function can be applied differently for different types of images. For instance, for the red-green-blue (RGB) color space, the same Gamma transformation can be applied to the R, G, and B channels of an image. In another example, for the YUV color space (with a luminance component (Y) and two chrominance components U (blue projection) and V (red projection)), the Gamma transformation function can be applied only to the luminance (Y) channel of an image (e.g., only to the Y components or samples of the pixels of the image).

Figure 7:
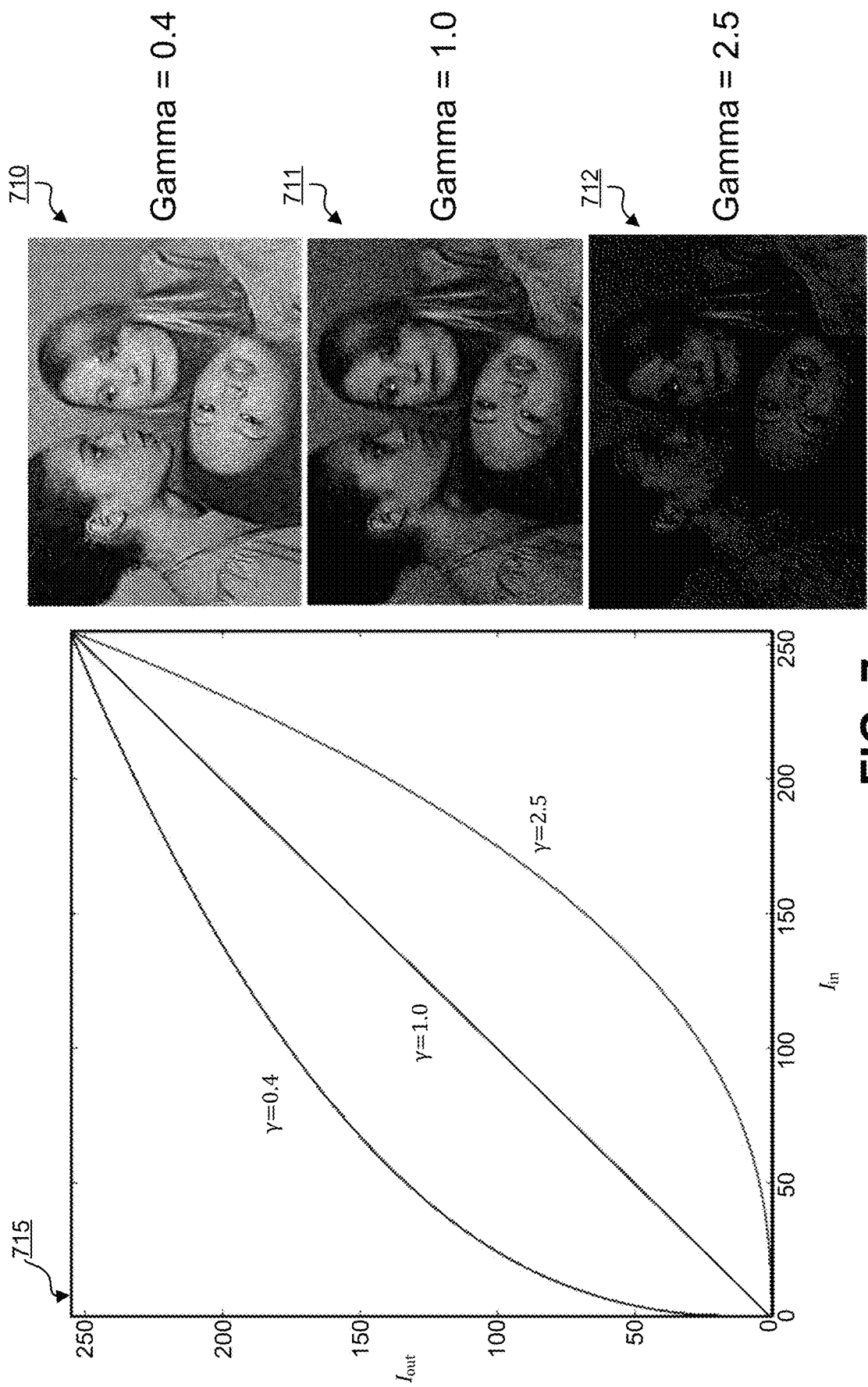
FIG. 7 is a conceptual diagram illustrating an example of a Gamma curve and various examples the effects of different values in a tone map translating to different strengths of tone adjustment applied to an example image, in accordance with some examples.

FIG. 7 is a conceptual diagram illustrating an example of a Gamma curve 715 and various examples the effects of different values in a tone map translating to different strengths of tone adjustment applied to an example image, in accordance with some examples. In some examples, the Gamma ($\gamma$) range is $10^{-0.4}$ to $10^{0.4}$, which corresponds to values of 0.4 to 2.5. The gamma exponents −0.4 to 0.4 can be mapped to a range from 0 to 1 to compute the tone tuning map. For instance, a value of 0 in the tone map indicates that a Gamma ($\gamma$) value of 0.4 (corresponding to $10^{-0.4}$) will be applied to the corresponding pixel in the input image, a value of 0.5 in the tone map indicates that a Gamma ($\gamma$) value of 1.0 (corresponding to $10^{0.0}$) will be applied to the corresponding pixel in the input image, and a value of 1 in the tone map indicates that a Gamma ($\gamma$) value of 2.5 (corresponding to $10^{0.4}$) will be applied to the corresponding pixel in the input image. The output image 710, the output image 711, and the output image 712 are all generated by applying different strengths of tone adjustment to the same input image. The image 710 is generated by the image processing ML system 210 when a Gamma vale of 0.4 is applied, resulting in increased luminance and thus a brighter image than the input image. The image 711 is generated when a Gamma vale of 1.0 is applied, resulting in no luminance change. Thus, output image 711 is identical in tone to the input image. The image 712 is generated when a Gamma vale of 2.5 is applied, resulting in decreased luminance and a darker image than the input image.

Figure 8:
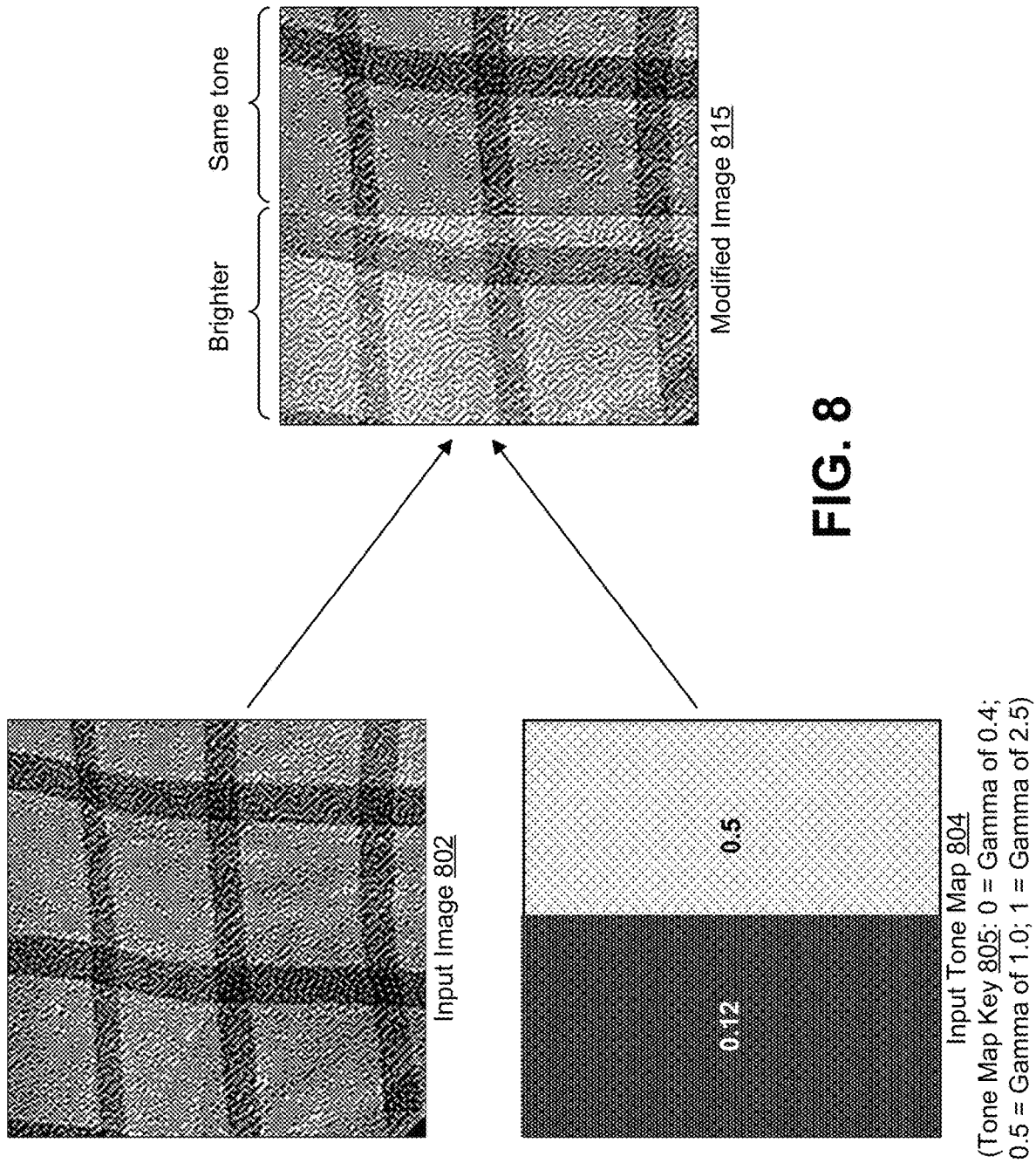
FIG. 8 is a conceptual diagram illustrating an example of an input tone map applied to tone adjustment strength in an input image to generate a modified image, in accordance with some examples.

FIG. 8 is a conceptual diagram illustrating an example of an input tone map 804 applied to tone adjustment strength in an input image 802 to generate a modified image 815, in accordance with some examples. A tone map key 805 specifies that a value of 0 in the tone map 804 indicates that a Gamma ($\gamma$) value of 0.4 will be applied to the corresponding pixels of the input image 802 (tone adjustment at strength 0.4), a value of 0.5 in the tone map 804 indicates that a Gamma (γ) value of 1.0 will be applied to the corresponding pixel in the input image 802 (tone adjustment at strength 1.0 indicating no change in tone), and a value of 1 in the tone map 804 indicates that a Gamma (γ) value of 2.5 will be applied to the corresponding pixel in the input image 802 (tone adjustment at maximum strength 2.5). The input tone map 804 includes a value of 0.12 for a group of locations (an area shaded in dark grey) in the left-half of the tone map 804. The value of 0.12 corresponds to an approximate Gamma (γ) value of 0.497. For example, the exponent can be determined as Exponent=((0.12−0.5)*0.4)/0.5=−0.304, and the Gamma (γ) value can be determined as Gamma=$10^{Exponent}=10^{(-0.304)}$=0.497). The tone map 804 includes a value of 0.5 for a remaining group of locations (an area shaded in medium grey) in the right-half of the tone map 804. The value of 0.5 corresponds to a Gamma (γ) value of 1.0.

The image processing ML system 210 can process the input image 802 and the input tone map 804 to generate a modified image 815. As shown, the pixels in the left-half of the modified image 815 have a lighter tone (relative to the corresponding pixels in the left half of the input image 802 and/or relative to the pixels in the right-half of the modified image 815) due to the Gamma (γ) value of 0.497 being used in the Gamma transformation based on the tone map value of 0.12. The pixels in the right-half of the modified image 815 have a same tone as the corresponding pixels in the right half of the input image 802 (and/or a darker tone relative to the pixels in the left-half of the modified image 815) due to the Gamma (γ) value of 1.0 being used in the Gamma transformation based on the tone map value of 0.5.

A saturation map is another example of a spatial tuning map. The saturation map indicates an amount of saturation that will be applied to the pixels of an input image, resulting in an image with modified color values. For the saturation map, saturation refers to the difference between the RGB pixels (or pixels defined using another color space, such as YUV) from the corresponding grayscale image (e.g., as shown in Equations 1-3 below). This saturation can be referred to as a "saturation difference" in some cases. For example, increasing the saturation of an image can cause the colors in the image to become more intense, whereas decreasing the saturation can cause the colors to be toned down. If the saturation is reduced enough, the image can become desaturated and can result in a grayscale image. As explained below, an Alpha Blending technique can be performed in some cases, where an alpha (a) value determines the saturation of colors.

Saturation adjustments can be applied using different techniques. In the YUV color space, the values of the U chrominance component (blue projection) and the V chrominance component (red projection) of the pixels of an image can be adjusted to set different saturation levels for the image.

Figure 9:
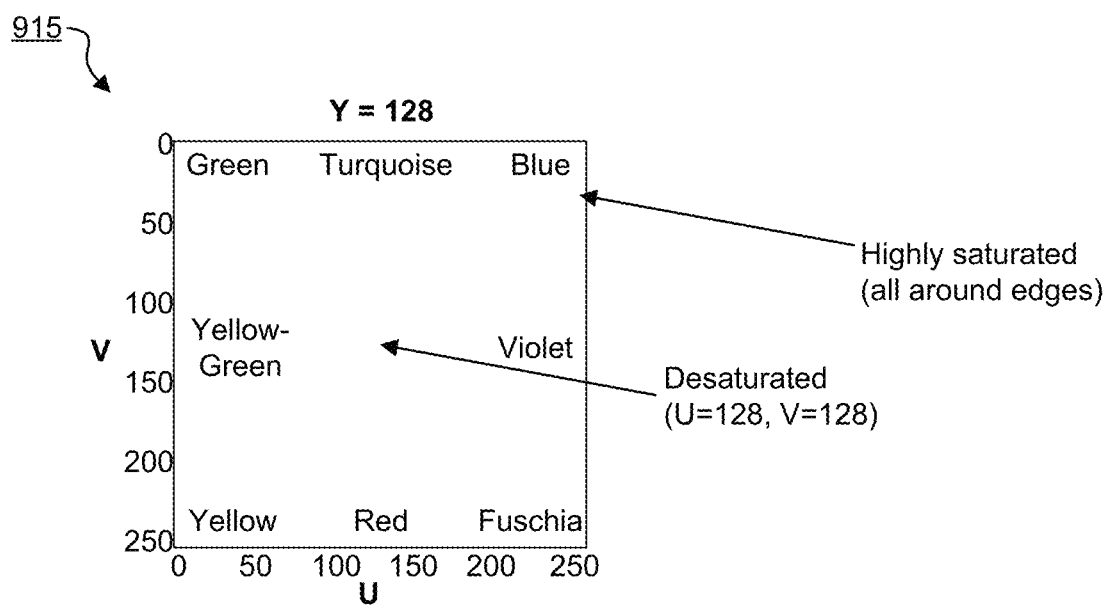
FIG. 9 is a conceptual diagram illustrating saturation levels in the luminance-chrominance (YUV) color space, in accordance with some examples.

FIG. 9 is a conceptual diagram 915 illustrating saturation levels in the YUV color space, with the x-axis representing the U chrominance component (blue projection) and the y-axis representing the V chrominance component (red projection). The luminance (Y) is constant at a value of 128 in the diagram of FIG. 9. Desaturation is represented in the center of the diagram, with values of U=128, V=128, where the image is a Grayscale (desaturated) image. As the distance gets further away (higher or lower U and/or V values), the saturation gets higher. For example, a larger distance from center corresponds to higher saturation.

In another example, an Alpha Blending technique can be used to adjust saturation. A mapping between luminance (Y) and the R, G, B channels can be represented using the following equations:

$$R'=\alpha*R+(1-\alpha)*Y \quad \text{Equation (1)}$$

$$G'=\alpha*G+(1-\alpha)*Y \quad \text{Equation (2)}$$

$$B'=\alpha*B+(1-\alpha)*Y \quad \text{Equation (3)}$$

Figure 10:
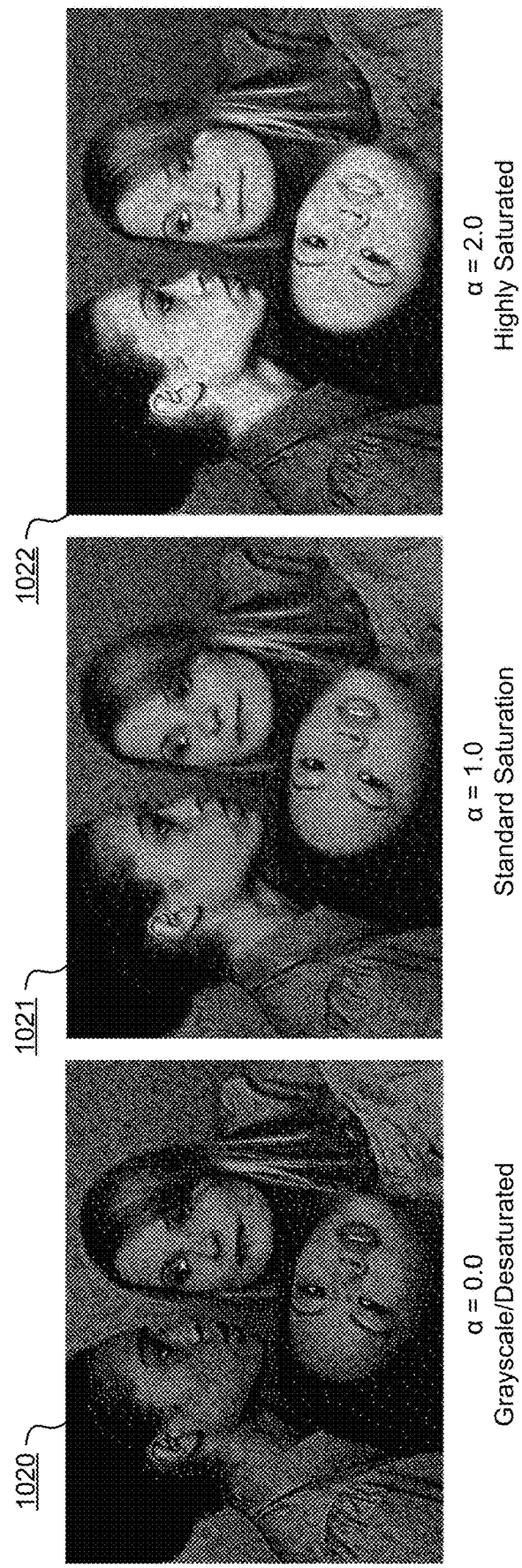
FIG. 10 is a conceptual diagram illustrating processed variants of an example image that are each processed using different alpha (α) values for adjusting color saturation, in accordance with some examples.

FIG. 10 is a conceptual diagram illustrating processed variants of an example image that are each processed using different alpha (α) values for adjusting color saturation, in accordance with some examples. An image will become less saturated for α values less than 1 (α<1). For example, when α=0, all of the R', G', and B' values are equal to the luminance (Y) value (α=0: R'=G'=B'=Y), resulting in a Grayscale (desaturated). The output image 1020, the output image 1021, and the output image 1022 are all generated by applying different strengths of saturation adjustment to the same input image. The input image illustrates the faces of three women adjacent to one another. Because FIG. 10 is illustrated in greyscale rather than in color, the red channels of the output image 1020, the output image 1021, and the output image 1022 are illustrated in FIG. 10 to illustrate changes in red color saturation. Increases in red color saturation appear as brighter areas, while decreases in red color saturation appear as darker areas. There is no effect with respect to saturation when α=1. For example, when α=1, the Equations (1)-(3) result in R'=R, G'=G, and B'=B. The output image 1021 in FIG. 10 is an example of an image that has no saturation effect based on the alpha (α) value being set to a value of 1.0. Thus, the output image 1021 is identical to the input image in terms of color saturation. The output image 1020 in FIG. 10 is an example of a grayscale (desaturated) image resulting from an alpha (α) value of 0.0. Because FIG. 10 shows the red channel of output image 1020, the darker faces in the output image 1020 (compared to the output image 1021 and therefore the input image) indicate that the red color in the faces is less saturated. An image will become more saturated for α values greater than 1 (α>1). The R, G, and B values can be clipped at the highest intensity. The output image 1022 in FIG. 10 is an example of a highly saturated image resulting from an alpha (α) value of 2.0. Because FIG. 10 shows the red channel of output image 1020, the brighter faces in the output image 1022 (compared to the output image 1021 and therefore the input image) indicate that the red color in the faces is more saturated.

FIG. 11 is a conceptual diagram illustrating an example of an input image 1102 and an input saturation map 1104. A saturation map key 1105 specifies that a value of 0 in the saturation map 1104 indicates desaturation, a value of 0.5 indicates no saturation effect, and a value of 1 indicates saturation. The input saturation map 1104 includes a value of 0.5 for a group of locations in a bottom-left portion of the saturation map 1104, indicating that no saturation effect will be applied to corresponding pixels of the input image 1102. The saturation map 1104 includes a value of 0.1 for a group of locations outside of the bottom-left portion of the saturation map 1104. The value of 0.1 will result in pixels with decreased saturation (almost being desaturated).

The image processing ML system 210 can process the input image 1102 and the input saturation map 1104 to generate a modified image 1115. As shown, the pixels in the bottom-left portion of the modified image 1115 are the same as the corresponding pixels in the input image 1102 due to no saturation effect being applied to those pixels based on the saturation map value of 0.5. The pixels in the rest of the modified image 1115 have a darker green appearance (almost grayscale) due to the decrease in saturation being applied to those pixels based on the saturation map value of 0.1.

Another example of a spatial tuning map is a hue map. Hue is the color in an image, and saturation (in the HSV color space) is the intensity (or richness) of that color. The hue map indicates an amount color change that will be applied to the pixels of an input image. Hue adjustments can be applied using different techniques. For example, the hue, saturation, value (HSV) color space is a representation of the RGB color space. The HSV representation models how different colors mix together using a saturation dimension and a hue dimension.

Figure 12B:
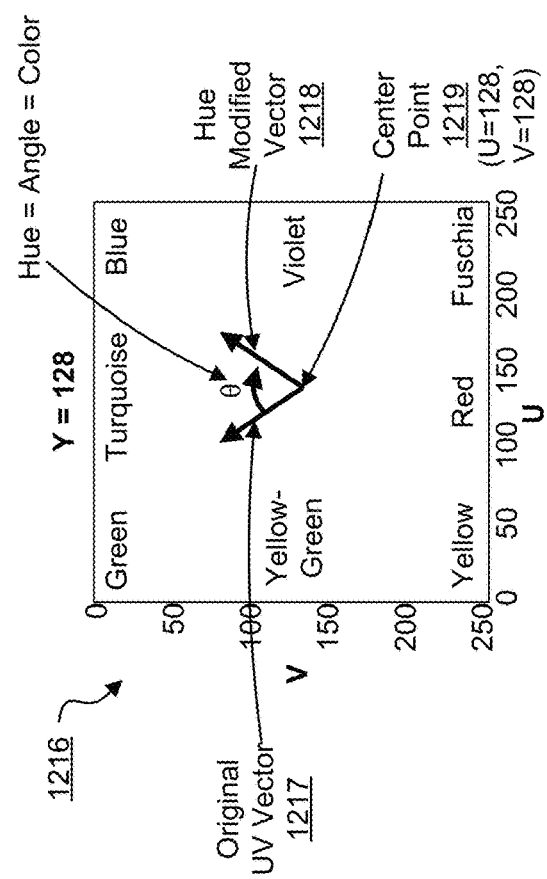
FIG. 12B is a conceptual diagram illustrating modification of a hue vector in the luminance-chrominance (YUV) color space; in accordance with some examples.
Figure 12A:
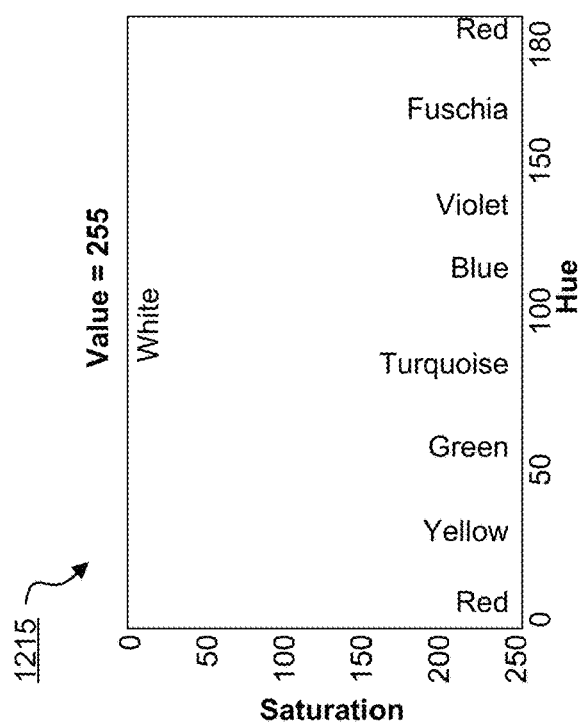
FIG. 12A is a conceptual diagram illustrating the hue, saturation, value (HSV) color space, in accordance with some examples.

FIG. 12A is a conceptual diagram 1215 illustrating the HSV color space, with the saturation being represented on the y-axis, the hue being represented on the x-axis, and the value having a value of 255. The hue (color) can be modified, as shown on the x-axis. As shown, the hue is wrapped around, in which case a hue of 0 and 180 represent the same red color (Hue: 0=Hue: 180, according to the OpenCV convention). Because the figures are illustrated in black and white, colors are written in text where they would appear in the HSV color space.

It is noted that saturation in the HSV space is not equivalent to saturation defined by the saturation map discussed above. For example, when referring to saturation in the HSV color space, saturation refers to the standard HSV color space definition, where saturation is the richness of a particular color. However, depending on the value of HSV, a saturation value of 0 can make the pixel appear black (value=0), gray (value=128), or white (value=255). This saturation can be referred to as an "HSV saturation" in some cases. Since the color saturation and color value are coupled in the HSV space, this definition of saturation (HSV saturation) is not used herein. Instead, as used herein, saturation refers to how colorful or grayish a pixel is, which can be captured by the alpha ($\alpha$) value described above.

FIG. 12B is a conceptual diagram 1216 illustrating the YUV color space. An original UV vector 1217 is shown relative to a center point 1219 (U=128, V=128). The original UV vector 1217 can be modified by adjusting an angle ($\theta$), resulting in a modified hue (color) indicated by a hue modified vector 1218. The hue modified vector 1218 is shown relative to the center point 1219. In the YUV color space, a UV vector direction can be modified with respect to the center point 1219 (U=128, V=128, as shown in FIG. 9). The UV vector modification illustrates an example of how hue adjustment can function, with strength of hue adjustment corresponding to angle ($\theta$), and direction of hue adjustment corresponding to whether the angle ($\theta$) is negative or positive.

Figure 13:
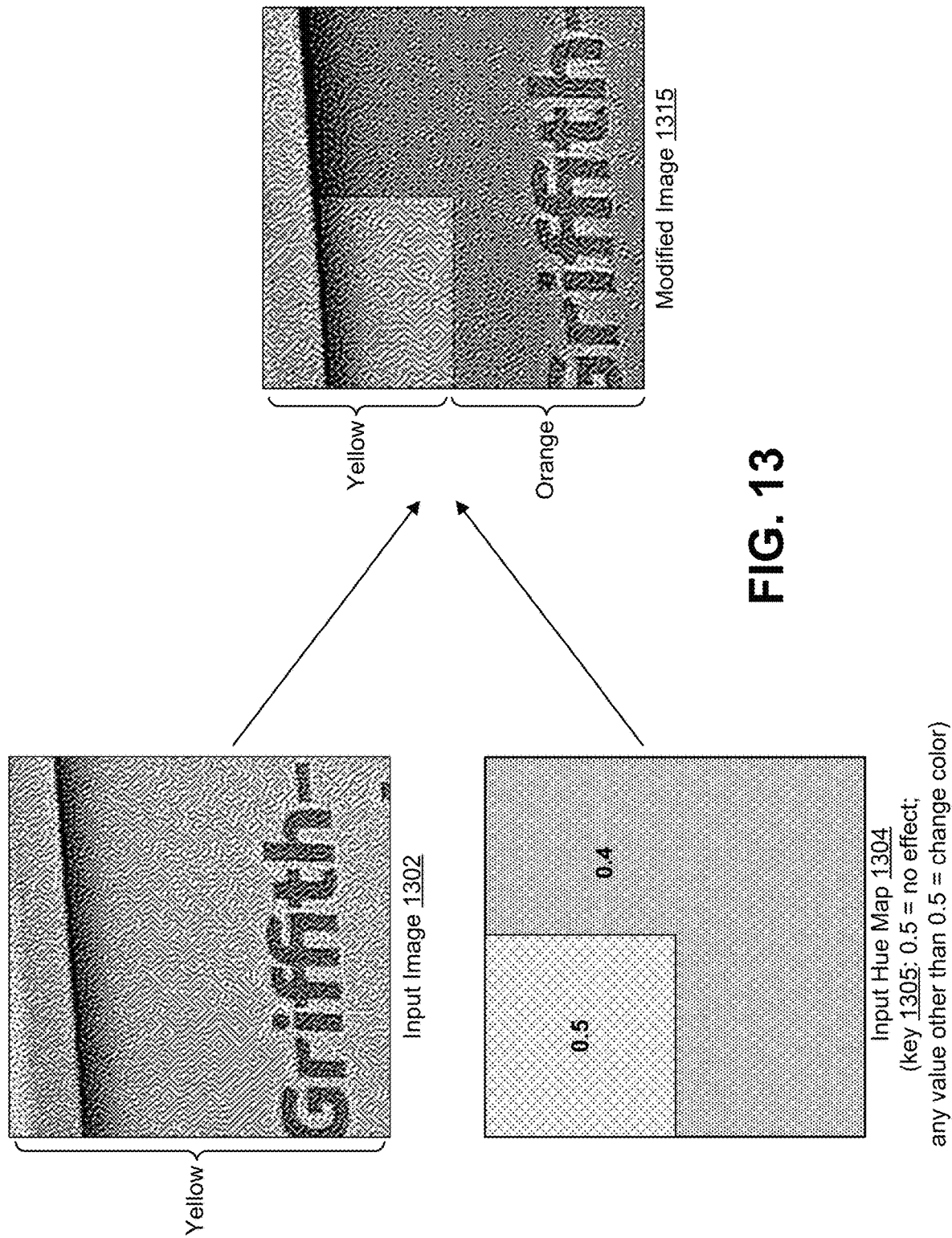
FIG. 13 is a conceptual diagram illustrating an example of an input hue map applied to hue adjustment strength in an input image to generate a modified image, in accordance with some examples.

FIG. 13 is a conceptual diagram illustrating an example of an input hue map 1304 applied to hue adjustment strength in an input image 1302 to generate a modified image 1315, in accordance with some examples. A hue map key 1305 specifies that a value of 0.5 in the hue map 1304 indicates no effect (no change in hue or color) (hue adjustment with a strength of zero). Any value other than 0.5 indicates a change in hue relative to the current color (hue adjustment with a nonzero strength). For example, referring to FIG. 12A as an illustrative example, if the current color is green (i.e., hue=60), a hue value of 60 can be added to convert the color to blue (i.e., hue=60+60=120). In another example, a hue value of 60 can be subtracted from the existing hue value of 60 to convert the green color to red (i.e., hue=60−60=0). The input hue map 1304 includes a value of 0.5 for a group of locations (an area shaded medium-grey) in a top-left portion of the hue map 1304, indicating that no change in hue (a hue adjustment with zero strength) will be applied to corresponding pixels of the input image 1302. The hue map 1304 includes a value of 0.4 for a group of locations (an area shaded in dark grey) outside of the top-left portion of the hue map 1304. The value of 0.4 will result in pixels in the input image 1302 being changed from the exiting hue to a modified hue. Because the value of 0.4 is closer to 0.5 than to 0.0, the change in hue compared to the input image 1302 is slight. The change in hue indicated by the input hue map 1304 is a change relative to the hue of each pixel in the input image 1302. A mapping of each pixel can be determined using the color space illustrated in FIG. 12A. As with the other tuning maps described herein, the hue map values can range from 0-1, which are remapped to the actual 0-180 value range during the application of the hue map.

The input image 1302 illustrates a portion of a yellow wall with purple text reading "Griffith-." The image processing ML system 210 can process the input image 1302 and the input hue map 1304 to generate a modified image 1315. As shown, the pixels in the top-left portion of the modified image 1315 are the same hue as the corresponding pixels in the input image 1302 due to no change in hue (a hue adjustment with zero strength) being applied to those pixels based on the hue map value of 0.5 in that area. Thus, the pixels in the top-left portion of the modified image 1315 retail the yellow hue of the yellow wall in the input image 1302. The pixels in the rest of the modified image 1315 have a changed hue as compared to the pixels in the input image 1302 due to the change in hue being applied to those pixels based on the hue map value of 0.4. In particular, in the rest of the modified image 1315, the areas of the wall that appear yellow in the input image 1302 appear orange in the modified image 1315. In the rest of the modified image 1315, the text reading "Griffith-" that appears purple in the input image 1302 appears a different shade of purple in the modified image 1315.

In some examples, multiple tuning maps can be input to the image processing ML system 210 along with an input image 1402. In some examples, the multiple tuning maps can include different tuning maps that correspond to a different image processing functions, such as denoising, noise addition, sharpening, desharpening (e.g., blurring), tone adjustment, saturation adjustment, detail adjustment, hue adjustment, or a combination thereof. In some examples, the multiple tuning maps can include different tuning maps that correspond to the same image processing function, but may for example modify different areas/locations within the input image 1402 in different ways.

Figure 14A:
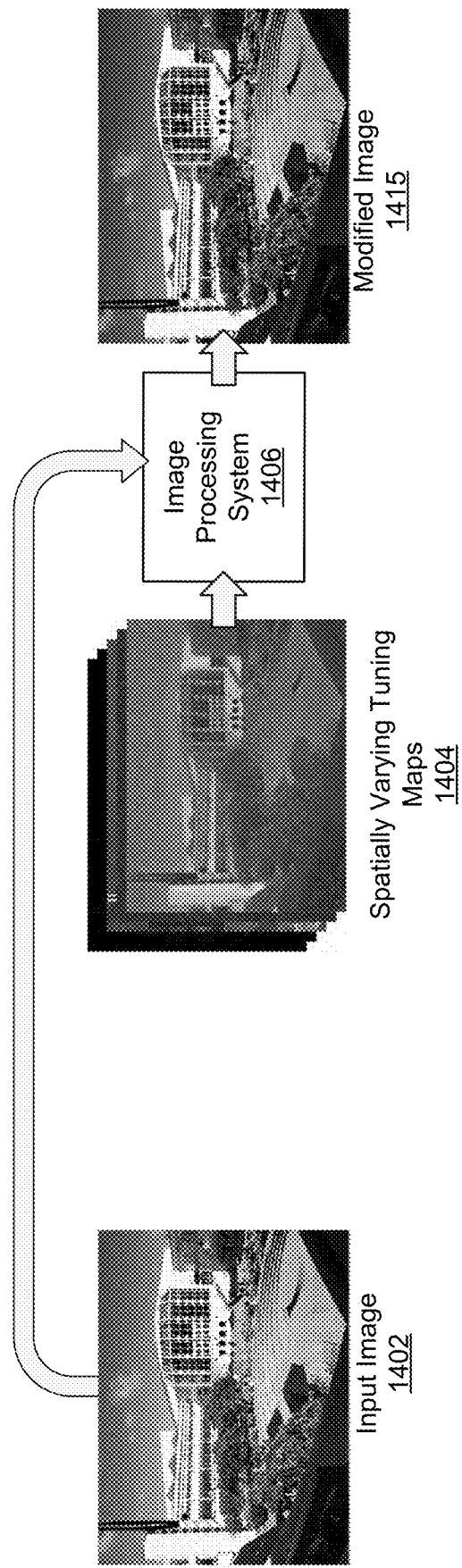
FIG. 14A is a conceptual diagram illustrating an example of a system including the image processing system receiving an input image and multiple spatially varying tuning maps, in accordance with some examples.

FIG. 14A is a conceptual diagram illustrating an example of a system including the image processing system 1406 receiving an input image 1402 and multiple spatially varying tuning maps 1404. In some examples, the image processing system 1406 may be the image processing ML system 210 and/or may include a machine learning (ML) system such as that of the image processing ML system 210. The ML system may apply image processing functions using ML. In some examples, the image processing system 1406 may apply image processing functions without an ML system. The image processing system 1406 can be implemented using one or more trained support vector machines, one or more trained neural networks, or a combination thereof.

The spatially varying tuning maps 1404 can include one or more of the noise map, the sharpness map, the tone map, the saturation map, the hue map, and/or another other map associated with an image processing function. Using the input image 1402 and the multiple tuning maps 1404 as inputs, the image processing system 1406 generates the modified image 1415. The image processing system 1406 can modify the pixels of the input image 1402 based on the values included in the spatially varying tuning maps 1404, resulting in the modified image 1415. For example, the image processing system 1406 can modify the pixels of the input image 1402 by applying an image processing function to each pixel of the input image 1402 at strengths indicated by values included in the one of spatially varying tuning maps 1404 that correspond to that image processing function, and can do so for each image processing function and corresponding one of the spatially varying tuning maps 1404, resulting in the modified image 1415. The spatially varying tuning maps 1404 can be generated using a ML system as discussed further with respect to at least FIGS. 14B, 14C, 14D, 16B, 17, 18, 19, 20, 21A, 21B, 21C, and 21D.

Figure 14B:
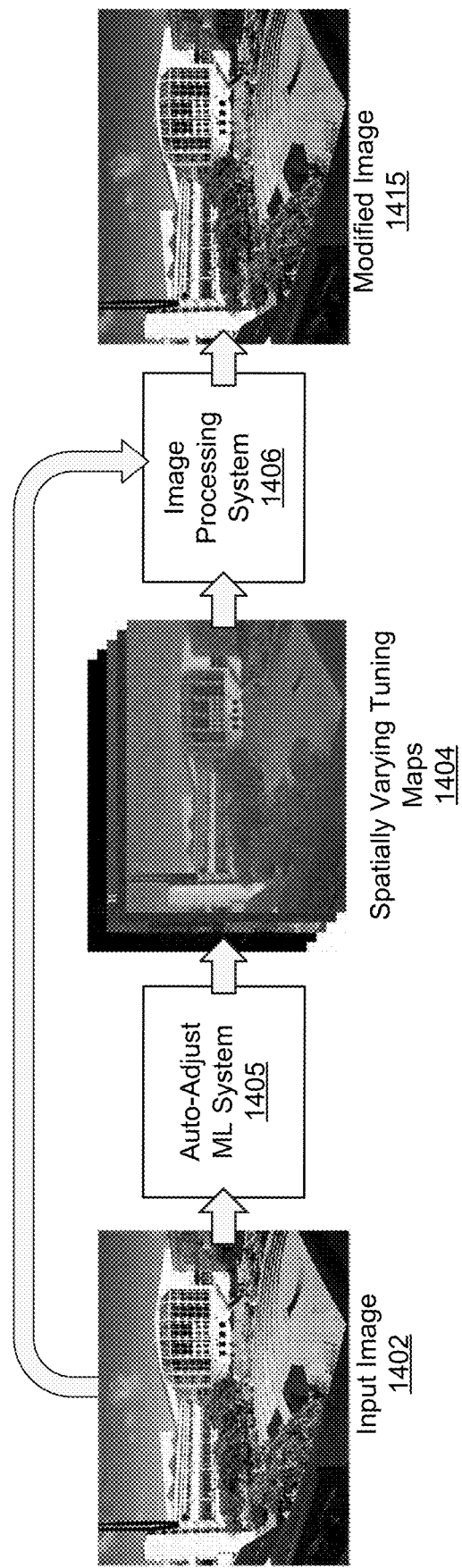
FIG. 14B is a conceptual diagram illustrating an example of a system including the image processing system receiving an input image and multiple spatially varying tuning maps, as well as and an auto-adjust machine learning (ML) system receiving the input image and generating the multiple spatially varying tuning maps, in accordance with some examples.

FIG. 14B is a conceptual diagram illustrating an example of a system including the image processing system 1406 receiving an input image 1402 and multiple spatially varying tuning maps 1404, as well as and an auto-adjust machine learning (ML) system 1405 receiving the input image 1402 and generating the multiple spatially varying tuning maps 1404, in accordance with some examples. The auto-adjust ML system 1405 can process the input image 1402 to generate the spatially varying tuning maps 1404. The tuning maps 1404 and the input image 1402 can be provided as input to the image processing system 1406. The image processing system 1406 can process the input image 1402 based on the tuning maps 1404 to generate the modified image 1415, similar to that described above with respect to FIG. 14A. The auto-adjust ML system 1405 can be implemented using one or more convolutional neural networks (CNNs), one or more CNNs, one or more trained neural networks (NNs), one or more NNs, one or more trained support vector machines (SVMs), one or more SVMs, one or more trained random forests, one or more random forests, one or more trained decision trees, one or more decision trees, one or more trained gradient boosting algorithms, one or more gradient boosting algorithms, one or more trained regression algorithms, one or more regression algorithms, or a combination thereof. The auto-adjust ML system 1405, and/or any of the machine learning elements listed above (that may be parts of the auto-adjust ML system 1405), can be trained using supervised learning, unsupervised learning, reinforcement learning, deep learning, or a combination thereof.

Figure 14C:
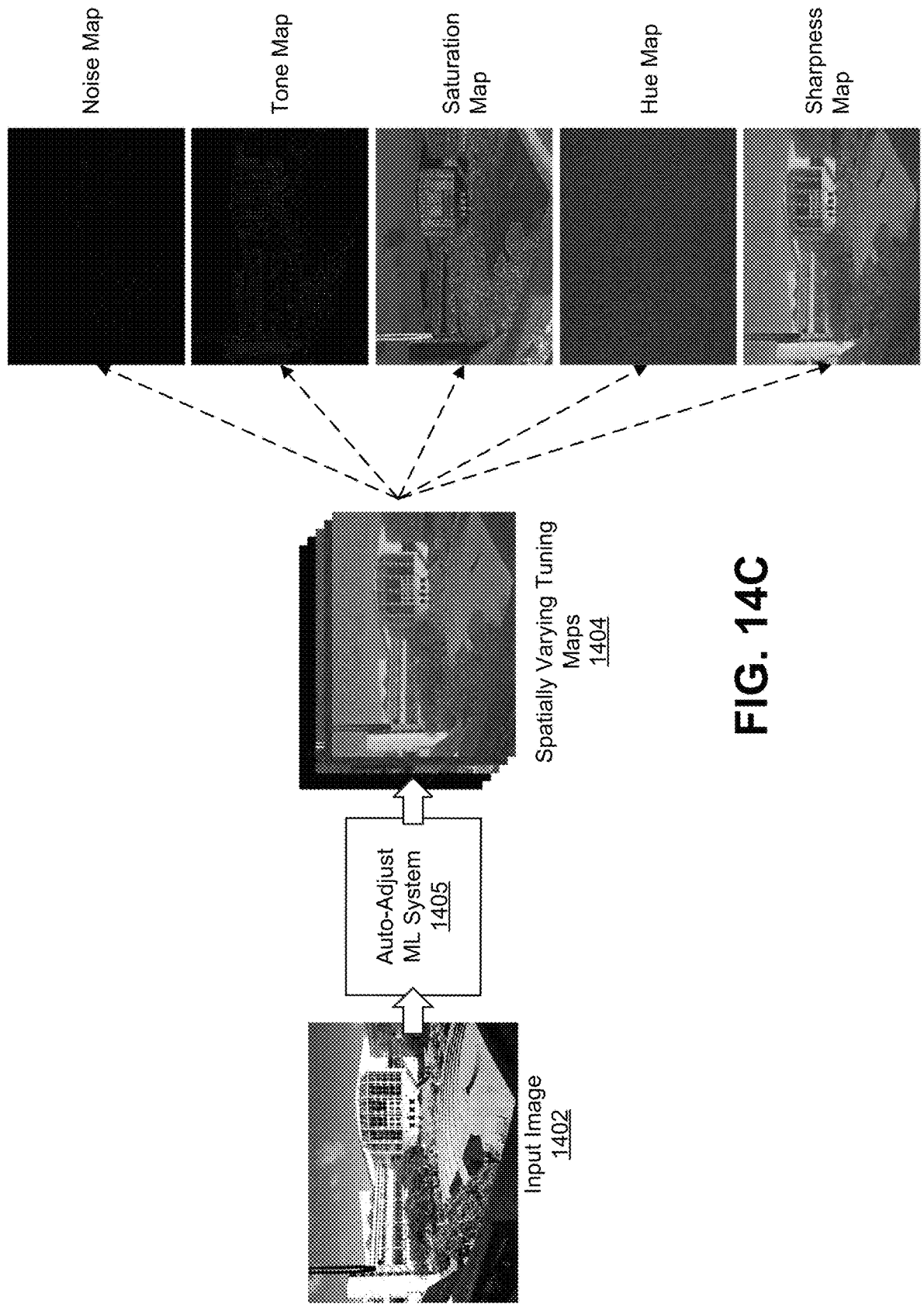
FIG. 14C is a conceptual diagram illustrating an example of a system the auto-adjust machine learning (ML) system receiving the input image and generating the multiple spatially varying tuning maps, in accordance with some examples.

FIG. 14C is a conceptual diagram illustrating an example of a system the auto-adjust machine learning (ML) system 1405 receiving the input image 1402 and generating the multiple spatially varying tuning maps 1404, in accordance with some examples. In the example illustrated in FIG. 14C, the spatially varying tuning maps 1404 include a noise map, a tone map, a saturation map, a hue map, and a sharpness map. The image processing system 1406, while not illustrated in FIG. 14C, can thus apply noise reduction at strengths indicated in the noise map, can apply tone adjustments at strengths and/or directions indicated in the tone map, can apply saturation adjustments at strengths and/or directions indicated in the saturation map, can apply hue adjustments at strengths and/or directions indicated in the hue map, and/or can apply sharpening at strengths indicated in the sharpness map.

Figure 14D:
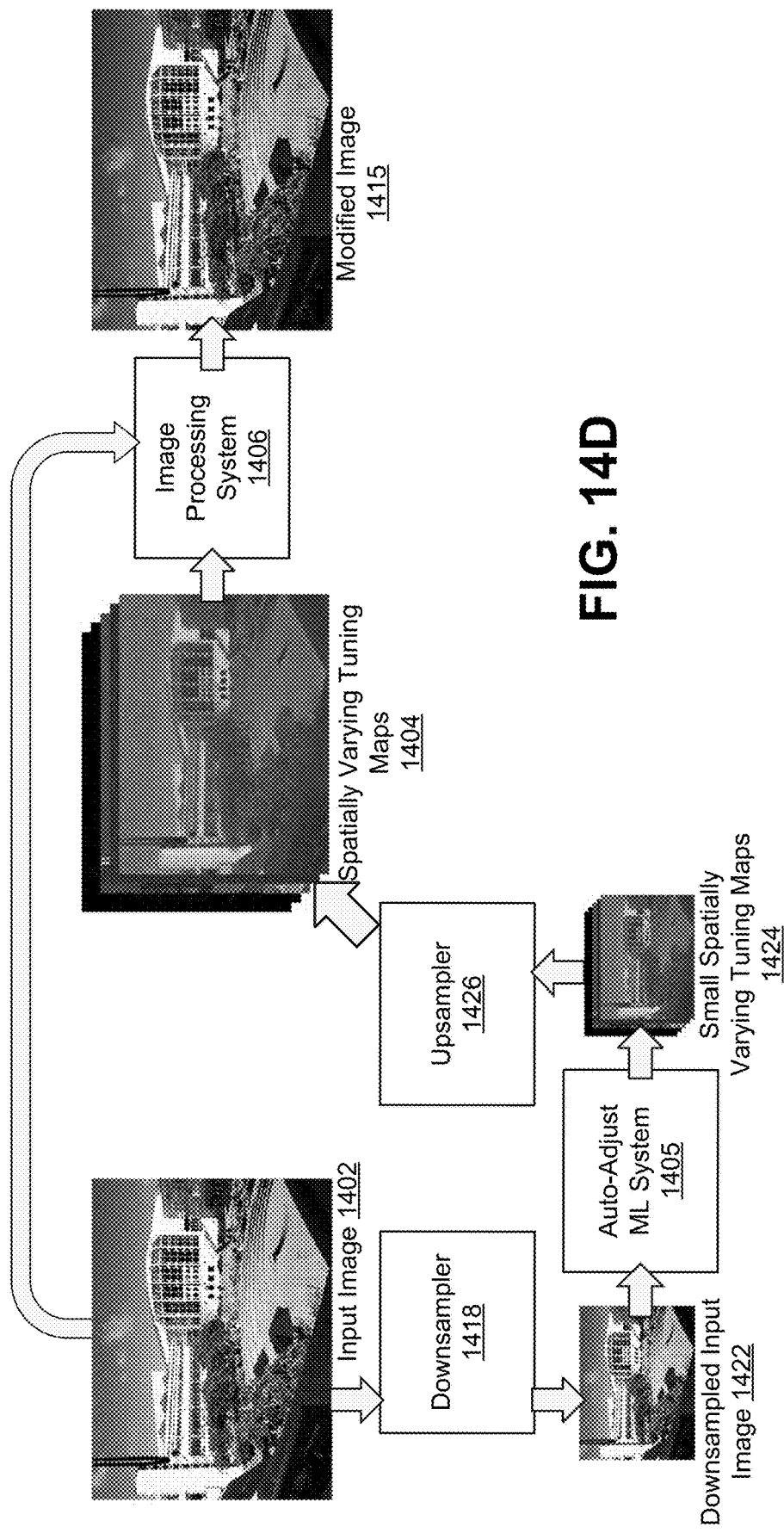
FIG. 14D is a conceptual diagram illustrating an example of a system including the image processing system receiving an input image and multiple spatially varying tuning maps, as well as and an auto-adjust machine learning (ML) system receiving a downscaled variant of the input image and generating small spatially varying tuning maps that are upscaled into the multiple spatially varying tuning maps, in accordance with some examples.

FIG. 14D is a conceptual diagram illustrating an example of a system including the image processing system 1406 receiving an input image 1402 and multiple spatially varying tuning maps 1404, as well as and an auto-adjust machine learning (ML) system 1405 receiving a downscaled variant of the input image 1422 and generating small spatially varying tuning maps 1424 that are upscaled into the multiple spatially varying tuning maps 1404, in accordance with some examples. The system of FIG. 14D is similar to the system of FIG. 14B, but includes a downsampler 1418 and an upsampler 1426. The downsampler 1418 downsamples, downscales, or shrinks the input image 1402 to generate the downsampled input image 1422. Rather than receiving the input image 1402 as input as in FIG. 14B, the auto-adjust machine learning (ML) system 1405 receives the downsampled input image 1422 as input in FIG. 14D. The auto-adjust machine learning (ML) system 1405 generates the small spatially varying tuning maps 1424, which may each share the same size and/or dimensions as the downsampled input image 1422. The upsampler 1426 can upsample, upscale, and/or enlarge the small spatially varying tuning maps 1424 to generate the spatially varying tuning maps 1404. In some examples, the upsampler 1426 can perform bilinear upsampling. The spatially varying tuning maps 1404 may in turn be received by the image processing system 1406 as inputs, alongside the input image 1402.

Because the downsampled input image 1422 has a smaller size and/or resolution compared to the input image 1402, it may be quicker, more efficient (in terms of computational resources, bandwidth, and/or battery power) for the auto-adjust machine learning (ML) system 1405 to generate the small spatially varying tuning maps 1424 from the downsampled input image 1422, along with the downsampling performed by the downsampler 1418 and/or the upsampling performed by the upsampler 1426 as in FIG. 14D, than for the auto-adjust machine learning (ML) system 1405 to generate the spatially varying tuning maps 1404 directly from the input image 1402 as in FIG. 14B.

As described above, the image processing system 1406, the image processing ML system 210, and/or the auto-adjust machine learning (ML) system 1405 can include one or more neural networks that can be trained using supervised learning techniques.

Figure 15:
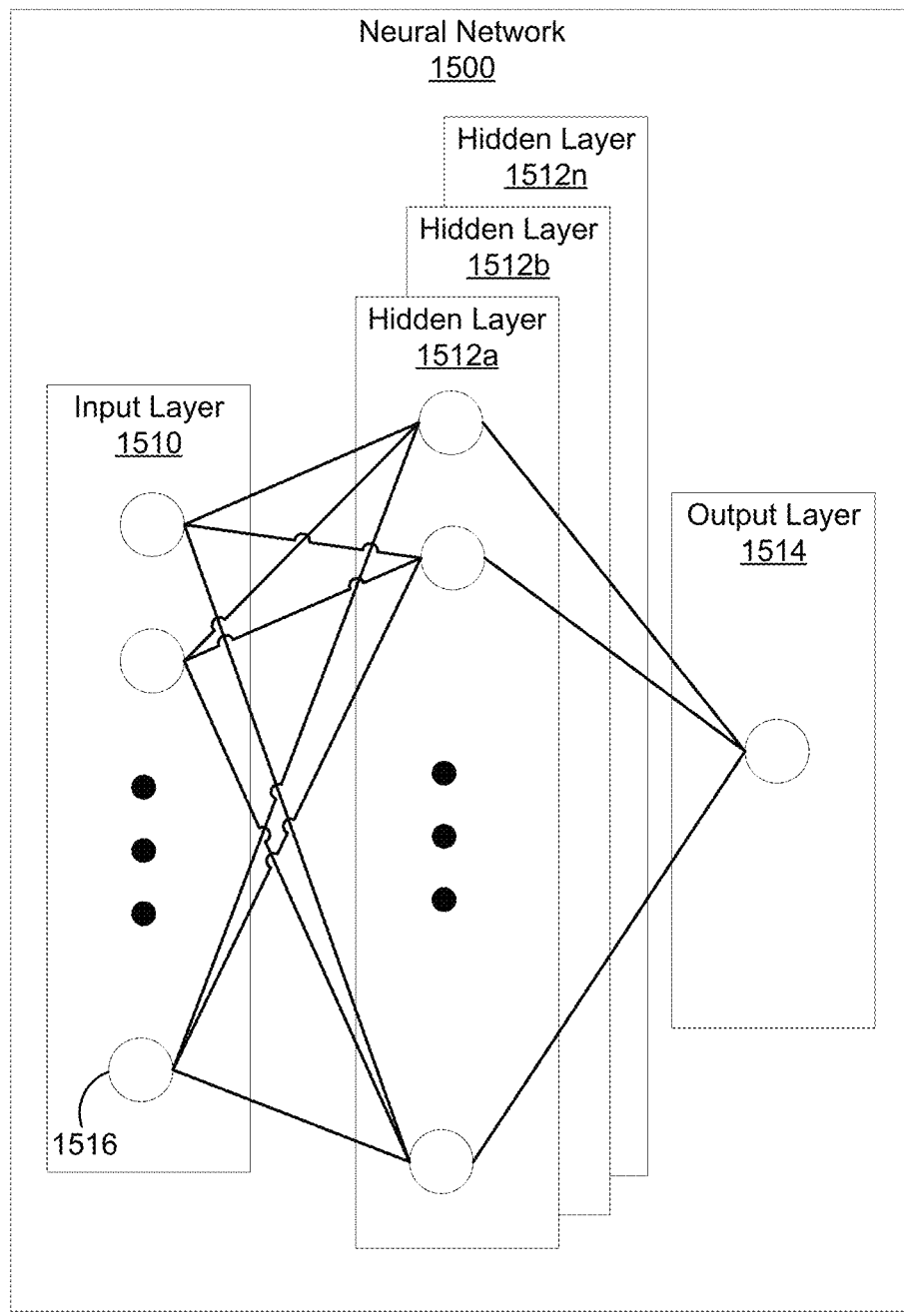
FIG. 15 is a block diagram illustrating an example of a neural network that can be used by the image processing system and/or the auto-adjust machine learning (ML) system, in accordance with some examples.

FIG. 15 is block diagram 1600A illustrating an example of a neural network 1500 that can be used by the image processing system 1406 and/or the auto-adjust machine learning (ML) system 1405, in accordance with some examples. The neural network 1500 can include any type of deep network, such as a convolutional neural network (CNN), an autoencoder, a deep belief nets (DBNs), a Recurrent Neural Networks (RNNs), a Generative Adversarial Networks (GANs), and/or other type of neural network.

An input layer 1510 of the neural network 1500 includes input data. The input data of the input layer 1510 can include data representing the pixels of an input image frame. In an illustrative example, the input data of the input layer 1510 can include data representing the pixels of the input image 1402 and/or the downsampled input image 1422 of FIGS. 14A-14D (e.g., for an NN 1500 of the auto-adjust ML system 1405 and/or of the image processing system 1406). In an illustrative example, the input data of the input layer 1510 can include data representing the pixels of the spatially varying tuning maps 1404 of FIGS. 14A-14D (e.g., for an NN 1500 of the auto-adjust ML system 1405). The images can include image data from an image sensor including raw pixel data (including a single color per pixel based, for example, on a Bayer filter) or processed pixel values (e.g., RGB pixels of an RGB image). The neural network 1500 includes multiple hidden layers 1512a, 1512b, through 1512n. The hidden layers 1512a, 1512b, through 1512n include "n" number of hidden layers, where "n" is an integer greater than or equal to one. The number of hidden layers can be made to include as many layers as needed for the given application. The neural network 1500 further includes an output layer 1514 that provides an output resulting from the processing performed by the hidden layers 1512a, 1512b, through 1512n. In an illustrative example, the output layer 1514 can provide a modified image, such as the modified image 215 of FIG. 2 or the modified image 1415 of FIGS. 14A-14D (e.g., for an NN 1500 of the image processing system 1406 and/or image processing ML system 210). In an illustrative example, the output layer 1514 can provide spatially varying tuning maps 1404 of FIGS. 14A-14D and/or the small spatially varying tuning maps 1424 of FIG. 14D (e.g., for an NN 1500 of the auto-adjust ML system 1405).

The neural network 1500 is a multi-layer neural network of interconnected filters. Each filter can be trained to learn a feature representative of the input data. Information associated with the filters is shared among the different layers and each layer retains information as information is processed. In some cases, the neural network 1500 can include a feed-forward network, in which case there are no feedback connections where outputs of the network are fed back into itself. In some cases, the network 1500 can include a recurrent neural network, which can have loops that allow information to be carried across nodes while reading in input.

In some cases, information can be exchanged between the layers through node-to-node interconnections between the various layers. In some cases, the network can include a convolutional neural network, which may not link every node in one layer to every other node in the next layer. In networks where information is exchanged between layers, nodes of the input layer 1510 can activate a set of nodes in the first hidden layer 1512a. For example, as shown, each of the input nodes of the input layer 1510 can be connected to each of the nodes of the first hidden layer 1512a. The nodes of a hidden layer can transform the information of each input node by applying activation functions (e.g., filters) to these information. The information derived from the transformation can then be passed to and can activate the nodes of the next hidden layer 1512b, which can perform their own designated functions. Example functions include convolutional functions, downscaling, upscaling, data transformation, and/or any other suitable functions. The output of the hidden layer 1512b can then activate nodes of the next hidden layer, and so on. The output of the last hidden layer 1512n can activate one or more nodes of the output layer 1514, which provides a processed output image. In some cases, while nodes (e.g., node 1516) in the neural network 1500 are shown as having multiple output lines, a node has a single output and all lines shown as being output from a node represent the same output value.

In some cases, each node or interconnection between nodes can have a weight that is a set of parameters derived from the training of the neural network 1500. For example, an interconnection between nodes can represent a piece of information learned about the interconnected nodes. The interconnection can have a tunable numeric weight that can be tuned (e.g., based on a training dataset), allowing the neural network 1500 to be adaptive to inputs and able to learn as more and more data is processed.

The neural network 1500 is pre-trained to process the features from the data in the input layer 1510 using the different hidden layers 1512a, 1512b, through 1512n in order to provide the output through the output layer 1514.

Figure 16A:
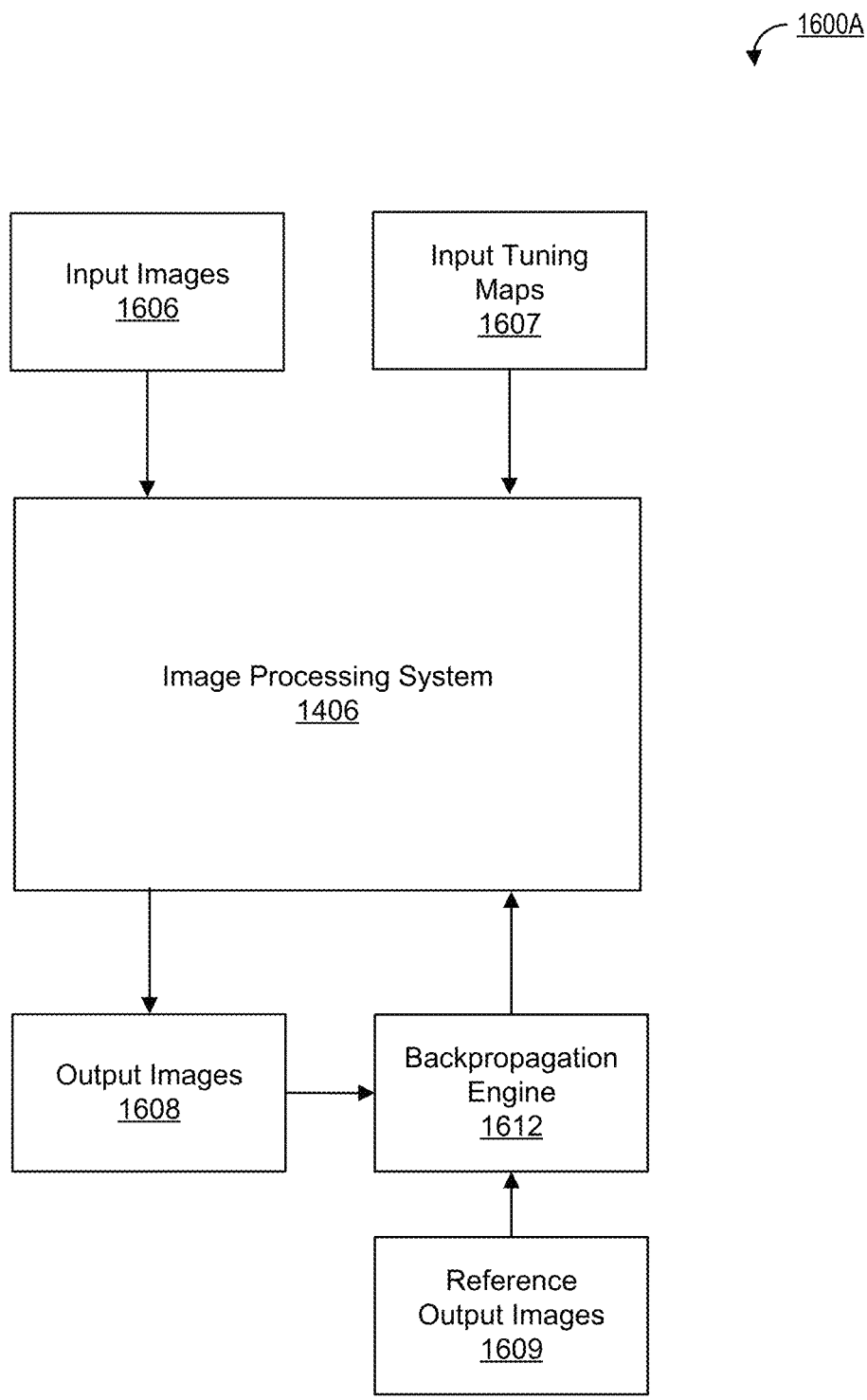
FIG. 16A is a block diagram illustrating an example of training of the image processing system (e.g., image processing ML system), in accordance with some examples.

FIG. 16A is a block diagram 1600B illustrating an example of training of the image processing system 1406 (e.g., image processing ML system 210), in accordance with some examples. Referring to FIG. 16A, a neural network (e.g., neural network 1500) implemented by the image processing system 1406 (e.g., the image processing ML system 210) can be pre-trained to process input images and tuning maps. As shown in FIG. 16A, the training data includes input images 1606 and input tuning maps 1607. The input image 1402 may be an example of the input images 1606. The spatially varying tuning maps may be examples of the input tuning maps 1607. The input images 1606 and the input tuning maps 1607 can be input into the neural network (e.g., neural network 1500) of the image processing ML system 210, and the neural network can generate output images 1608. The modified image 1415 may be an example of the output images 1608. For example, a single input image and a number of tuning maps (e.g., one or more of the noise map, the sharpness map, the tone map, the saturation map, and/or the hue map discussed above, and/or another other map associated with an image processing function) can be input to the neural network, and the neural network can output an output image. In another example, a batch of input images and a number of corresponding tuning maps can be input to the neural network, which can then generate a number of output images.

A set of reference output images 1609 can also be provided for comparing to the output images 1608 of the image processing system 1406 (e.g., the image processing ML system 210) for determining the loss (described below). A reference output image can be provided for each input image of the input images 1606. For instance, an output image from the reference output images 1609 can include a final output image that has previously been generated by camera system and that has the characteristics that are desired for the corresponding input image based on a number of tuning maps from the input tuning maps 1607.

Parameters of the neural network can be tuned based on a comparison of the output images 1608 and the reference output images 1609 by the backpropagation engine 1612. The parameters can include weights, biases, and/or other parameters of the neural network. In some cases, the neural network (e.g., neural network 1500) can adjust the weights of the nodes using a training process called backpropagation. Backpropagation can include a forward pass, a loss function, a backward pass, and a weight update. The forward pass, loss function, backward pass, and parameter update is performed for one training iteration. The process can be repeated for a certain number of iterations for each set of training images until the neural network is trained well enough so that the weights of the layers are accurately tuned. Once the neural network is properly trained, the image processing system 1406 (e.g., the image processing ML system 210) can process any input image and number of tuning maps to generate an modified version of the input image based on the tuning maps.

The forward pass can include passing through the neural network an input image (or a batch of input images) and a number of tuning maps (e.g., one or more of the noise map, the sharpness map, the tone map, the saturation map, and/or the hue map discussed above). The weights of the various filters of the hidden layers can be initially randomized before the neural network is trained. The input image can include a multi-dimensional array of numbers representing the image pixels of the image. In one example, the array can include a 128×128×11 array of numbers with 128 rows and 128 columns of pixel locations and 11 input values per pixel location.

For a first training iteration for the neural network, the output may include values that do not give preference to any particular feature or node due to the weights being randomly selected at initialization. For example, if the output is an array with numerous color components per pixel location, the output image may depict an inaccurate color representation of the input. With the initial weights, the neural network is unable to determine low level features and thus cannot make an accurate determination of what the color values might be. A loss function can be used to analyze error in the output. Any suitable loss function definition can be used. One example of a loss function includes a mean squared error (MSE). The MSE is defined as $$E_{total} = \sum \frac{1}{n}(\text{target} - \text{outout})^2,$$

which calculates the mean or average of the squared differences (the actual answer minus the predicted (output) answer, squared). The term n is the number of values in the sum. The loss can be set to be equal to the value of $E_{total}$.

The loss (or error) will be high for the first training data (image data and corresponding tuning maps) since the actual values will be much different than the predicted output. The goal of training is to minimize the amount of loss so that the predicted output is the same as the training label. The neural network can perform a backward pass by determining which inputs (weights) most contributed to the loss of the network, and can adjust the weights so that the loss decreases and is eventually minimized. In some cases, a derivative (or other suitable function) of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as $$w = w_i - \eta \frac{dL}{dW},$$

where w denotes a weight, $w_i$ denotes the initial weight, and η denotes a learning rate. The learning rate can be set to any suitable value, with a high learning rate including larger weight updates and a lower value indicating smaller weight updates.

Figure 16B:
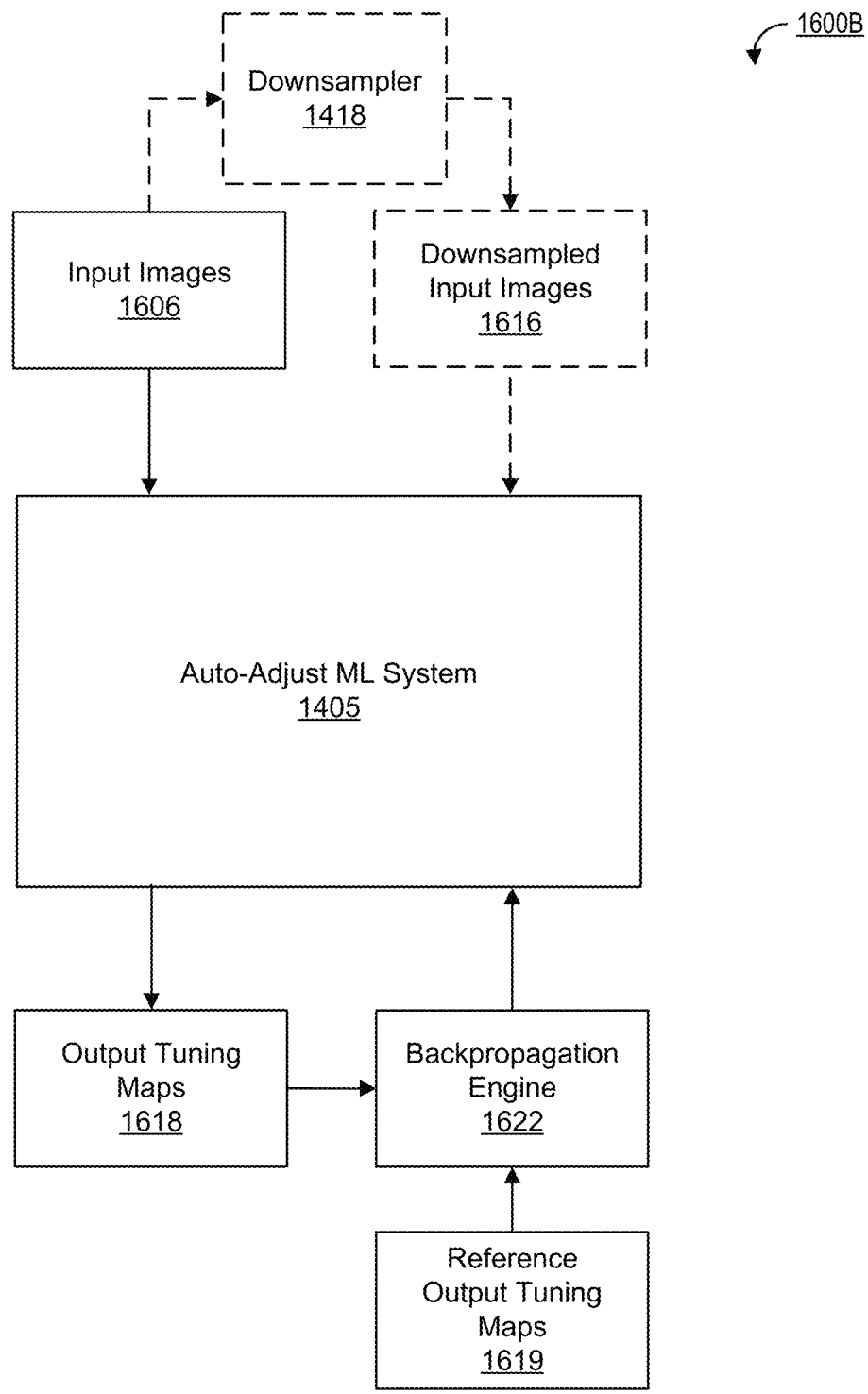
FIG. 16B is a block diagram illustrating an example of training of the auto-adjust machine learning (ML) system, in accordance with some examples.

FIG. 16B is a block diagram illustrating an example of training of the auto-adjust machine learning (ML) system 1405, in accordance with some examples. Referring to FIG. 16B, a neural network (e.g., neural network 1500) implemented by the auto-adjust machine learning (ML) system 1405 can be pre-trained to process input images 1606 and/or downsampled input images 1616. As shown in FIG. 16B, the training data includes input images 1606 and/or downsampled input images 1616. The input image 1402 may be an example of the input images 1606. The downsampled input image 1422 may be an example of the downsampled input images 1616. The input images 1606 and/or downsampled input images 1616 can be input into the neural network (e.g., neural network 1500) of the auto-adjust machine learning (ML) system 1405, and the neural network can generate output tuning maps 1618. The spatially varying tuning maps 1404 may be examples of the output tuning maps 1618. The small spatially varying tuning maps 1424 may be examples of the output tuning maps 1618. For example, an input image 1606 can be input to the neural network, and the neural network can output one or more output tuning maps 1618 (e.g., one or more of the noise map, the sharpness map, the tone map, the saturation map, and/or the hue map discussed above, and/or another other map associated with an image processing function). For example, a downsampled input image 1616 can be input to the neural network, and the neural network can output one or more (small) output tuning maps 1618 (e.g., small variants of one or more of the noise map, the sharpness map, the tone map, the saturation map, and/or the hue map discussed above, and/or another other map associated with an image processing function). In another example, a batch of input images 1606 and/or downsampled input images 1616 can be input to the neural network, which can then generate a number of output tuning maps 1618.

Referring to FIG. 16B, a neural network (e.g., neural network 1500) implemented by the auto-adjust machine learning (ML) system 1405 can include a backpropagation engine 1622 similar to the backpropagation engine 1612 of FIG. 16A. The backpropagation engine 1622 of FIG. 16B can receive and use reference output tuning maps 1619 in a similar manner to how the backpropagation engine 1612 of FIG. 16A receives and uses reference output images 1609.

As noted above, in some implementations, the tuning maps can be automatically generated using a machine learning system that is separate from the image processing ML system 210.

Figure 17:
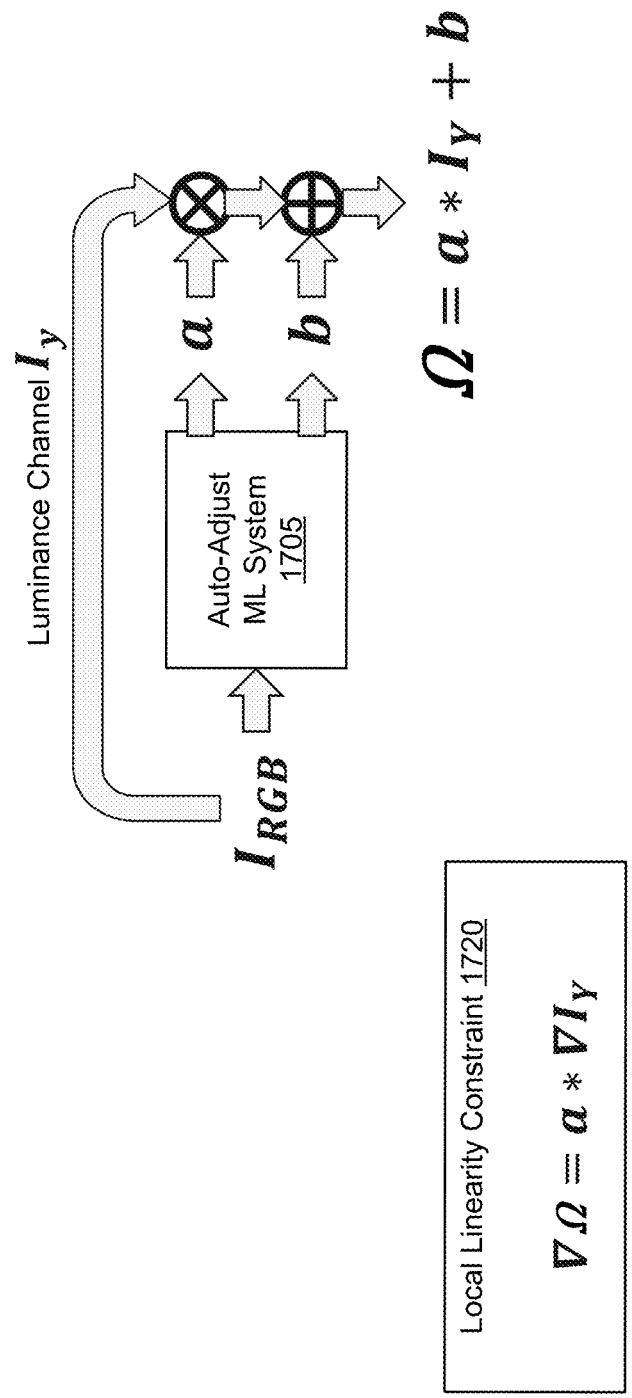
FIG. 17 is a block diagram illustrating an example of a system including an auto-adjust machine learning (ML) system that generates spatially varying tuning maps from luminance channel data by generating affine coefficients that modify the luminance channel data according to a local linearity constraint, in accordance with some examples.

FIG. 17 is a block diagram illustrating an example of a system including the image processing ML system and an auto-adjust machine learning (ML) system 1705 that generates spatially varying tuning maps omega (Ω) from luminance channel data ($I_y$) by generating affine coefficients (a, b) that modify the luminance channel data ($I_y$) according to a local linearity constraint 1720, in accordance with some examples. The auto-adjust machine learning (ML) system 1705 can be implemented using one or more trained support vector machines, one or more trained neural networks, or a combination thereof. The auto-adjust machine learning (ML) system 1705 can receive input image data (such as an input image 1402), indicated in FIG. 17 as $I_{RGB}$. The luminance channel data from the input image data $I_{RGB}$ is referred to as $I_y$. In some examples, the luminance channel data $I_y$ is effectively a greyscale version of the input image data $I_{RGB}$. The auto-adjust ML system 1705 receives the input image data $I_{RGB}$ as an input, and outputs one or more affine coefficients, here indicated as a and b. The one or more affine coefficients include a multiplier a. The one or more affine coefficients include an offset b. The auto-adjust ML system 1705, or another imaging system, can generate a tuning map Ω by applying the affine coefficients to the luminance channel data $I_y$ according to the equation $\Omega = a*I_y + b$. The auto-adjust ML system 1705, or another imaging system, can enforce a local linearity constraint 1720 according to the equation $\nabla\Omega = a*\nabla I_y$. Use of the local linearity constraint 1720 can ensure that one or more gradients in a map align with one or more gradients in the image data, which can reduce halo effects in application of image processing functions. Use of affine coefficients and/or local linearity constraints 1720 for generating maps can produce higher quality spatially varying image modifications than systems that do not use affine coefficients and/or local linearity constraints for generating maps, for instance due to better alignment between the image data and the maps, and reduced halo effects at the boundaries of depicted objects. Each tuning map generated can include its own set of one or more affine coefficients (e.g., a, b). For instance, in the example of FIG. 14C, the auto-adjust ML system 1405 generates five different spatially varying tuning maps 1404 from one input image 1402. Thus, the auto-adjust ML system 1405 of FIG. 14C can generate five sets of one or more affine coefficients (e.g., a, b), one set per each of the five different spatially varying tuning maps 1404. One or more of the affine coefficients (e.g., a and/or b) can also be spatially varying.

The auto-adjust ML system 1705 can be implemented using one or more convolutional neural networks (CNNs), one or more CNNs, one or more trained neural networks (NNs), one or more NNs, one or more trained support vector machines (SVMs), one or more SVMs, one or more trained random forests, one or more random forests, one or more trained decision trees, one or more decision trees, one or more trained gradient boosting algorithms, one or more gradient boosting algorithms, one or more trained regression algorithms, one or more regression algorithms, or a combination thereof. The auto-adjust ML system 1705, and/or any of the machine learning elements listed above (that may be parts of the auto-adjust ML system 1705), can be trained using supervised learning, unsupervised learning, reinforcement learning, deep learning, or a combination thereof.

Figure 18:
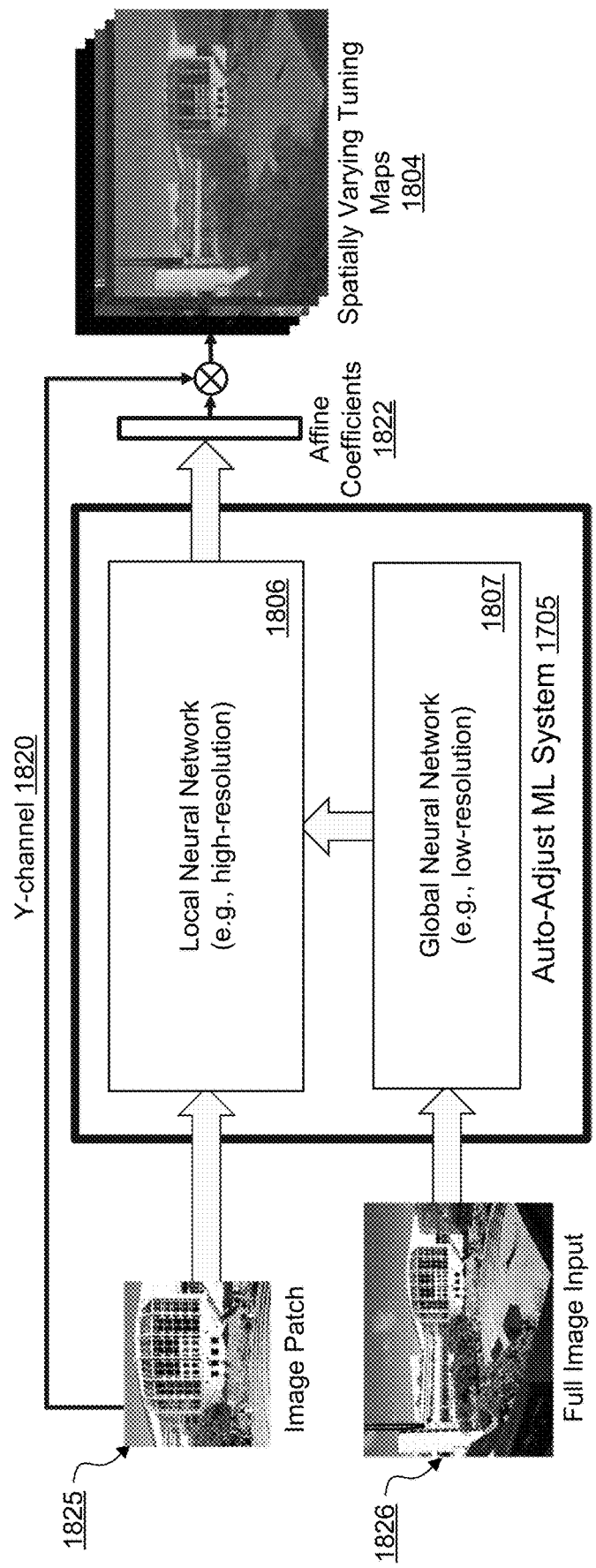
FIG. 18 is a block diagram illustrating an example of details of the auto-adjust ML system, in accordance with some examples.

FIG. 18 is a block diagram illustrating details of the auto-adjust ML system 1705. As shown, the auto-adjust ML system 1705 includes a local neural network 1806 used for patch-wise processing (e.g., processing of image patches of images) and a global neural network 1807 used for processing full images. The local neural network 1806 can receive as input, and can process, an image patch 1825 (that is part of a full image input 1826). The global neural network 1807 can receive as input, and can process, a full image input 1826. The output from the global neural network 1807 can be provided to the local neural network 1806. In some examples, auto-adjust ML system 1705 can output the spatially varying tuning maps 1804. In some examples, the auto-adjust ML system 1705 can output the affine coefficients 1822 (e.g., a, b as in FIG. 17), which the auto-adjust ML system 1705 can apply to the luminance (Y) channel 1820 to generate the spatially varying tuning maps 1804.

In some examples, for computational efficiency, the global neural network 1807 can be fed one or more downsized low-resolution images (downscaled, downsampled, and/or downsized from full resolution images), and the local neural network 1806 can be fed one or more full resolution or high-resolution image patches, to obtain the corresponding full resolution spatially varying tuning maps. The high resolution image patch (e.g., image patch 1825) and the low resolution full image input (e.g., image input 1826) can be based on the same image (as illustrated in FIG. 18), but the high resolution image patch 1825 is based on a higher resolution version of the low resolution full image input 1826. For example, the low resolution full image input 1826 can be a downscaled version of the higher resolution image from which the high resolution image patch 1825 is extracted. The local NN 1806 can be referred to as a high-resolution NN 1806. The global NN 1807 can be referred to as a low-resolution NN 1807.

The luminance (Y) channel 1820 is illustrated as coming from the image patch 1825, but can come from the full image input 1826. The luminance (Y) channel 1820 can be high resolution or low resolution. The luminance (Y) channel 1820 can include the luminance data for the full image input 1826, it its original high resolution or in the downscaled low resolution. The luminance (Y) channel 1820 can include the luminance data for the image patch 1825, it its original high resolution or in a downscaled low resolution.

Figure 19:
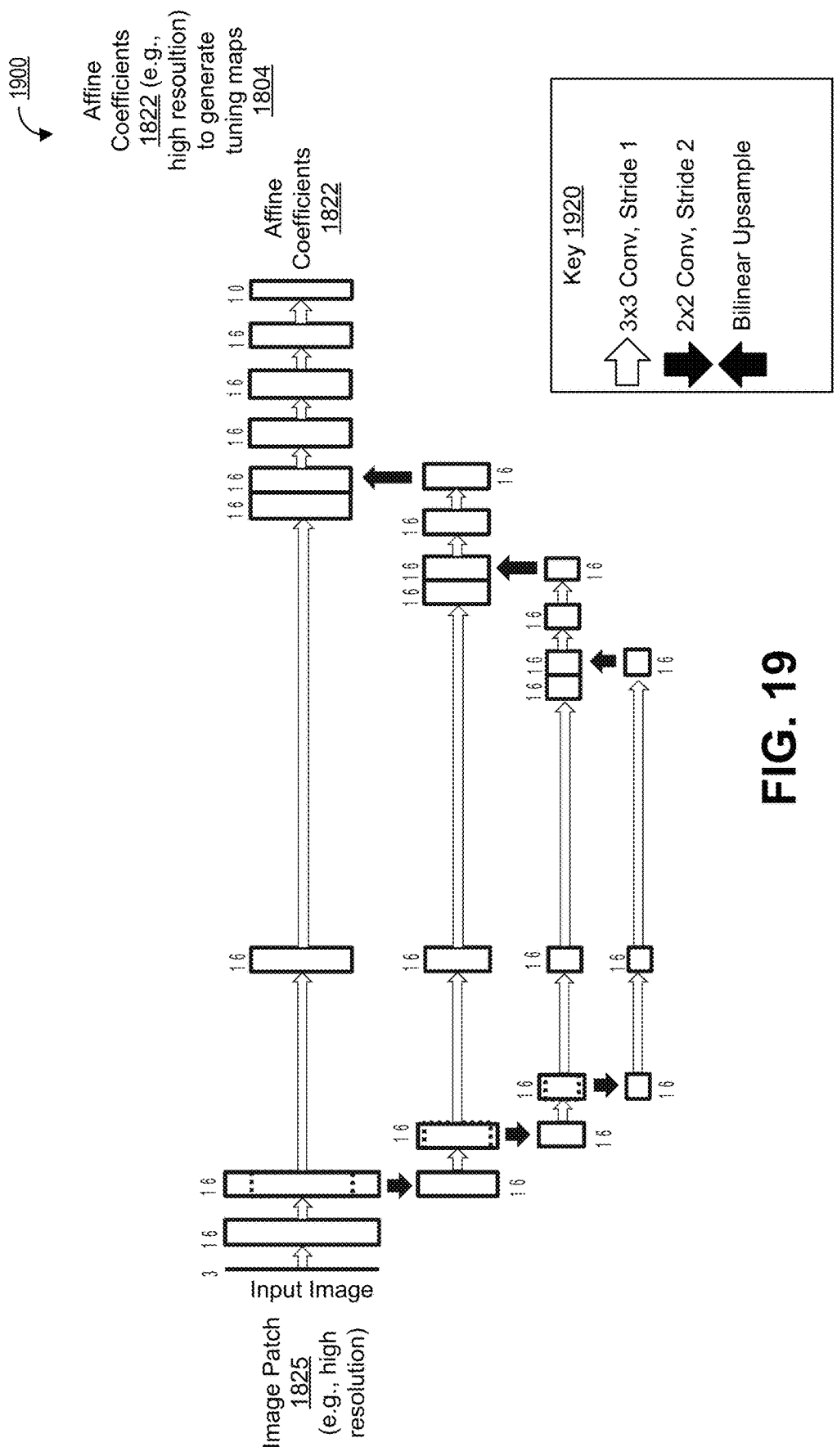
FIG. 19 is a block diagram illustrating an example of a neural network architecture of the local neural network of the auto-adjust ML system, in accordance with some examples.

FIG. 19 is a block diagram illustrating an example of a neural network architecture 1900 of the local neural network 1806 of the auto-adjust ML system 1705. The local neural network 1806 may be referred to as a high-resolution local neural network 1806 or as a high-resolution neural network 1806. The neural network architecture 1900 receives, as its input, an image patch 1825, which may be in high resolution. The neural network architecture 1900 outputs affine coefficients 1822 (e.g., a and/or b as in FIG. 17), which may be in high resolution. The affine coefficients 1822 may be used to generate tuning maps 1804 as indicated in FIGS. 17, 18, 20, 21A, and/or 21B. A key 1920 identifies how different NN operations are illustrated in FIG. 19. For instance, convolutions with 3×3 filters and a stride of 1 are indicated by a thick white arrow outlined in black and pointing to the right. Convolutions with 2×2 filters and a stride of 2 are indicated by a thick black arrow pointing downward. Upsampling (e.g., bilinear upsampling) is indicated by a thick black arrow pointing upward.

Figure 20:
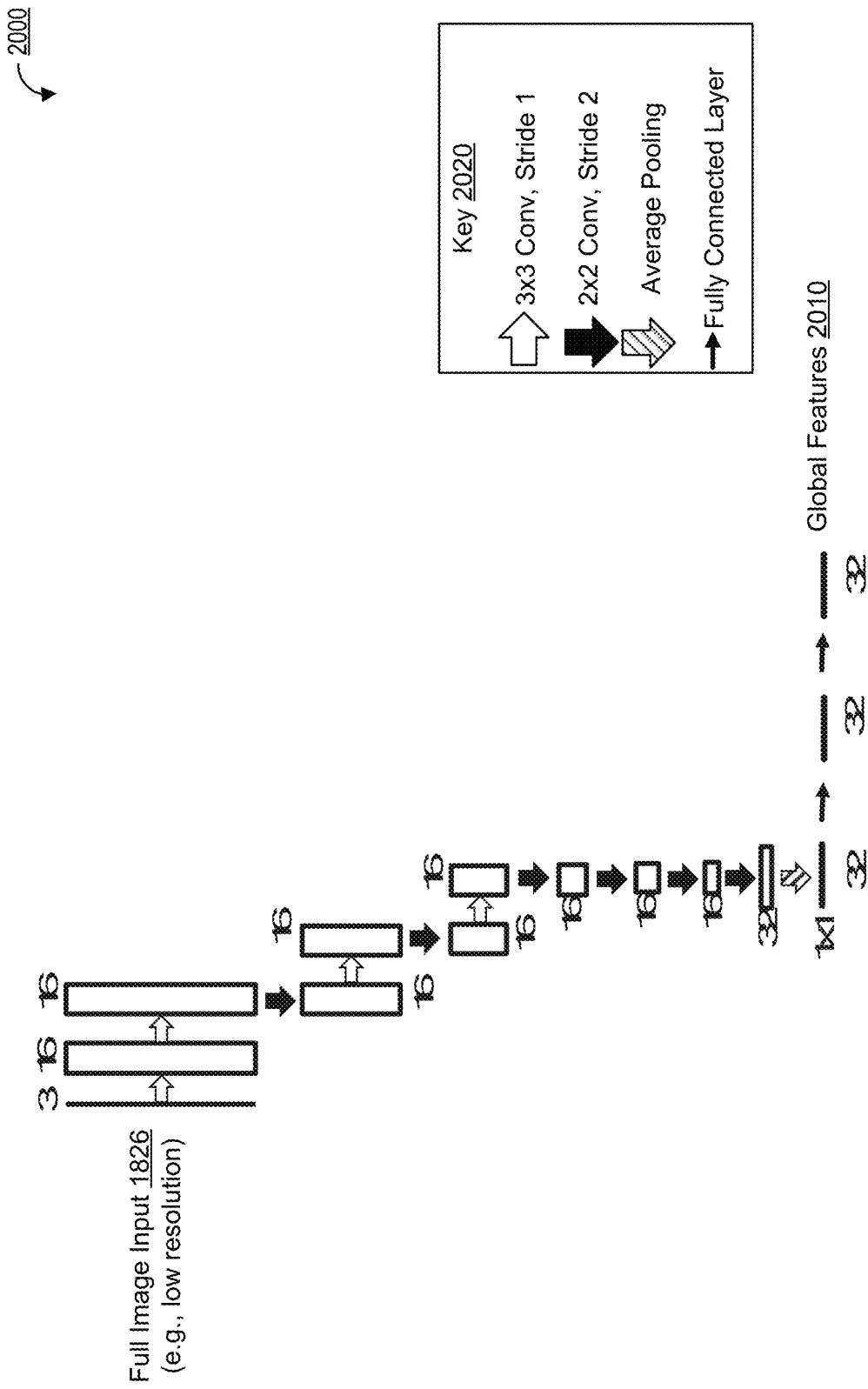
FIG. 20 is a block diagram illustrating an example of a neural network architecture of the global neural network of the auto-adjust ML system, in accordance with some examples.

FIG. 20 is a block diagram illustrating an example of a neural network architecture 2000 of the global neural network 1807 of the auto-adjust ML system 1705. The global neural network 1807 may be referred to as the low-resolution global neural network 1807 or as the low-resolution neural network 1807. The neural network architecture 2000 receives, as its input, the full image input 1826, which may be downsampled and/or may be in low resolution. The neural network architecture 2000 outputs global features 2010, which may be in low resolution. A key 2020 identifies how different NN operations are illustrated in FIG. 20. For instance, convolutions with 3×3 filters and a stride of 1 are indicated by a thick white arrow outlined in black and pointing to the right. Convolutions with 2×2 filters and a stride of 2 are indicated by a thick black arrow pointing downward. Average pooling is indicated by a thick white arrow shaded with diagonal black stripes and outlined in black and pointing downward. Fully connected layers are indicated by thin black arrows pointing to the right.

Figure 21A:
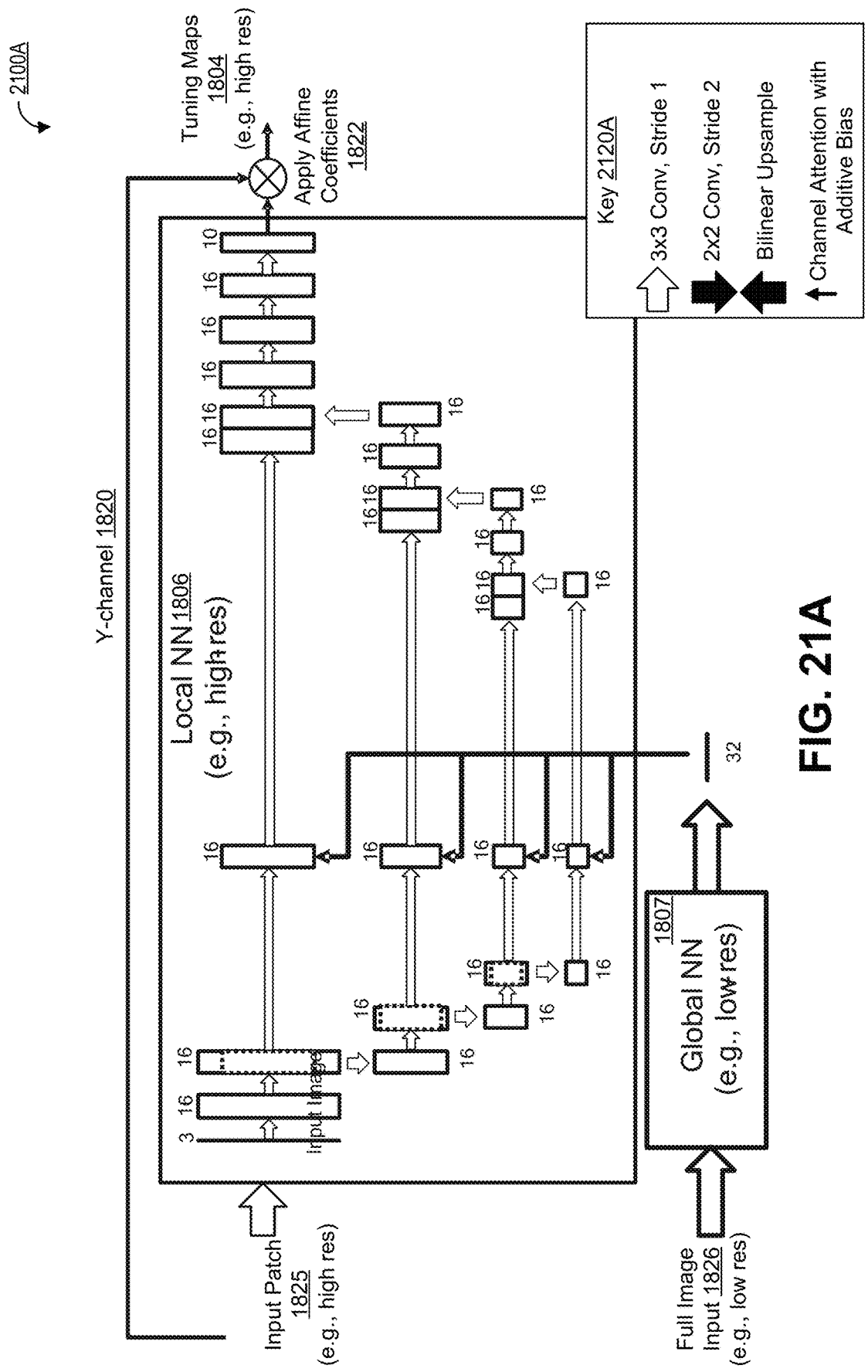
FIG. 21A is a block diagram illustrating an example of a neural network architecture of the auto-adjust ML system, in accordance with some examples.

FIG. 21A is a block diagram illustrating the neural network architecture 2100A of the auto-adjust ML system 1705, in accordance with some examples. The low resolution full images 1826 allow the global NN 1807 of the auto-adjust ML system 1705 to generate global information of the image. The low-resolution global neural network 1807 will process the full image and will determine global features that are important to incorporate when going from the input to the output. By using a reduced resolution image as the global neural network 1807 input, the computation for the global information will be fairly light as compared to if the full resolution image were used. The high resolution patches 1825 allow the auto-adjust network to be locally consistent so there are no discontinuities in local features of the image. The global features can be incorporated into layers (e.g., via channel attention with additive bias) after one or more convolution operations so that the local NN can factor the global features in while generating the affine coefficients 1822 based also on the image patch 1825, and/or while generating the tuning maps 1804 based also on the image patch 1825. As shown in FIG. 21A, the affine coefficients 1822 can be combined with the Y-channel 1820 to generate the tuning maps 1804.

A key 2120A identifies how different NN operations are illustrated in FIG. 21A. For instance, convolutions with 3×3 filters and a stride of 1 are indicated by a thick white arrow outlined in black and pointing to the right. Convolutions with 2×2 filters and a stride of 2 are indicated by a thick black arrow pointing downward. Upsampling (e.g., bilinear upsampling) is indicated by a thick black arrow pointing upward. Channel attention with additive bias is indicated by thin black arrows pointing up and/or to the left (e.g., from the global features determined by the global NN 1807 upward).

Figure 21B:
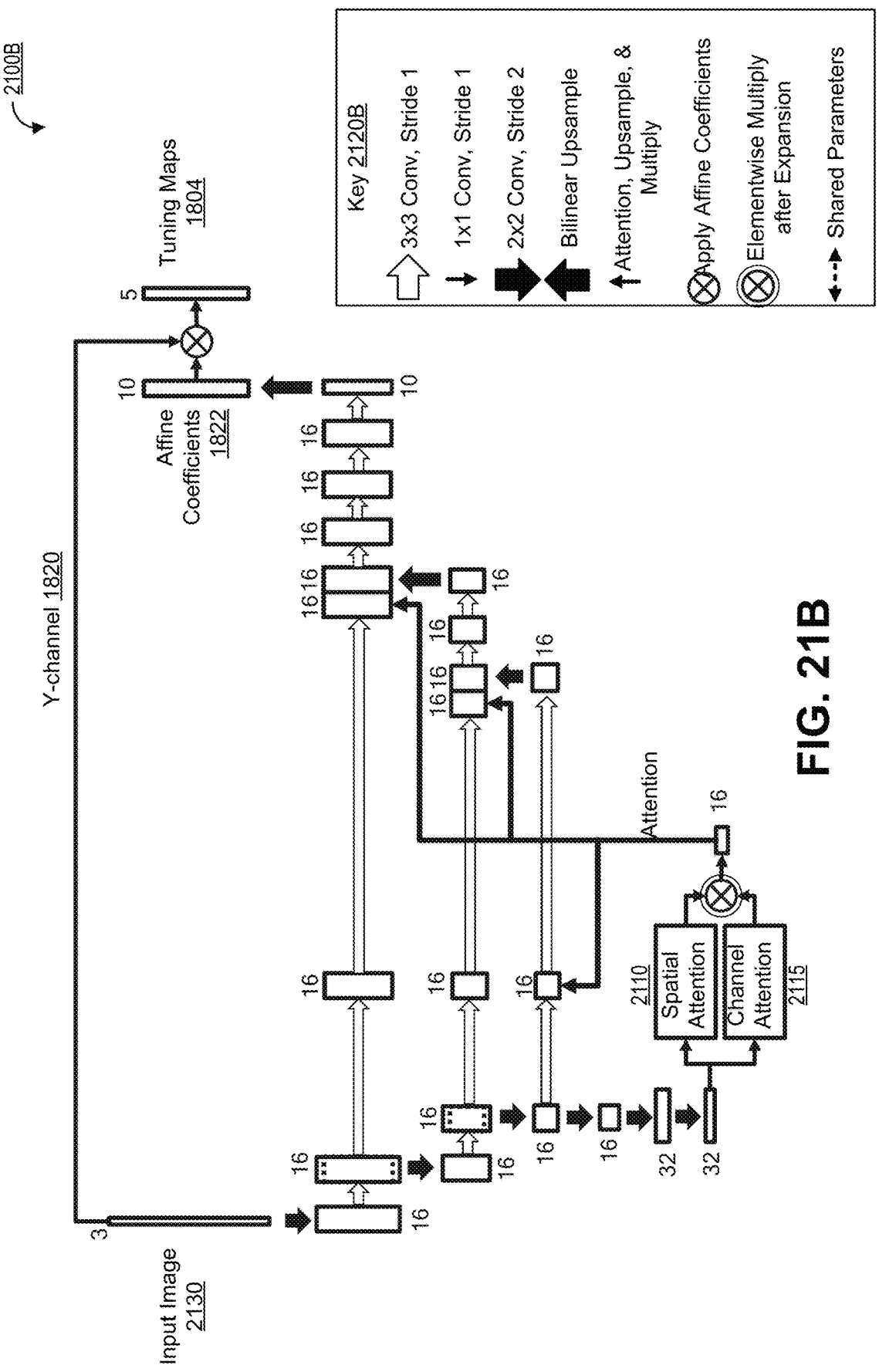
FIG. 21B is a block diagram illustrating another example of a neural network architecture of the auto-adjust ML system, in accordance with some examples.

FIG. 21B is a block diagram illustrating another example of a neural network architecture 2100B of the auto-adjust ML system 1705, in accordance with some examples. An input to the neural network architecture 2100B may be an input image 2130. The input image 2130 may be a high-resolution full image. The input image 2130 may be a full image input 1826, in original high resolution or downscaled low resolution. The input image 2130 may be an image patch 1825, in high resolution or downscaled low resolution. The neural network architecture 2100B may process the input image 2130 to generate the affine coefficients 1822 based on the input image 2130. The neural network architecture 2100B may process the input image 2130 to generate the tuning maps 1804 based on the input image 2130. The affine coefficients 1822 can be combined with the Y-channel 1820 to generate the tuning maps 1804. A spatial attention engine 2110 and a channel attention engine 2115 are part of the neural network architecture 2100B. The spatial attention engine 2110 is illustrated in further detail in FIG. 21C. The channel attention engine 2115 is illustrated in further detail in FIG. 21D.

Figure 21D:
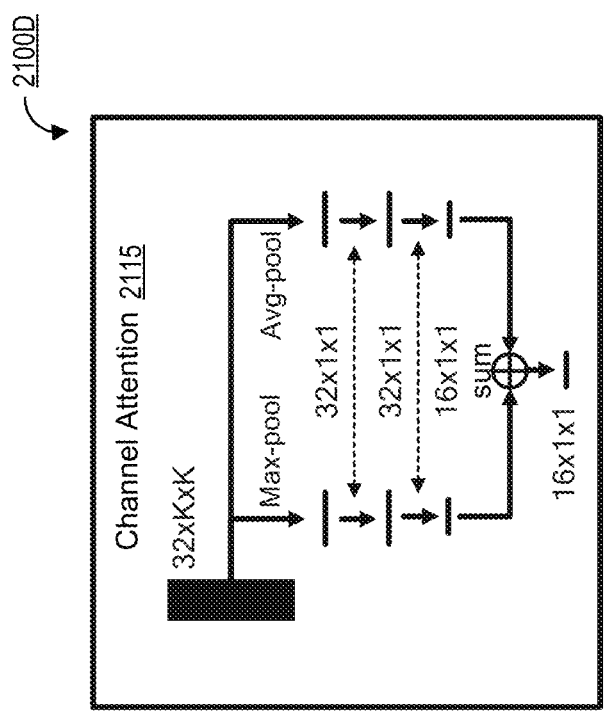
FIG. 21D is a block diagram illustrating an example of a neural network architecture of a channel attention engine, in accordance with some examples.
Figure 21C:
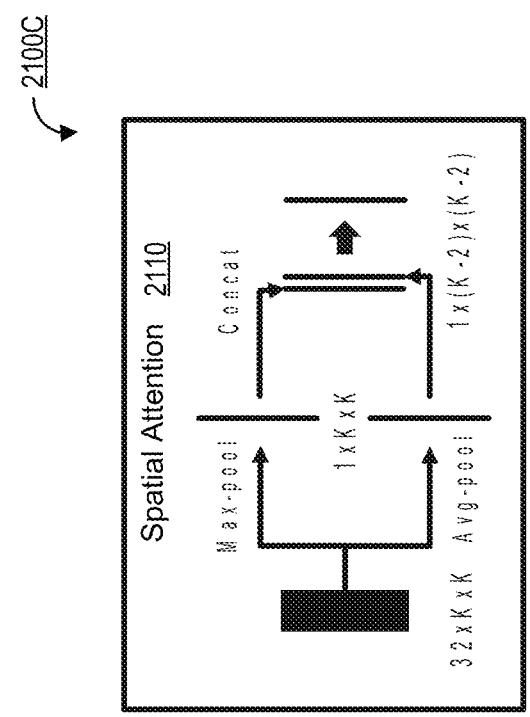
FIG. 21C is a block diagram illustrating an example of a neural network architecture of a spatial attention engine, in accordance with some examples.

A key 2120B identifies how different NN operations are illustrated in FIGS. 21A, 21B, and 21C. For instance, convolutions with 3×3 filters and a stride of 1 are indicated by a thick white arrow outlined in black and pointing to the right. Convolutions with 1×1 filters and a stride of 1 are indicated by a thin black arrow pointing downward. Convolutions with 2×2 filters and a stride of 2 are indicated by a thick black arrow pointing downward. Upsampling (e.g., bilinear upsampling) is indicated by a thick black arrow pointing upward. Operations including attention, upsampling, and multiplication are indicated by a thin black arrow pointing upwards and/or to the sides. A circled "X" symbol indicates application of affine coefficients 1822 to the Y-channel 1820. A double-circled "X" symbol indicates element-wise multiplication after expansion. Thin, dashed black arrows from extending from side to side (in FIG. 21D) indicate shared parameters.

In some examples, the local NN 1808 can generate the tuning maps 1804 directly, without first generating the affine coefficients 1822.

FIG. 21C is a block diagram illustrating an example of a neural network architecture 2100C of a spatial attention engine 2110, in accordance with some examples. The spatial attention engine 2110 includes a max-pooling, an average-pooling, and a concatenation.

FIG. 21D is a block diagram illustrating an example of a neural network architecture 2100D of a channel attention engine 2115, in accordance with some examples. The spatial attention engine 2110 includes a max-pooling, an average-pooling, shared parameters, and a sum.

By using machine-learning to generate affine coefficients 1822 and/or tuning maps 1804, the imaging system provides improved customization and context-sensitivity. The imaging system is able to provide tuning maps that work well for the content of the input image, without producing visual artifacts such as halos. The machine-learning based generation of affine coefficients 1822 and/or tuning maps 1804 can also be more efficient than traditional hand-tuning of image processing parameters. Imaging innovation can also be accelerated based on machine learning based generation of affine coefficients 1822 and/or tuning maps 1804. For example, generation of affine coefficients 1822 and/or tuning maps 1804 using machine learning can allow to more quickly and easily adapt to work in concert with data from additional sensors, different types of lenses, different types of camera arrays, and other changes.

The neural network of the auto-adjust ML system 1705 can be trained using supervised learning techniques, similar to those described above with respect to the image processing ML system 210. For example, backpropagation can be used to tune the parameters of the neural network of the auto-adjust ML system 1705. The training data can include input images and known output images with the characteristics that are desired by applying different tuning maps. For example, based on the input images and output images, the neural network will be trained to generate a set of masks that when applied to the input image gives the corresponding output. Using saturation and tone as illustrative examples, the neural network will try to determine how much of the saturation and tone need to be applied to different pixels of an input image to achieve the characteristics of the pixels in the output image. In such an example, the neural network can generate a saturation map and a tone map based on the training.

The inference procedure of the auto-adjust ML system 1705 (once the neural network has been trained) can be performed by processing an input image to produce the tuning maps 1804. For example, global features can be extracted from a low resolution version of the input image by the global neural network 1807. A single inference can be performed on the low-resolution full image input. A patch-based inference can then be performed using the local neural network 1806, where the global features from the global neural network 1807 are fed into the local network 1806 during inference. The high-resolution patch based inference is then performed on patches of the input image to produce the tuning maps 1804.

In some examples, the image processing ML system 210 (and in some cases the auto-adjust ML system 1705) described above can be used when capturing an image or when processing a previously-captured image. For example, when capturing an image, the image processing ML system 210 can process the image to generate an output image with optimal characteristics (e.g., with respect to noise, sharpness, tone, saturation, hue, etc.) based on the use of the tuning maps. In another example, a stored image that was previously generated can be retrieved and processed by the image processing ML system 210 to generate an enhanced output image with optimal characteristics based on the use of the tuning maps.

In some examples, the image processing ML system 210 (and in some cases the auto-adjust ML system 1705) described above can be used when tuning an ISP. For example, the parameters for an ISP are conventionally tuned manually by an expert with experience in how to process input images for desirable output images. As a result of the correlations between ISP modules (e.g., filters) and the sheer number of tunable parameters, the expert may require several weeks (e.g., 3-8 weeks) to determine, test, and/or adjust device settings for the parameters based on a combination of a specific camera sensor and ISP. Because the camera sensor or other camera features (e.g., lens characteristics or imperfections, aperture size, shutter speed and movement, flash brightness and color, and/or other features) can impact the captured image and therefore at least some of the tunable parameters for the ISP, each combination of camera sensor and ISP may be tuned by an expert.

Figure 22:
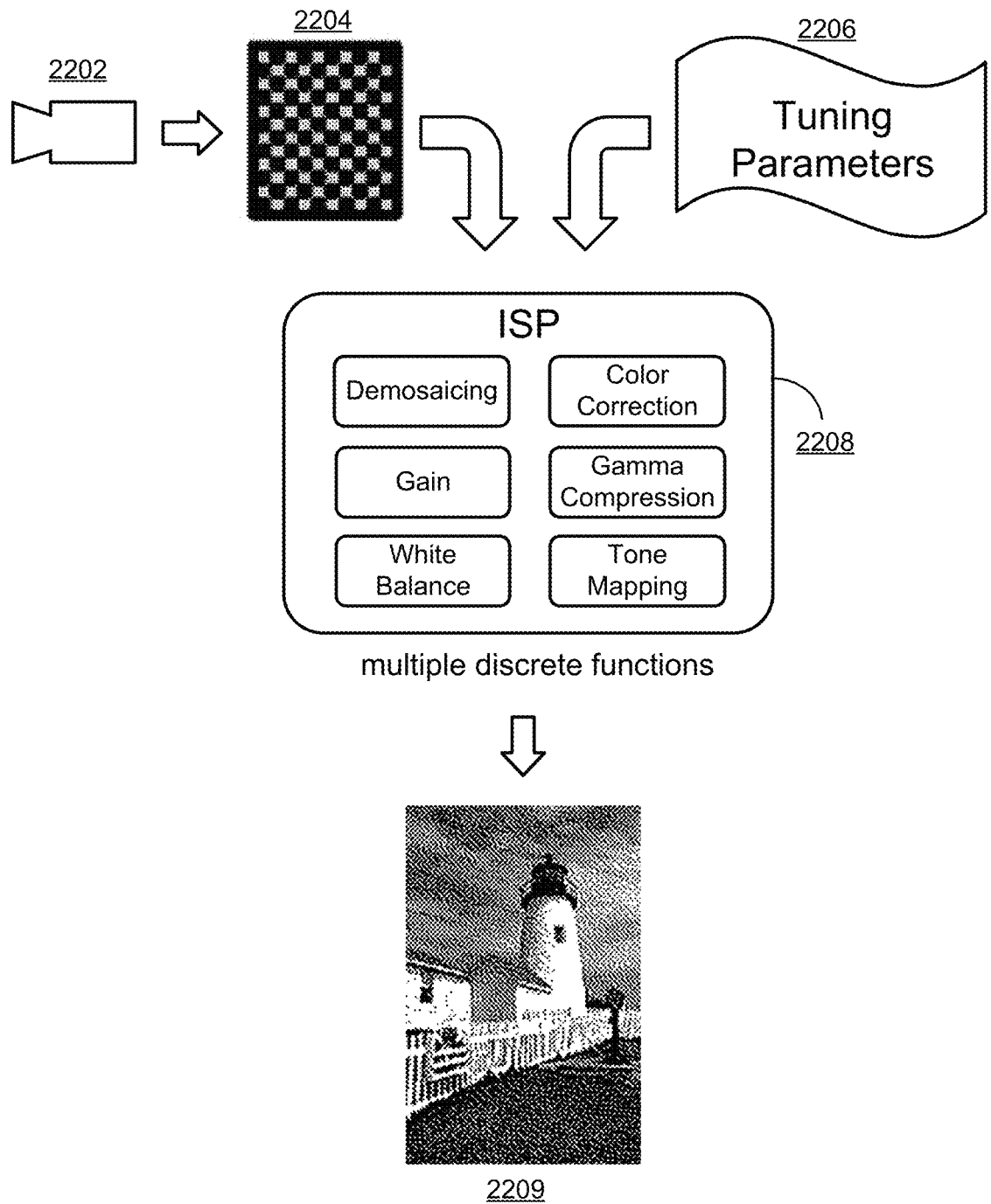
FIG. 22 is a block diagram illustrating an example of a pre-tuned image signal processor (ISP), in accordance with some examples.

FIG. 22 is a block diagram illustrating an example of a pre-tuned image signal processor (ISP) 2208. As shown, an image sensor 2202 captures raw image data. The photodiodes of the image sensor 2202 capture varying shades of gray (or monochrome). A color filter can be applied to the image sensor to provide a color filtered raw input data 2204 (e.g., having a Bayer pattern). The ISP 2208 has discrete functional blocks that each apply a specific operation to the raw camera sensor data to create the final output image. For example, functional blocks can include blocks dedicated for demosaicing, gain, white balance, color correction, Gamma compression (or Gamma correction), tone mapping, noise reduction (denoising), among many others. For example, a demosaicing functional block of the ISP 2208 can assist in generating an output color image 2209 using the color filtered raw input data 2204 by interpolating the color and brightness of pixels using adjacent pixels. This demosaicing process can be used by the ISP 2208 to evaluate the color and brightness data of a given pixel, and to compare those values with the data from neighboring pixels. The ISP 2208 can then use the demosaicing algorithm to produce an appropriate color and brightness value for the pixel. The ISP 2208 can perform various other image processing functions before providing the final output color image 2209, such as noise reduction, sharpening, tone mapping and/or conversion between color spaces, autofocus, gamma, exposure, white balance, among many other possible image processing functions.

The functional blocks of the ISP 2208 require numerous tuning parameters 2206 that are hand-tuned to meet certain specifications. In some cases, over 10,000 parameters need to be tuned and controlled for a given ISP. For example, to optimize the output color image 2209 according to certain specifications, the algorithms for each functional block must be optimized by tuning the tuning parameters 2206 of the algorithms. New functional blocks must also be continuously added to handle different cases that arise in the space. The large number of hand-tuned parameters leads to very time-consuming and expensive support requirements for an ISP.

In some cases, an ISP can be implemented using a machine learning system (referred to as a machine learning ISP) to perform multiple ISP functions in a joint manner.

Figure 23:
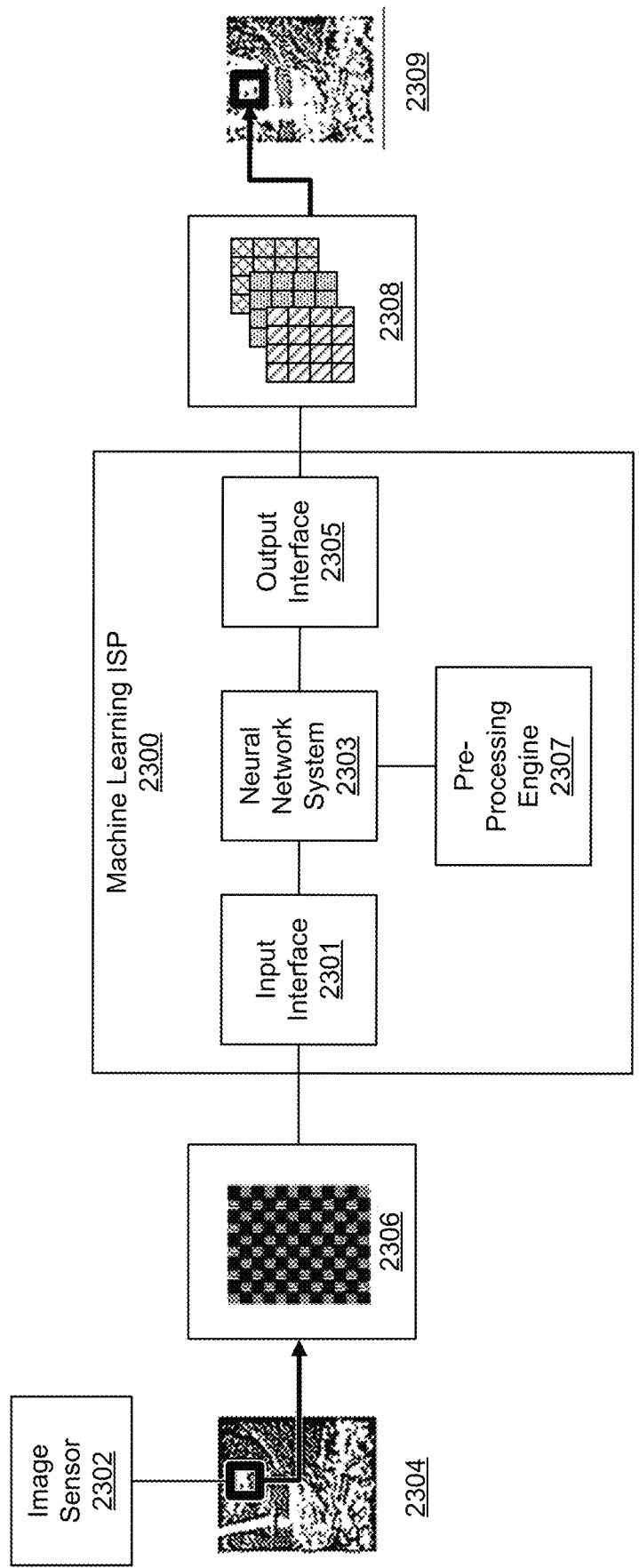
FIG. 23 is a block diagram illustrating an example of a machine learning (ML) image signal processor (ISP), in accordance with some examples.

FIG. 23 is a block diagram illustrating an example of a machine learning (ML) image signal processor (ISP) 2300. The machine learning ISP 2300 can include an input interface 2301 that can receive raw image data from an image sensor 2302. In some cases, the image sensor 2302 includes an array of photodiodes that capture a frame 2304 of raw image data. Each photodiode can represent a pixel location and can generate a pixel value for that pixel location. Raw image data from photodiodes may include a single color or grayscale value for each pixel location in the frame 2304. For example, a color filter array can be integrated with the image sensor 2302 or can be used in conjunction with the image sensor 2302 (e.g., laid over the photodiodes) to convert the monochromatic information to color values.

One illustrative example of a color filter array includes a Bayer pattern color filter array (or Bayer color filter array), allowing the image sensor 2302 to capture a frame of pixels having a Bayer pattern with one of either red, green, or blue filters at each pixel location. For example, the raw image patch 2306 from the frame 2304 of raw image data has a Bayer pattern based on a Bayer color filter array being used with the image sensor 2302. The Bayer pattern includes a red filter, a blue filter, and a green filter, as shown in the pattern of the raw image patch 2306 shown in FIG. 23. The Bayer color filter operates by filtering out incoming light. For example, the photodiodes with the green part of the pattern pass through the green color information (half of the pixels), the photodiodes with the red part of the pattern pass through the red color information (a quarter of the pixels), and the photodiodes with the blue part of the pattern pass through the blue color information (a quarter of the pixels).

In some cases, a device can include multiple image sensors (which can be similar to image sensor 2302), in which case the machine learning ISP operations described herein can be applied to raw image data obtained by the multiple image sensors. For example, a device with multiple cameras can capture image data using the multiple cameras, and the machine learning ISP 2300 can apply ISP operations to the raw image data from the multiple cameras. In one illustrative example, a dual-camera mobile phone, tablet, or other device can be used to capture larger images with wider angles (e.g., with a wider field-of-view (FOV)), capture more amount of light (resulting in more sharpness, clarity, among other benefits), to generate 360-degree (e.g., virtual reality) video, and/or to perform other enhanced functionality than that achieved by a single-camera device.

The raw image patch 2306 is provided to and received by the input interface 2301 for processing by the machine learning ISP 2300. The machine learning ISP 2300 can use a neural network system 2303 for the ISP task. For example, the neural network of the neural network system 2303 can be trained to directly derive the mapping from raw image training data captured by image sensors to final output images. For example, the neural network can be trained using examples of numerous raw data inputs (e.g., with color filtered patterns) and also using examples of the corresponding output images that are desired. Using the training data, the neural network system 2303 can learn a mapping from the raw input that is needed to achieve the output images, after which the ISP 2300 can produce output images similar to those produced by a traditional ISP.

The neural network of the ISP 2300 can include an input layer, multiple hidden layers, and an output layer. The input layer includes the raw image data (e.g., the raw image patch 2306 or a full frame of raw image data) obtained by the image sensor 2302. The hidden layers can include filters that can be applied to the raw image data, and/or to the outputs from previous hidden layers. Each of the filters of the hidden layers can include weights used to indicate an importance of the nodes of the filters. In one illustrative example, a filter can include a 3×3 convolutional filter that is convolved around an input array, with each entry in the 3×3 filter having a unique weight value. At each convolutional iteration (or stride) of the 3×3 filter applied to the input array, a single weighted output feature value can be produced. The neural network can have a series of many hidden layers, with early layers determining low level characteristics of an input, and later layers building up a hierarchy of more complex characteristics. The hidden layers of the neural network of the ISP 2300 are connected with a high-dimensional representation of the data. For example, the layers can include several repetitive blocks of convolutions with a high number of channels (dimensions). In some cases, the number of channels can be an order of magnitude larger than the number of channels in an RGB or YCbCr image. Illustrative examples provided below include repetitive convolutions with 64 channels each, providing a non-linear and hierarchical network structure that produces quality image details. For example, as described in more detail herein, an n-number of channels (e.g., 64 channels) refers to having an n-dimensional (e.g., 64-dimensional) representation of the data at each pixel location. Conceptually, the n-number of channels represents "n-features" (e.g., 64 features) at the pixel location.

The neural network system 2303 achieves the various multiple ISP functions in a joint manner. A particular parameter of the neural network applied by the neural network system 2303 has no explicit analog in a traditional ISP, and, conversely, a particular functional block of a traditional ISP system has no explicit correspondence in the machine learning ISP. For example, the machine learning ISP performs the signal processing functions as a single unit, rather than having individual functional blocks that a typical ISP might contain for performing the various functions. Further details of the neural network applied by the neural network system 2303 are described below.

In some examples, the machine learning ISP 2300 can also include an optional pre-processing engine 2307 that can process additional image tuning parameters to augment the input data. Such additional image tuning parameters (or augmentation data) can include, for example, tone data, radial distance data, auto white balance (AWB) gain data, any combination thereof, and/or any other additional data that can augment the pixels of the input data. By supplementing the raw input pixels, the input becomes a multi-dimensional set of values for each pixel location of the raw image data.

Based on the determined high-level features, the neural network system 2303 can generate an RGB output 2308 based on the raw image patch 2306. The RGB output 2308 includes a red color component, a green color component, and a blue color component per pixel. The RGB color space is used as an example in this application. One of ordinary skill will appreciate that other color spaces can also be used, such as luma and chroma (YCbCr or YUV) color components, or other suitable color components. The RGB output 2308 can be output from the output interface 2305 of the machine learning ISP 2300 and used to generate an image patch in the final output image 2309 (making up the output layer). In some cases, the array of pixels in the RGB output 2308 can include a lesser dimension than that of the input raw image patch 2306. In one illustrative example, the raw image patch 2306 can contain a 128×128 array of raw image pixels (e.g., in a Bayer pattern), while the application of the repetitive convolutional filters of the neural network system 2303 causes the RGB output 2308 to include an 8×8 array of pixels. The output size of the RGB output 2308 being smaller than the raw image patch 2306 is a byproduct of application of the convolutional filters and designing the neural network system 2303 to not pad the data processed through each of the convolutional filters. By having multiple convolutional layers, the output size is reduced more and more. In such cases, the patches from the frame 2304 of input raw image data can be overlapping so that the final output image 2309 contains a complete picture. The resulting final output image 2309 contains processed image data derived from the raw input data by the neural network system 2303. The final output image 2309 can be rendered for display, used for compression (or coding), stored, or used for any other image-based purposes.

Figure 24:
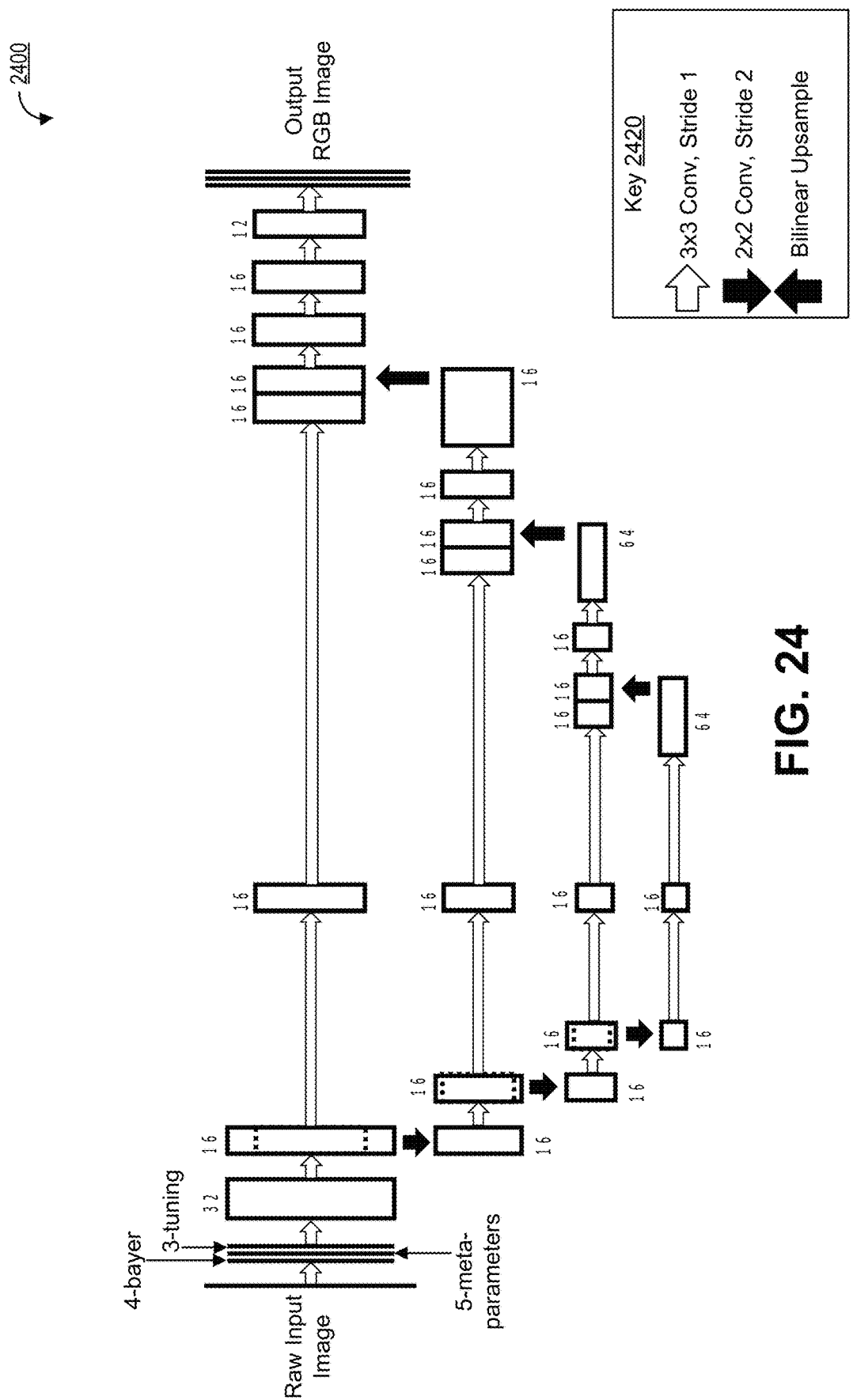
FIG. 24 is a block diagram illustrating an example of a neural network architecture of the machine learning (ML) image signal processor (ISP), in accordance with some examples.

FIG. 24 is a block diagram illustrating an example of a neural network architecture 2400 of the machine learning (ML) image signal processor (ISP) 2300. Pixel shuffle upsampling is an upsampling method where the channel dimension is reshaped along the spatial dimension. In one example using two times (2×) upsampling for illustrative purposes, xxxx (referring to 4 channels×1 spatial location) along 4 channels will be used to generate a single channel with twice the spatial dimension: xx xx (referring to 1 channel×4 spatial locations). An example of pixel shuffle upsampling is described in "Checkerboard artifact free sub-pixel convolution," by Andrew Aitken et al., which is hereby incorporated by reference in its entirety and for all purposes.

By using machine-learning to perform the ISP functions, the ISP becomes customizable. For example, different functionalities can be developed and applied by presenting targeted data examples and changing the network weights through training. The machine learning based ISP can also achieve fast turn-around for updates as compared to hardwired or heuristic-based ISPs. Further, a machine learning based ISP removes the time consuming task of tuning the tuning parameters that are required for pre-tuned ISPs. For example, there is a significant amount of effort and staffing used to manage ISP infrastructures. A holistic development can be used for the machine learning ISP, during which the end-to-end system is directly optimized and created. This holistic development is in contrast to the piece-by-piece development of the functional blocks of pre-tuned ISPs. Imaging innovation can also be accelerated based on the machine learning ISP. For example, a customizable machine learning ISP unlocks many innovation possibilities, allowing developers and engineers to more quickly drive, develop, and adapt solutions to work with novel sensors, lenses, camera arrays, among other advancements.

As noted above, the image processing system 1406 (e.g., the image processing ML system 210) and/or the auto-adjust ML system 1405 described above can be used when tuning a ML ISP and/or a conventional ISP. The various tuning maps described above (e.g. one or more of the noise map, the sharpness map, the tone map, the saturation map, and/or the hue map discussed above, and/or another other map associated with an image processing function) can be used to tune the ISP. The maps can be referred to as tunable knobs when used for tuning an ISP. Examples of tuning maps (or tunable knobs) that can be used to tune an ISP include local tone manipulation (e.g., using the tone map), detail enhancement, color saturation, among others. In some cases, the local tone manipulation can include contrast limited adaptive histogram equalization (CLAHE) (e.g., using OpenCV). In some cases, the detail enhancement can be performed using domain transform for edge-aware filtering (e.g., using OpenCV). In some examples, the color saturation can be performed using the Pillow library. In some implementations, the auto-adjust ML system 1705 can be used to generate the tuning maps or knobs that are used to tune the ISP.

A key 2420 identifies how different NN operations are illustrated in FIG. 21A. For instance, convolutions with 3×3 filters and a stride of 1 are indicated by a thick white arrow outlined in black and pointing to the right. Convolutions with 2×2 filters and a stride of 2 are indicated by a thick black arrow pointing downward. Upsampling (e.g., bilinear upsampling) is indicated by a thick black arrow pointing upward.

FIG. 25A is a conceptual diagram illustrating an example of a first tone adjustment strength applied to an example input image to generate a modified image, in accordance with some examples. The tone adjustment strength for the modified image in FIG. 25A is 0.0.

FIG. 25B is a conceptual diagram illustrating an example of a second tone adjustment strength applied to the example input image of FIG. 25A to generate a modified image, in accordance with some examples. The tone adjustment strength for the modified image in FIG. 25A is 0.5.

FIG. 25A and FIG. 25B are images illustrating examples of application of different tone levels by performing CLAHE using an OpenCV implementation. For example, the image can be partitioned into a fixed grid, and a histogram can be clipped at a predefined value before computing a cumulative distribution function (CDF). The clip limit can determine the strength of the local tone manipulation. In the example of FIG. 25A and FIG. 25B, the application includes a maximum clip limit of 0.5. Grid transformations can be interpolated to yield the final result. As shown, the change in tone results in different amounts of luminance adjustment that will be applied to the pixels of images that are processed by an ISP, which can result in images with darker or lighter tones.

FIG. 26A is a conceptual diagram illustrating an example of a first detail adjustment strength applied to the example input image of FIG. 25A to generate a modified image, in accordance with some examples. The detail adjustment (detail enhancement) strength for the modified image in FIG. 26A is 0.0.

FIG. 26B is a conceptual diagram illustrating an example of a second detail adjustment strength applied to the example input image of FIG. 25A to generate a modified image, in accordance with some examples. The detail adjustment (detail enhancement) strength for the modified image in FIG. 26A is 0.5.

FIG. 26A and FIG. 26B are images illustrating examples of application of different detail enhancements using an OpenCV implementation. For example, the detail enhancement can be used for edge preserving smoothing of an original image. The detail can be expressed as described above with respect to the saturation map. For example, image detail can be obtained by subtracting a filtered image (e.g., a smoothed image resulting from the edge-preserving filtering) from the input image. The details can be enhanced in multiple scales. The range sigma can be equal to 0.05 (Range sigma=0.05). As noted above, spatial sigma is a hyper-parameter of a bilateral filter. The spatial sigma can be used to control the strength of the detail enhancement. In some examples, the maximum spatial sigma can be set to 5.0 (Max Spatial Sigma=5.0). FIG. 26A provides an example with spatial sigma equal to 0, while FIG. 26B illustrates an example with spatial sigma equal to the maximum value of 5.0. As shown, the image in FIG. 26B has sharper details and more noise as compared to the image in FIG. 26A.

FIG. 27A is a conceptual diagram illustrating an example of a first color saturation adjustment strength applied to the example input image of FIG. 25A to generate a modified image, in accordance with some examples. The first color saturation value for the modified image in FIG. 27A is 0.0, indicating a maximum color desaturation strength. The modified image in FIG. 27A represents a greyscale version of the example input image of FIG. 25A.

FIG. 27B is a conceptual diagram illustrating an example of a second color saturation adjustment strength applied to the example input image of FIG. 25A to generate a modified image, in accordance with some examples. The second color saturation adjustment strength for the modified image in FIG. 27A is 1.0, indicating no change in saturation (saturation adjustment of zero strength). The modified image in FIG. 27B matches the example input image of FIG. 25A in color saturation.

FIG. 27C is a conceptual diagram illustrating an example of a third color saturation adjustment strength applied to the example input image of FIG. 25A to generate a modified image, in accordance with some examples. The third color saturation value for the modified image in FIG. 27C is 2.0, indicating a maximum color saturation increase strength. The modified image in FIG. 27C represents an overly-saturated version of the example input image of FIG. 25A. To try to indicate the overly-saturated nature of the modified image in FIG. 27C, certain elements are represented more brightly in FIG. 27C compared to FIG. 27A-27B or FIG. 25A.

FIG. 27A, FIG. 27B, and FIG. 27C are images illustrating examples of application of different color saturation adjustments. The image in FIG. 27A illustrates the image when a saturation of 0 is applied, resulting in a grayscale (desaturated) image, similar to that described above with respect to FIG. 9-FIG. 11. The image in FIG. 27B illustrates the image when a saturation of 1.0 is applied, resulting in no change in saturation. The image in FIG. 27C illustrates the image when a saturation of 2.0 is applied, resulting in a highly saturated image.

Figure 28:
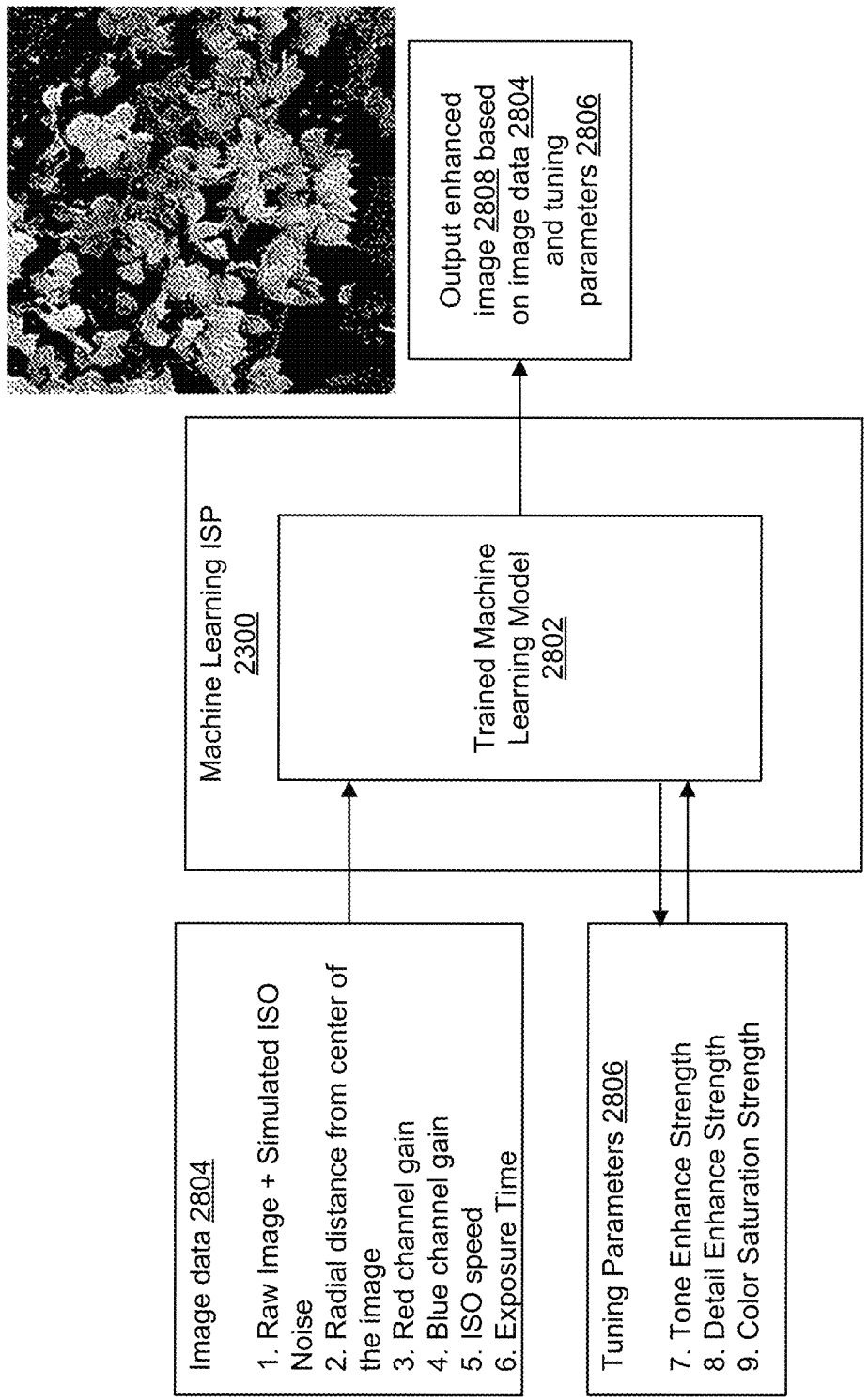
FIG. 28 is a block diagram illustrating an example of an machine learning (ML) image signal processor (ISP) receiving as input various tuning parameters that are used to tune the ML ISP, in accordance with some examples.

FIG. 28 is a block diagram illustrating an example of an machine learning (ML) image signal processor (ISP) receiving as input various tuning parameters (similar to the tuning maps above) that are used to tune the ML ISP 2300. The ML ISP 2300 can be similar to and perform similar operations as the ML ISP 2300 discussed above with respect to FIG. 23. The ML ISP 2300 includes a trained machine learning (ML) model 2802. Based on processing of the parameters, the trained ML model 2802 of the ML ISP 2300 outputs an enhanced image based on the tuning parameters. Image data 2804—including a raw image with simulated ISO noise and a radial distance from the center of the raw image—are provided as input. Tuning parameters 2806 used to capture the raw image include red channel gain, blue channel gain, ISO speed, and exposure time. The tuning parameters 2806 include tone enhance strength, detail enhancement strength, and color saturation strength. The additional tuning parameters 2806 are similar to the tuning maps discussed above, and can be applied at the image level (a single value applied to the entire image) or at the pixel level (different values for each pixel in the image).

Figure 29:
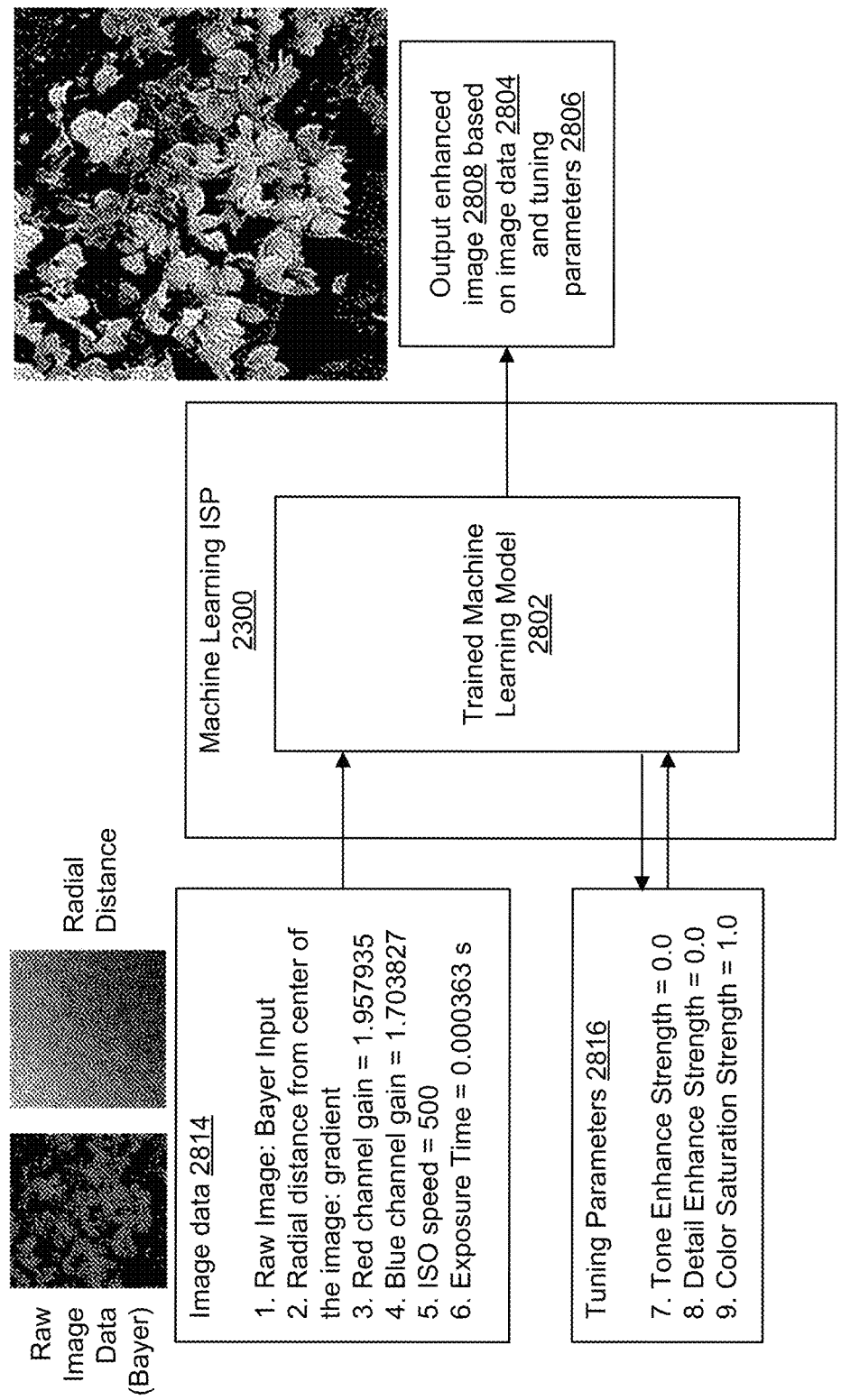
FIG. 29 is a block diagram illustrating examples of specific tuning parameter values that can be provided to the machine learning (ML) image signal processor (ISP), in accordance with some examples.

FIG. 29 is a block diagram illustrating examples of specific tuning parameter values that can be provided to the machine learning (ML) image signal processor (ISP) ML ISP 2300. An example raw input image is shown along with an image representing the radial distance from the center of the raw image. The raw image data shown may, for example represent image data for only one color channel (e.g. green). For the tuning parameters 2816 used to capture the raw input image, the red gain value is 1.957935, the blue gain value is 1.703827, the ISO speed is 500, and the exposure time is $3.63e^{-04}$. The tuning parameters include a tone strength of 0.0, a detail strength of 0.0, and a saturation strength of 1.0.

Figure 30:
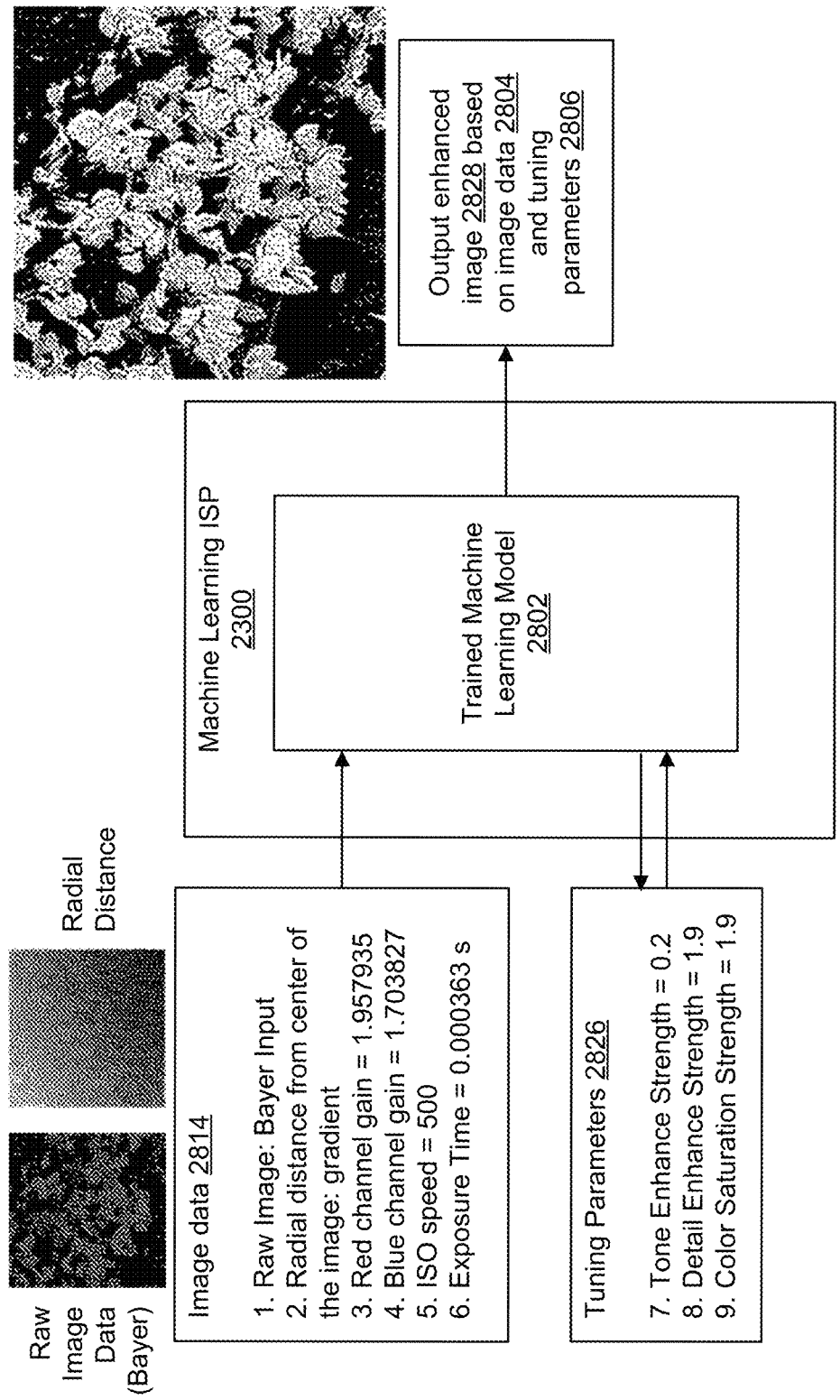
FIG. 30 is a block diagram illustrating additional examples of specific tuning parameter values that can be provided to the machine learning (ML) image signal processor (ISP), in accordance with some examples.

FIG. 30 is a block diagram illustrating additional examples of specific tuning parameter values that can be provided to the machine learning (ML) image signal processor (ISP) ML ISP 2300. The same raw input image, radial distance information, and image capture parameters (red gain, blue gain, ISO speed, and exposure time) as those shown in FIG. 29 are shown in FIG. 30. Different tuning parameters 2826 are provided as compared to the tuning parameters 2816 in FIG. 29. The tuning parameters 2826 include a tone strength of 0.2, a detail strength of 1.9, and a saturation strength of 1.9. The output enhanced image 2828 of FIG. 30 has a different appearance as compared to the output enhanced image 2808 of FIG. 29, based on the difference in tuning parameters. For example, the output enhanced image 2828 of FIG. 30 is highly saturated and has finer details, whereas the enhanced image of FIG. 29 has no saturation effect or detail enhancement. Because FIGS. 28-30 are illustrated in greyscale rather than in color, the red channels of the output enhanced image 2828 and the output enhanced image 2808 are illustrated in FIGS. 28-30 to illustrate changes in red color saturation. Increases in red color saturation appear as brighter areas, while decreases in red color saturation appear as darker areas. Because FIG. 30 shows the red channel of output enhanced image 2828, the brighter flowers in the output enhanced image 2828 (compared to the output enhanced image 2808 and the raw image data) indicate that the red color in the flowers of the output enhanced image 2828 is more saturated.

The trained ML model 2802 of the ML ISP 2300 is trained to process the tuning parameters (e.g., tuning maps or knobs) and generate enhanced or modified output images. The training set up can include a PyTorch Implementation. The network receptive field can be set to 160×160. Training images can include thousands of images captured by one or more devices. Patch-based training can be performed, where patches of input images (as opposed to the entire images) can be provided to the ML ISP 2300 during training. In some examples, an input patch has a size of 320×320 and an output patch generated by the ML ISP 2300 has a size of 160×160. The reduction in size can be based on the convolutional nature of the neural network of the ML ISP 2300 (e.g., where the neural network is implemented as a CNN or other network that uses convolutional filters). In some cases, batches of image patches can be provided to the ML ISP 2300 at each training iteration. In one illustrative example, the batch size can include 128 images. The neural network can be trained until the validation loss stabilizes. A Stochastic Gradient Descent (e.g., an Adam optimizer) can be used in some cases to train the network. A learning rate of 0.0015 can be used in some cases. In some examples, the trained ML model 2802 can be implemented using one or more trained support vector machines, one or more trained neural networks, or a combination thereof.

Figure 31:
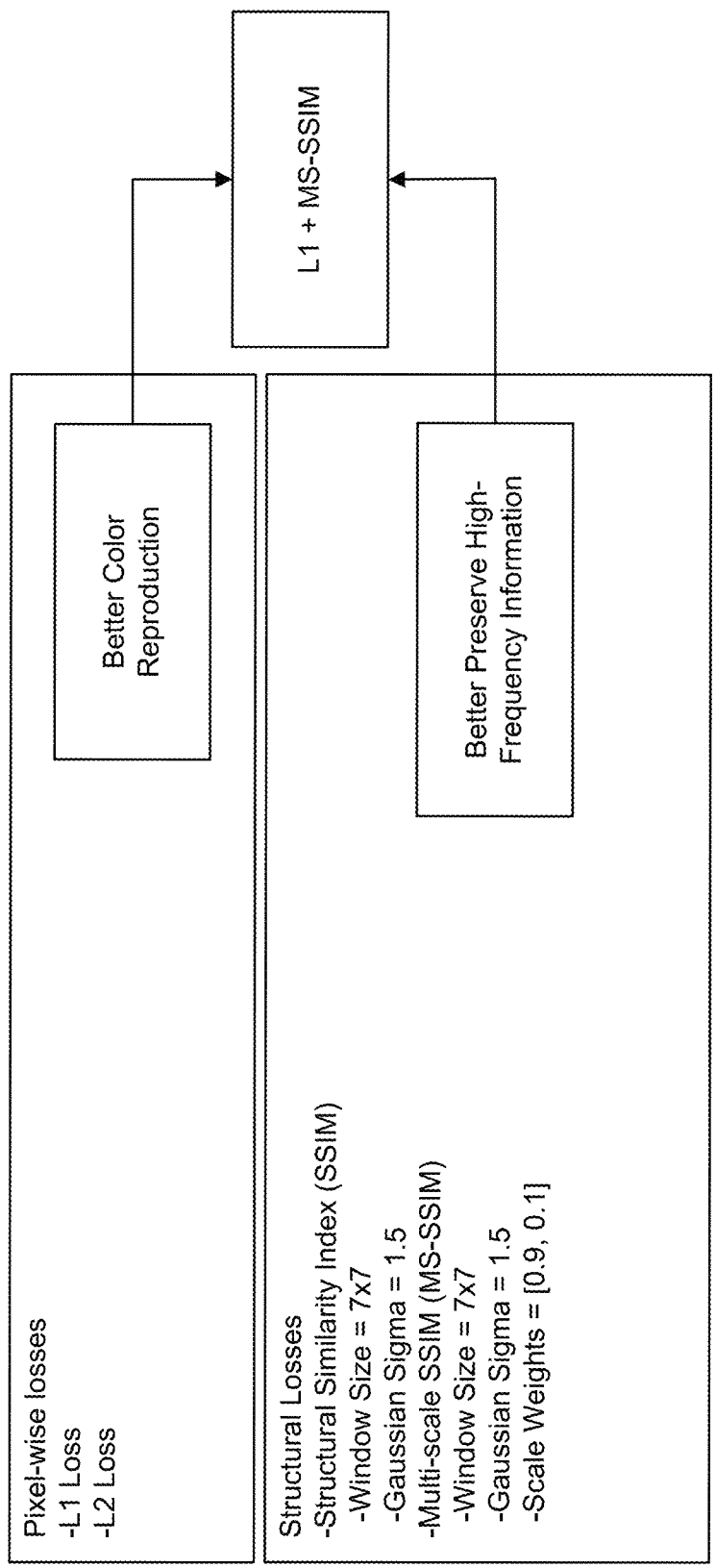
FIG. 31 is a block diagram illustrating an example of an objective function and different losses that can be used during training of the machine learning (ML) image signal processor (ISP), in accordance with some examples.

FIG. 31 is a block diagram illustrating an example of an objective function and different losses that can be used during training of the machine learning (ML) image signal processor (ISP) ML ISP 2300. Pixel-wise losses include L1 loss and L2 loss. The pixel-wise losses can provide better color reproduction for the output images generated by the ML ISP 2300. Structural losses can also be used to train the ML ISP 2300. The structural losses include structural similarity index (SSIM). For the SSIM, a window size of 7×7 and a Gaussian Sigma of 1.5 can be used. Another structural loss that can be used is multi-scale SSIM (MS-SSIM). For the MS-SSIM, a window size of 7×7, a Gaussian Sigma of 1.5, and scale weights of [0.9, 0.1] can be used. The structural losses can be used to better preserve high-frequency information. The pixel-wise losses and structural losses can together be used, such as the L1 loss and MS-SSIM as shown in FIG. 31.

In some examples, the ML ISP 2300 can perform patch-wise model inference after the neural network of the ML ISP 2300 is trained. For example, the input to the neural network can include one or more raw image patches (e.g., having a Bayer pattern) from a frame of raw image data, and the output can include an output RGB patch (or a patch having other color component representations, such as YUV). In one illustrative example, the neural network takes 128×128 pixel raw image patches as input and produces 8×8×3 RGB patches as a final output. Based on the convolutional nature of the various convolutional filters applied by the neural network, many of the pixel locations outside of the 8×8 array from the raw image patch are consumed by the network to generate the final 8×8 output patch. Such a reduction in data from the input to the output is due to the amount of context needed to understand the neighboring information to process a pixel. Having the larger input raw image patch with all the neighboring information and context is helpful for the processing and production of the smaller output RGB patch.

In some examples, based on the reduction in pixel locations from the input to the output, the 128×128 raw image patches are designed so that they are overlapping in the raw input image. In such examples, the 8×8 outputs are not overlapping. For example, for a first 128×128 raw image patch in the upper left corner of the raw image frame, a first 8×8 RGB output patch is produced. A next 128×128 patch in the raw image frame will be 8 pixels to the right of the last 128×128 patch, and thus will be overlapping with the last 128×128 pixel patch. The next 128×128 patch will be processed by the neural network to produce a second 8×8 RGB output patch. The second 8×8 RGB patch will be placed next to the first 8×8 RGB output patch (produced using the previous 128×128 raw image patch) in the full final output image. Such a process can be performed until 8×8 patches that make up a full output image are produced.

Figure 32:
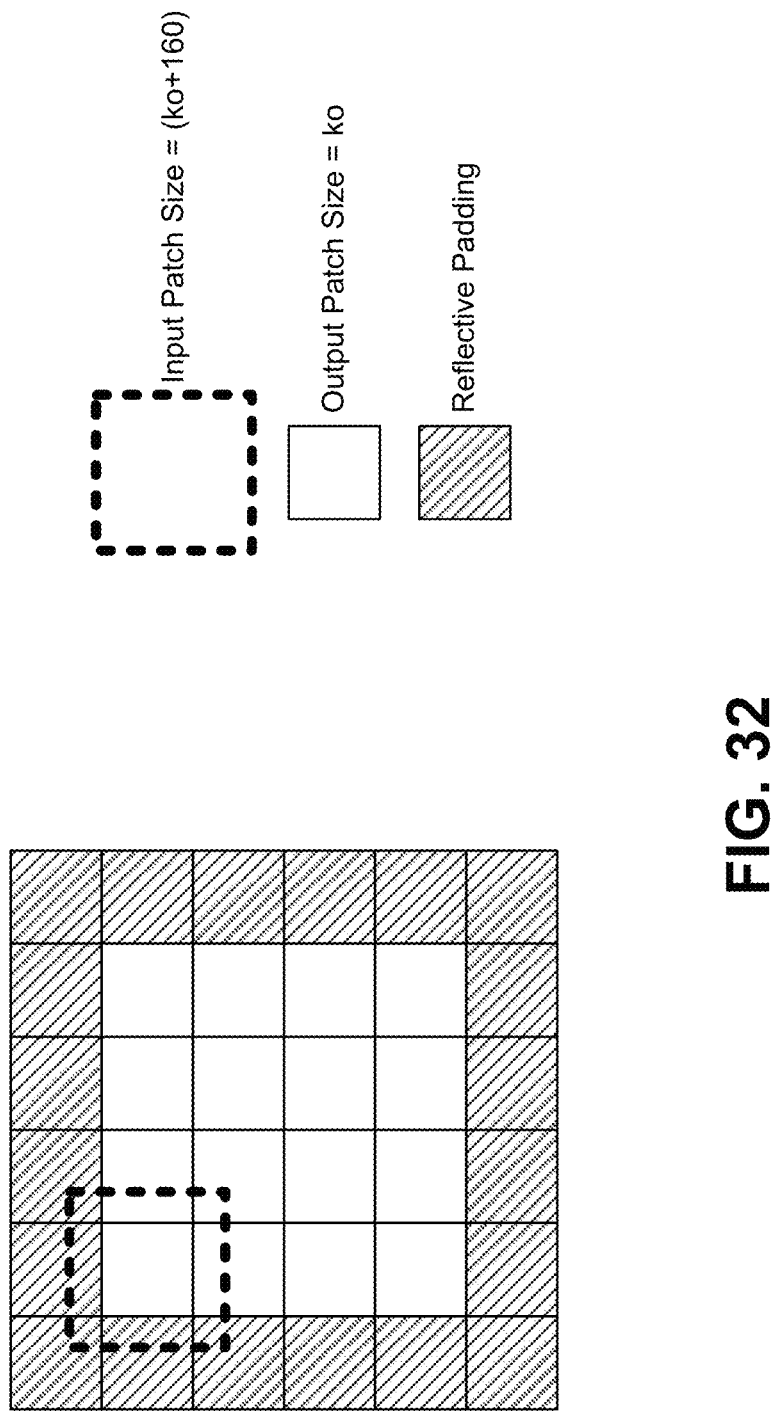
FIG. 32 is a conceptual diagram illustrating an example of patch-wise model inference that results in non-overlapping output patches at a first image location, in accordance with some examples.

FIG. 32 is a conceptual diagram illustrating an example of patch-wise model inference that results in non-overlapping output patches at a first image location, in accordance with some examples.

Figure 33:
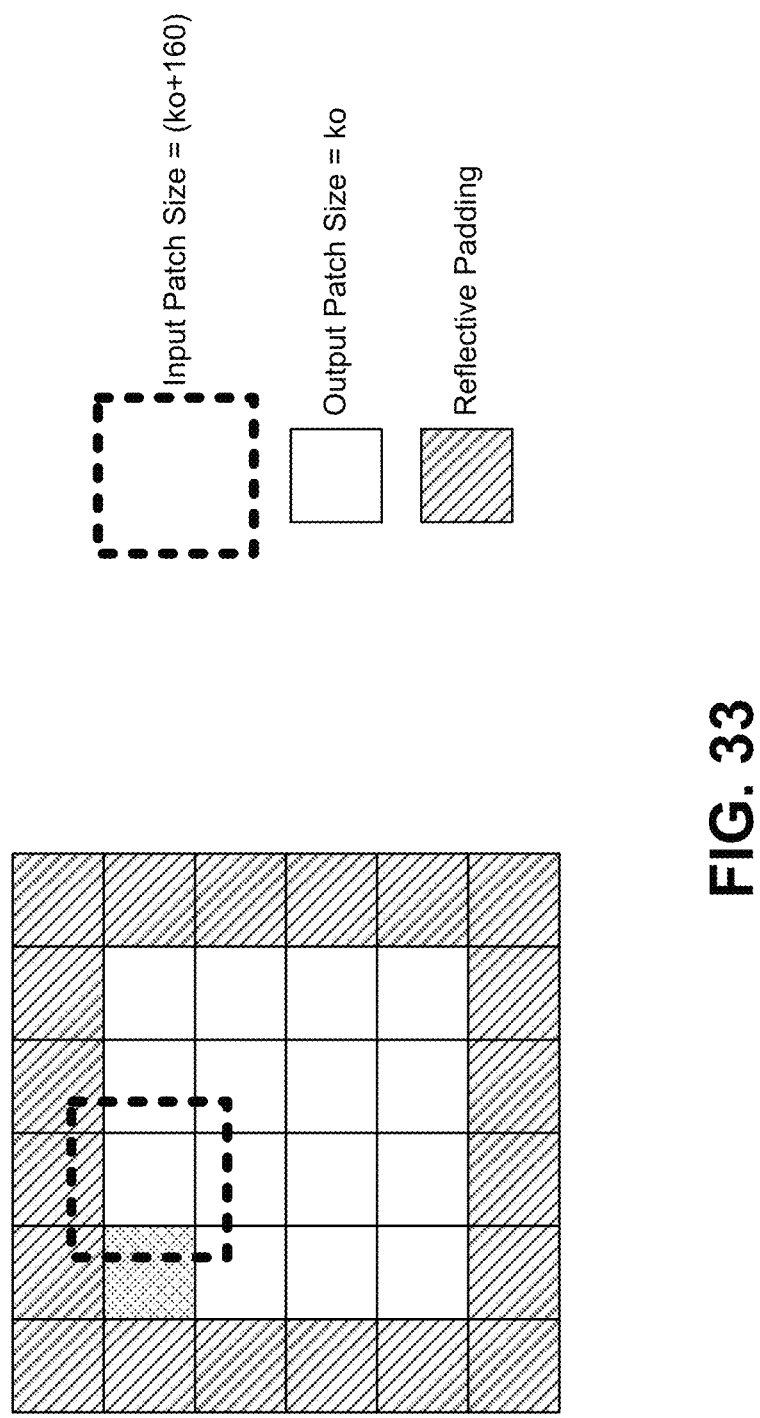
FIG. 33 is a conceptual diagram illustrating an example of the patch-wise model inference of FIG. 32 at a second image location, in accordance with some examples.

FIG. 33 is a conceptual diagram illustrating an example of the patch-wise model inference of FIG. 32 at a second image location, in accordance with some examples.

Figure 34:
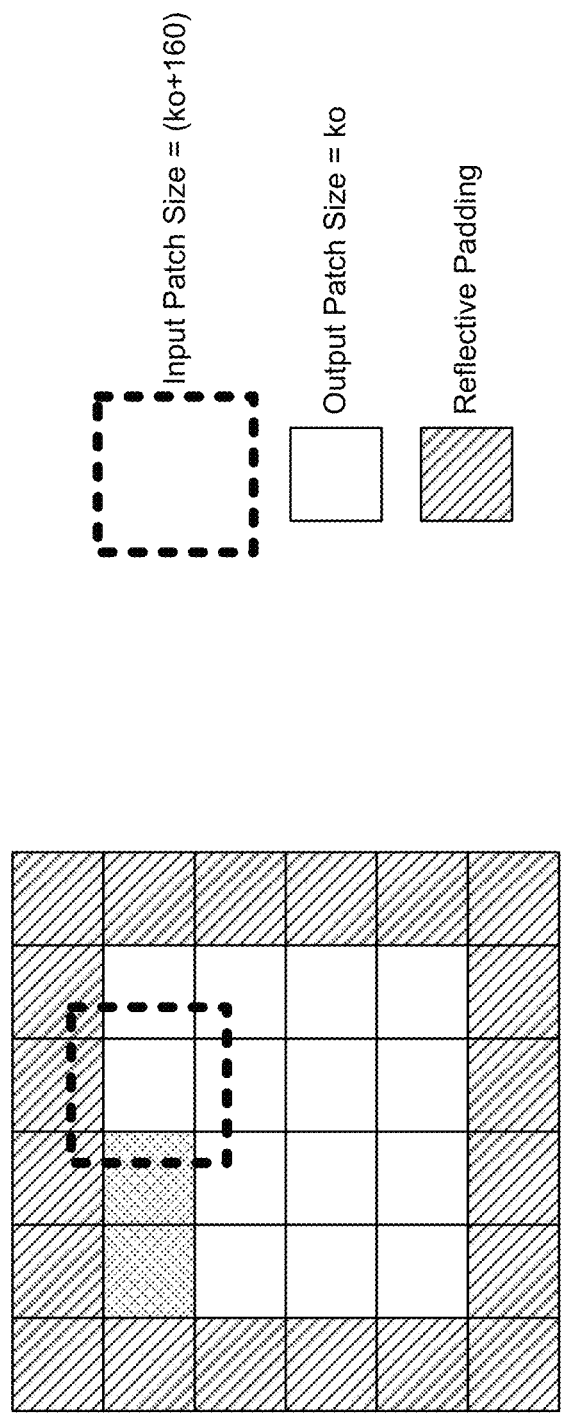
FIG. 34 is a conceptual diagram illustrating an example of the patch-wise model inference of FIG. 32 at a third image location, in accordance with some examples.

FIG. 34 is a conceptual diagram illustrating an example of the patch-wise model inference of FIG. 32 at a third image location, in accordance with some examples.

Figure 35:
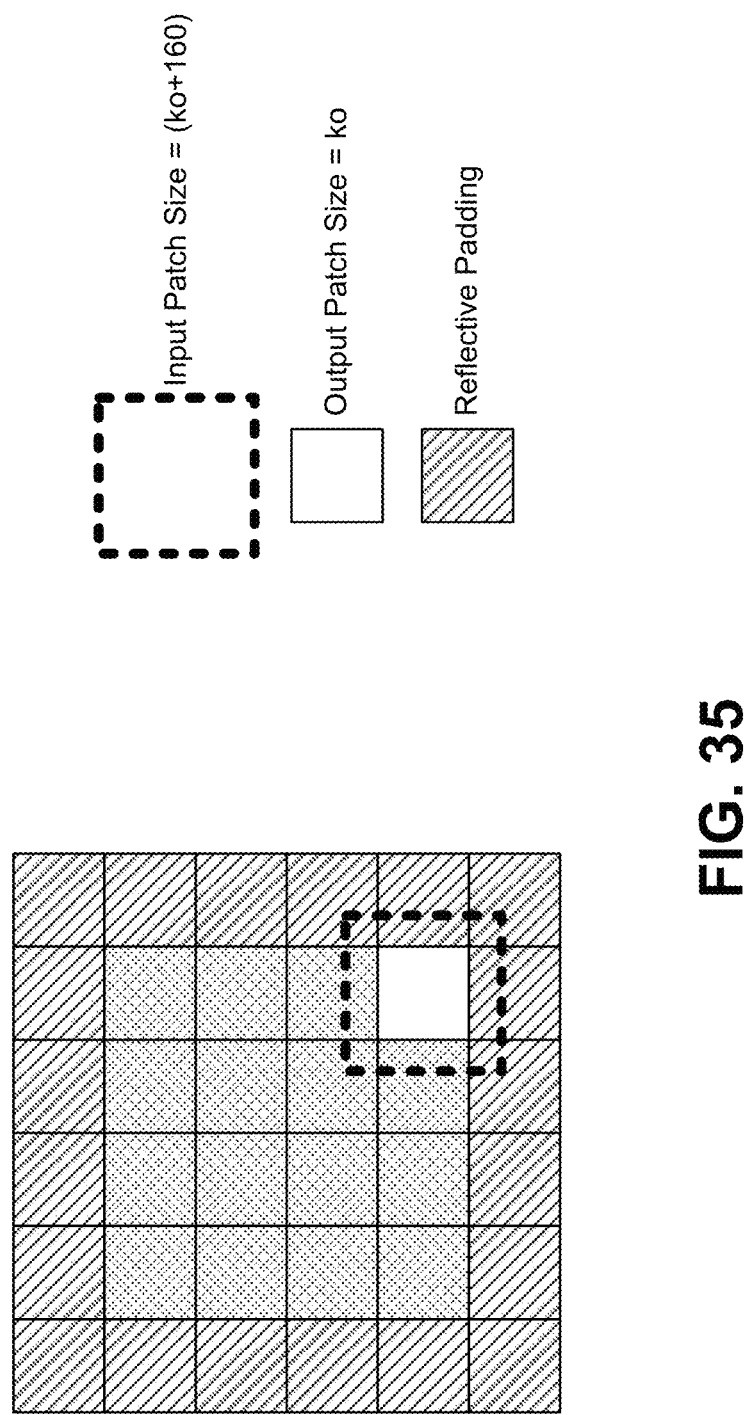
FIG. 35 is a conceptual diagram illustrating an example of the patch-wise model inference of FIG. 32 at a fourth image location, in accordance with some examples.

FIG. 35 is a conceptual diagram illustrating an example of the patch-wise model inference of FIG. 32 at a fourth image location, in accordance with some examples.

FIG. 32, FIG. 33, FIG. 34, and FIG. 35 are diagrams illustrating an example of patch-wise model inference, resulting in non-overlapping output patches. As shown in FIG. 32-FIG. 35, an input patch can have a size of ko+160, where ko is the output patch size (the output patch size is equal to ko). The pixels shaded with diagonal stripes refer to padding pixels (e.g., reflective). As shown by the boxes with dashed outlines in FIG. 32-FIG. 35, the input patches overlap. As shown by the white boxes, the output patches are non-overlapping.

As described above, the additional tuning parameters (or tuning maps or tuning knobs) can be applied at the image level (a single value applied to the entire image) or at the pixel level (different values for each pixel in the image).

Figure 36:
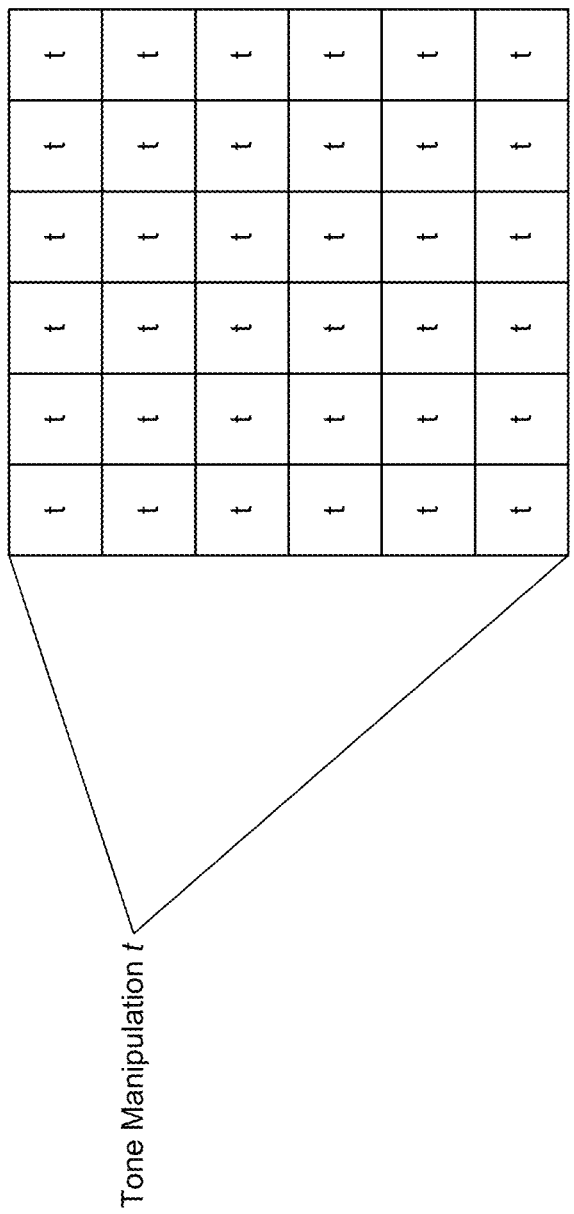
FIG. 36 is a conceptual diagram illustrating an example of a spatially fixed tone map that is applied at the image level, in accordance with some examples.

FIG. 36 is a conceptual diagram illustrating an example of a spatially fixed tone map (or mask) that is applied at the image level, where a single value of t is applied to all pixels of the image. As described above, a tone map can be provide that includes different values for the various pixels of the image (e.g., as shown in FIG. 8) and thus can be spatially varied.

Figure 37:
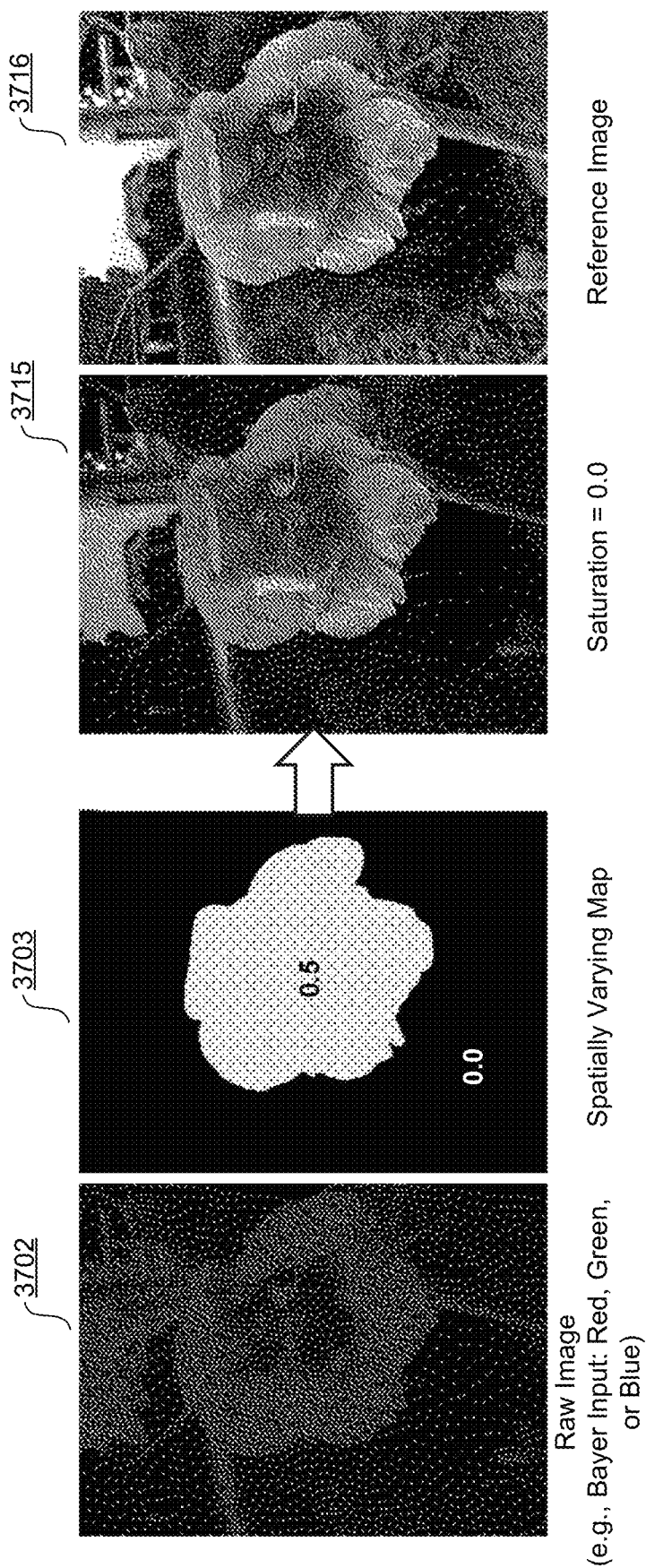
FIG. 37 is a conceptual diagram illustrating an example application of a spatially varying map to process input image data to generate an output image with spatially varying saturation adjustment strength, in accordance with some examples.

FIG. 37 is a conceptual diagram illustrating an example of an application of a spatially varying map 3703 (or mask) to process input image data 3702 to generate an output image 3715 with spatially varying saturation adjustment strength, in accordance with some examples. The spatially varying map 3703 includes a saturation map. The spatially varying map 3703 includes a value for each location corresponding to a pixel in a raw image 3702 produced by an image sensor (also referred to as a Bayer image). In contrast to a spatially fixed map, values of different locations in the spatially varying map 3703 can be different. The spatially varying map 3703 includes a value of 0.5 corresponding to an area of pixels in the raw image 3702 depicting a flower in the foreground. This area with a value of 0.5 is illustrated in grey in the spatially varying map 3703. A value of 0.5 in the spatially varying map 3703 indicates that saturation in that area is to remain the same, with no increase or decrease. The spatially varying map 3703 includes a value of 0.0 corresponding to the area of pixels in the raw image 3702 depicting the background behind the flower. This area with a value of 0.0 is illustrated in black in the spatially varying map 3703. A value of 0.0 in the input saturation map 203 indicates that saturation in that area is to be completely desaturated. The modified image 3715 illustrates an example of an image generated (e.g., by the image processing ML system 210) by applying saturation at strengths and in directions that are based on the spatially varying map 3703. The modified image 3705 represents an image in which the flower in the foreground is still saturated (at an unchanged saturation strength) to the same extent as in the reference image 3716, but the background are completely desaturated and therefore depicted in greyscale. The reference image 3716 is used as a baseline image that the system is expected to produce with neutral saturation (0.5) applied to the entirety of the raw image 3702. Because FIG. 37 is illustrated in greyscale rather than in color, the green channels of the modified image 3705 and the reference image 3716 are illustrated in FIG. 37 to illustrate changes in green color saturation. Increases in green color saturation appear as brighter areas, while decreases in green color saturation appear as darker areas. Because FIG. 37 shows the green channel of the modified image 3705, and the background behind the flowers is primarily green, the background appears very dark in the modified image 3705 (compared to the reference image 3716), indicating that the green color in the background of the modified image 3705 is desaturated (compared to the reference image 3716).

Figure 38:
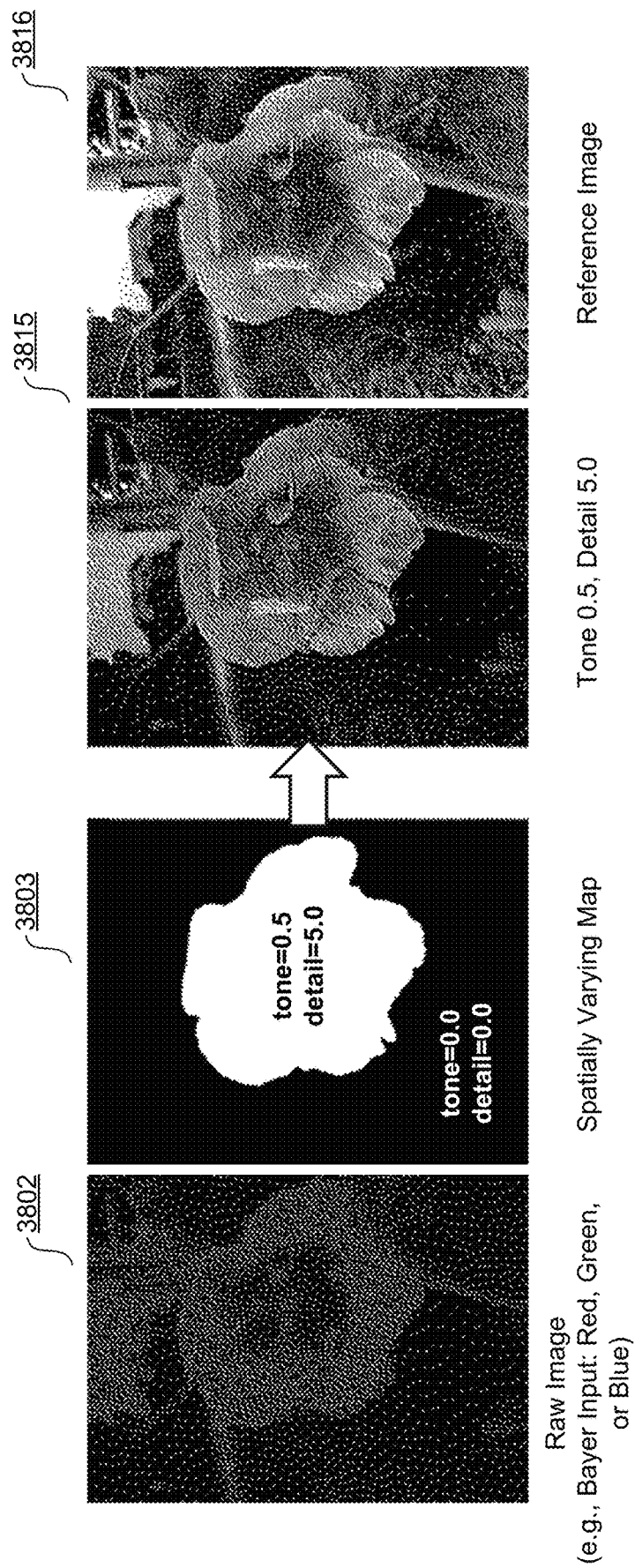
FIG. 38 is a conceptual diagram illustrating an example application of a spatially varying map to process input image data to generate an output image with spatially varying tone adjustment strength and spatially varying detail adjustment strength, in accordance with some examples.

FIG. 38 is a conceptual diagram illustrating an example application of a spatially varying map 3803 to process input image data 3802 to generate an output image 3815 with spatially varying tone adjustment strength and spatially varying detail adjustment strength, in accordance with some examples. The spatially varying map 3703 includes a tone map. The spatially varying map 3803 includes a value for each location corresponding to a pixel in a raw image 3802 produced by an image sensor (also referred to as a Bayer image). Values of different locations in the spatially varying map 3803 can be different. The spatially varying map 3803 includes a tone value of 0.5 and a detail value of 5.0 corresponding to an area of pixels in the raw image 3802 depicting a flower in the foreground. This area with the tone value of 0.5 and the detail value of 5.0 is illustrated in white in the spatially varying map 3803. A tone value of 0.5 in the spatially varying map 3803 indicates a Gamma (γ) value of 1.0 (corresponding to $10^{0.0}$), meaning that the tone in that area is to remain the same, with no change. A detail value of 5.0 in the spatially varying map 3803 indicates that the detail in that area is to increase. The spatially varying map 3803 includes a tone value of 0.0 and a detail value of 0.0 corresponding to the area of pixels in the raw image 3802 depicting the background behind the flower. This area with the tone value of 0.0 and a detail value of 0.0 is illustrated in black in the spatially varying map 3803. A tone value of 0.0 in the input tone map 203 indicates a Gamma (γ) value of 2.5 (corresponding to $10^{0.4}$), meaning that the tone in that area is to be darkened. The direction of mapping from tone value to gamma value in FIG. 38 is the opposite of direction of mapping from tone value to gamma value in FIG. 7, where 0 brightens and 1 darkens. A detail value of 5.0 in the spatially varying map 3803 indicates that the detail in that area is to decrease. The modified image 3815 illustrates an example of an image generated (e.g., by the image processing ML system 210) by modifying tone and detail at strengths and in directions that are based on the spatially varying map 3803. The modified image 3805 represents an image in which the flower in the foreground is has the same tone (compared to reference image 3816) but increased detail (compared to reference image 3816), and where the background has a darkened tone (compared to reference image 3816) and reduced detail (compared to reference image 3816). The reference image 3816 is used as a baseline image that the system is expected to produce with neutral tone (0.5) and neutral detail applied to the entirety of the raw image 3802.

FIG. 39 is a conceptual diagram illustrating an automatically adjusted image generated by an image processing system using one or more tuning maps to adjust an input image.

Figure 40A:
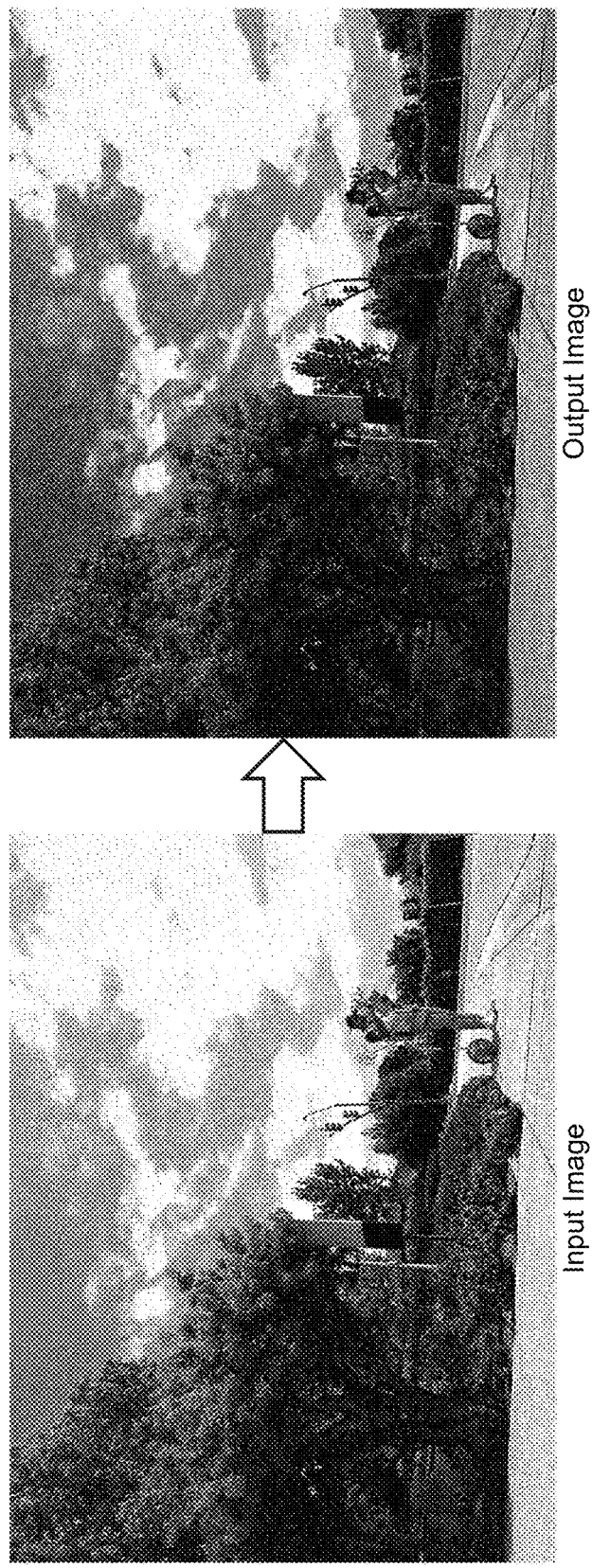
FIG. 40A is a conceptual diagram illustrating an output image generated by an image processing system using one or more spatially varying tuning maps generated using the auto-adjust machine learning (ML) system, in accordance with some examples.

FIG. 40A is a conceptual diagram illustrating an output image generated by an image processing system using one or more spatially varying tuning maps generated using the auto-adjust machine learning (ML) system, in accordance with some examples. An input image and an output image are illustrated in FIG. 40A. The output image is a modified variant of the input image modified based on the one or more spatially varying tuning maps.

Figure 40B:
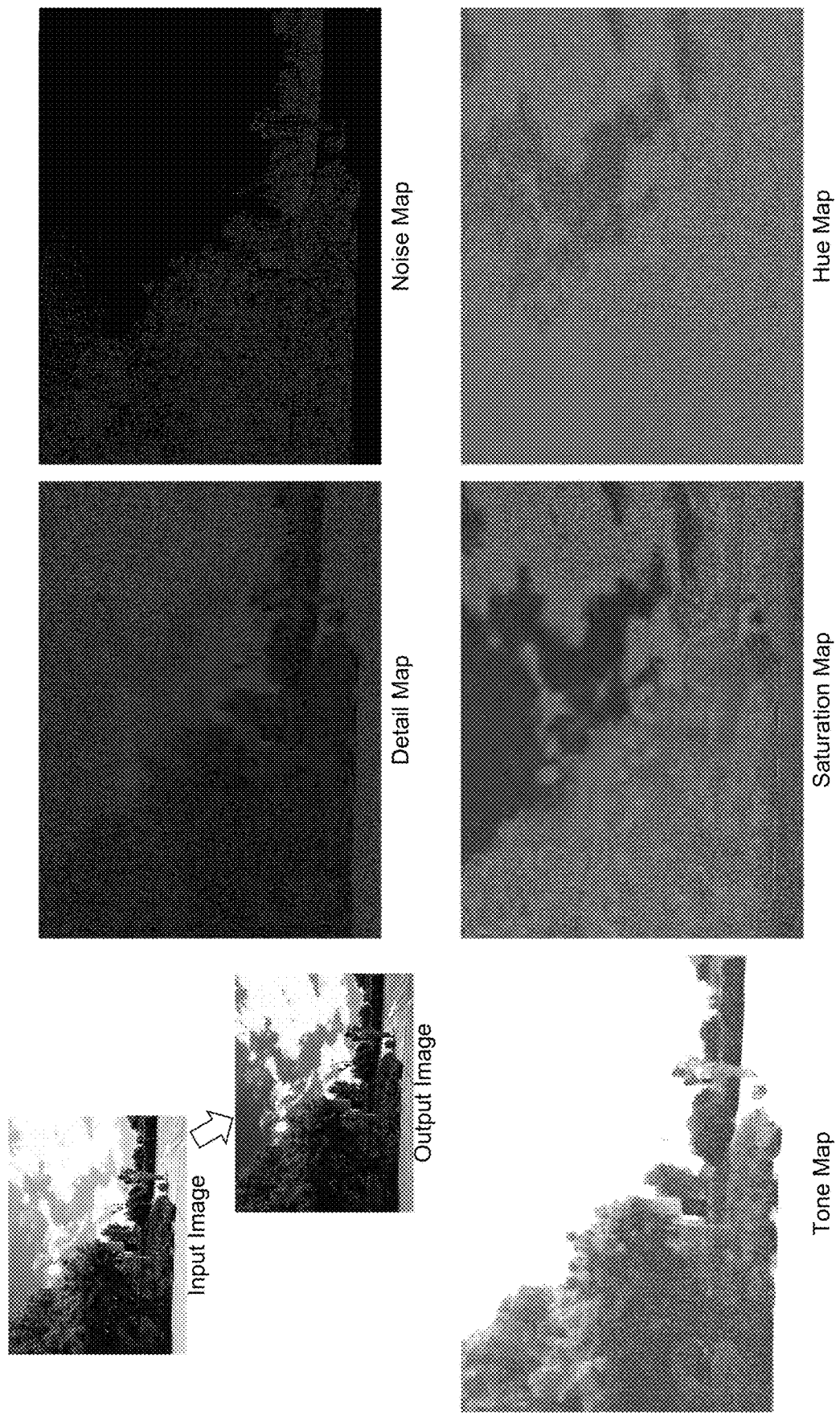
FIG. 40B is a conceptual diagram illustrating examples of the spatially varying tuning maps that can be used to generate the output image shown in FIG. 40A from the input image shown in FIG. 40A, in accordance with some examples.

FIG. 40B is a conceptual diagram illustrating examples of the spatially varying tuning maps that can be used to generate the output image shown in FIG. 40A from the input image shown in FIG. 40A, in accordance with some examples. In addition to illustrating the input image and the output image of FIG. 40A again, FIG. 40B illustrates a detail map, a noise map, a tone map, a saturation map, and a hue map.

Figure 41A:
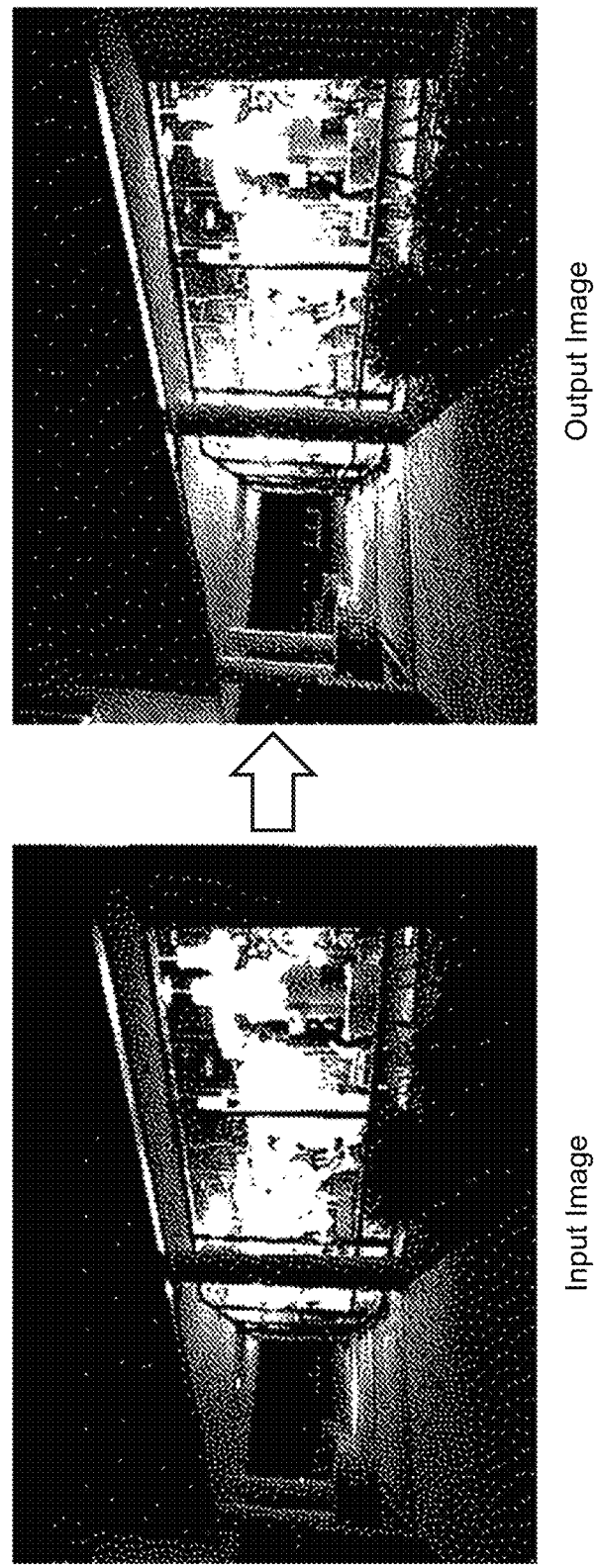
FIG. 41A is a conceptual diagram illustrating an output image generated by an image processing system using one or more spatially varying tuning maps generated using the auto-adjust machine learning (ML) system, in accordance with some examples.

FIG. 41A is a conceptual diagram illustrating an output image generated by an image processing system using one or more spatially varying tuning maps generated using the auto-adjust machine learning (ML) system, in accordance with some examples. An input image and an output image are illustrated in FIG. 41A. The output image is a modified variant of the input image modified based on the one or more spatially varying tuning maps.

Figure 41B:
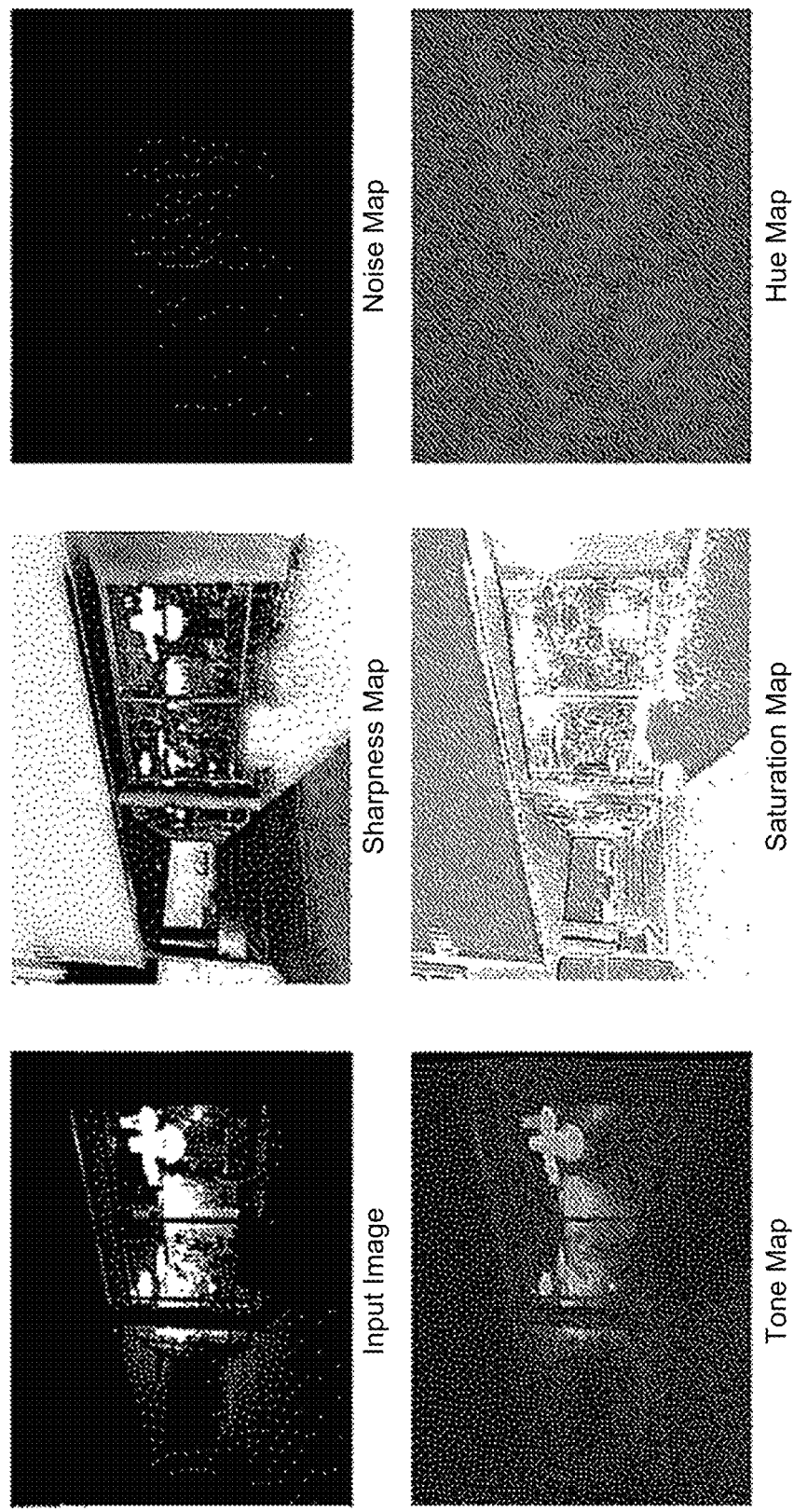
FIG. 41B is a conceptual diagram illustrating examples of the spatially varying tuning maps that can be used to generate the output image shown in FIG. 41A from the input image shown in FIG. 41A, in accordance with some examples.

FIG. 41B is a conceptual diagram illustrating examples of the spatially varying tuning maps that can be used to generate the output image shown in FIG. 41A from the input image shown in FIG. 41A, in accordance with some examples. In addition to illustrating the input image of FIG. 41A again, FIG. 41B illustrates a sharpness map, a noise map, a tone map, a saturation map, and a hue map.

Figure 42A:
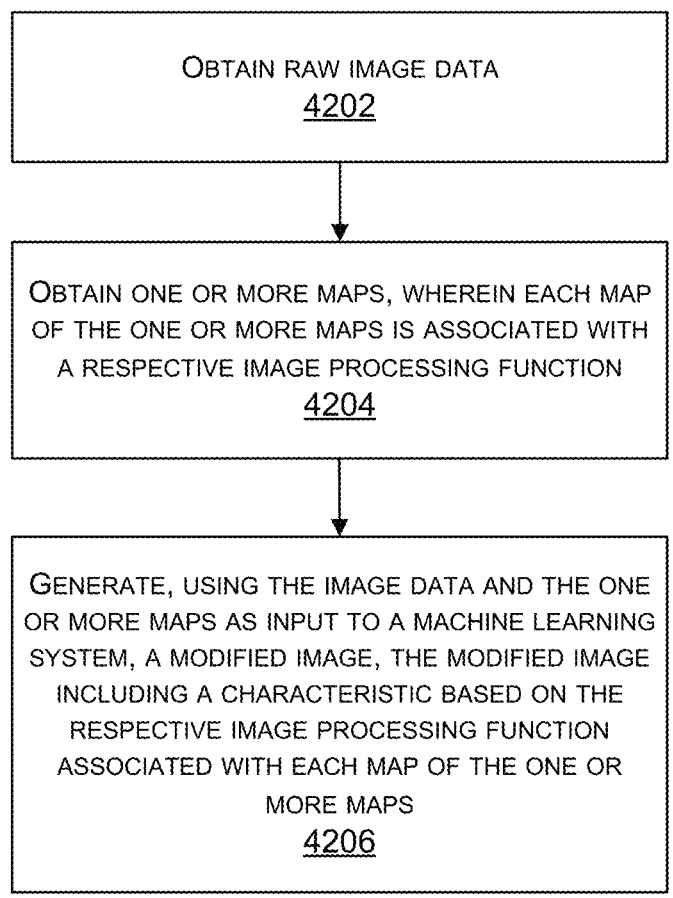
FIG. 42A is a flow diagram illustrating an example of a process for processing image data, in accordance with some examples.

FIG. 42A is a flowchart illustrating an example of a process 4200 for processing image data using one or more neural networks using the techniques described herein. The process 4200 may be performed by an imaging system. The imaging system may include, for example, the image capture and processing system 100, the image capture device 105A, the image processing device 105B, the image processor 150, the ISP 154, the host processor 152, the image processing ML system 210, the system of FIG. 14A, the system of FIG.

14B, the system of FIG. 14C, the system of FIG. 14D, the image processing system 1406, the auto-adjust ML system 1405, the downsampler 1418, the upsampler 1426, the neural network 1500, the neural network architecture 1900, the neural network architecture 2000, the neural network architecture 2100A, the neural network architecture 2100B, the spatial attention engine 2110, the channel attention engine 2115, the image sensor 2202, the pre-tuned ISP 2208, the machine learning (ML) ISP 2300, the neural network system 2303, the pre-processing engine 2307, the input interface 2301, the output interface 2305, the neural network architecture 2400, the trained machine learning model 2802, the imaging system that performs the process 4200, the computing system 4300, or a combination thereof.

At block 4202, the process 4200 includes the imaging system obtaining image data. In some implementations, the image data includes a processed image having a plurality of color components for each pixel of the image data. For instance, the image data can include one or more RGB images, one or more YUV images, or other color image(s) that has been previously captured and processed by a camera system, such as the image of a scene 110 generated by the image capture and processing system 100 shown in FIG. 1. In some implementations, the image data includes raw image data from one or more image sensors (e.g., the image sensor 130). The raw image data includes a single color component for each pixel of the image data. In some cases, the raw image data is obtained from the one or more image sensors filtered by a color filter array, such as a Bayer color filter array. In some implementations, the image data includes one or more patches of image data. A patch of image data includes a subset of a frame of image data. In some cases, generating the modified image includes generating a plurality of patches of output image data. Each patch of output image data can include a subset of pixels of the output image.

Examples of the raw image data can include image data captured using the image capture and processing system 100, image data captured using the image capture device 105A and/or the image processing device 105B, the input image 202, the input image 302, the input image 402, the input image 602, the input image 802, the input image 1102, the input image 1302, the input image 1402, the downsampled input image 1422, the input layer 1510, the input images 1606, the input images 1606, the downsampled input images 1616, $I_{RGB}$ of FIG. 17, luminance channel $I_y$ of FIG. 17, the luminance channel 1820, the image patch 1825, the full image input 1826, the input image 2130, the color filtered raw input data 2204, the output color image 2209, the frame 2304 of raw image data, the raw image patch 2306, the RGB output 2308, the final output image 2309, the raw input image of FIG. 24, the output RGB image of FIG. 24, the input image of FIGS. 25A-25B, the input image of FIGS. 26A-26B, the input image of FIGS. 27A-27C, the image data 2804, the image data 2814, the input patch of FIGS. 32-35, the raw image 3702, the reference image 3716, the raw image 3802, the reference image 3816, the input image of FIG. 39, the input image of FIGS. 40A-40B, the input image of FIGS. 41A-41B, the image data of block 4252, other image data described herein, other images described herein, or a combination thereof. In some examples, block 4202 of the process 4200 can correspond to block 4252 of the process 4250.

At block 4204, the process 4200 includes the imaging system obtaining one or more maps. The one or more maps are also referred to herein as one or more tuning maps. Each map of the one or more maps is associated with a respective image processing function. Each map also includes values indicating amounts of the image processing function to apply to corresponding pixels of the image data. For example, a map of the one or more maps includes a plurality of values and is associated with an image processing function, where each value of the plurality of values of the map indicates an amount of the image processing function to apply to a corresponding pixel of the image data. FIG. 3A and FIG. 3B discussed above illustrate values of an example tuning map (tuning map 303 of FIG. 3B) and corresponding pixels of an example input image (input image 302 of FIG. 3A).

In some cases, one or more image processing functions associated with the one or more maps include a noise reduction function, a sharpness adjustment function, a tone adjustment function, a saturation adjustment function, a hue adjustment function, or any combination thereof. In some examples, multiple tuning maps can be obtained that are each associated with an image processing function. For instance, the one or more maps include a plurality of maps, where a first map of the plurality of maps is associated with a first image processing function, and a second map of the plurality of maps is associated with a second image processing function. In some cases, the first map can include a first plurality of values, with each value of the first plurality of values of the first map indicating an amount of the first image processing function to apply to a corresponding pixel of the image data. The second map can include a second plurality of values, with each value of the second plurality of values of the second map indicating an amount of the second image processing function to apply to a corresponding pixel of the image data. In some cases, the first image processing function associated with the first map of the plurality of maps includes one of a noise reduction function, a sharpness adjustment function, a tone adjustment function, a saturation adjustment function, and a hue adjustment function, and the second image processing function associated with a second map of the plurality of maps includes a different one of the noise reduction function, the sharpness adjustment function, the tone adjustment function, the saturation adjustment function, and the hue adjustment function. In one illustrative example, a noise map can be obtained that is associated with a noise reduction function, a sharpness map can be obtained that is associated with a sharpness adjustment function, a tone map can be obtained that is associated with a tone adjustment function, a saturation map can be obtained that is associated with a saturation adjustment function, and a hue map can be obtained that is associated with a hue adjustment function can be obtained.

In some examples, the imaging system can generate the one or more maps using a machine learning system, as in block 4254. The machine learning system can include one or more trained convolutional neural networks (CNNs), one or more CNNs, one or more trained neural networks (NNs), one or more NNs, one or more trained support vector machines (SVMs), one or more SVMs, one or more trained random forests, one or more random forests, one or more trained decision trees, one or more decision trees, one or more trained gradient boosting algorithms, one or more gradient boosting algorithms, one or more trained regression algorithms, one or more regression algorithms, or a combination thereof. The machine learning system, and/or any of the machine learning elements listed above (that may be parts of the machine learning system), can be trained using supervised learning, unsupervised learning, reinforcement learning, deep learning, or a combination thereof. The machine learning system that generates the one or more maps in block 4204 can be the same machine learning system as the machine learning system that generates the modified image in block 4206. The machine learning system that generates the one or more maps in block 4204 can be a different machine learning system than the machine learning system that generates the modified image in block 4206.

Examples of the one or more maps include the input saturation map 203, the spatial tuning map 303, the input noise map 404, the input sharpening map 604, the input tone map 804, the input saturation map 1104, the input hue map 1304, the spatially varying tuning maps 1404, the small spatially varying tuning maps 1424, the output layer 1514, the input tuning maps 1607, the output tuning maps 1618, the reference output tuning maps 1619, the spatially varying tuning maps omega (Ω) of FIG. 17, the tuning maps 1804, the tuning parameters 2206, the tuning parameters 2806, the tuning parameters 2616, the tuning parameters 2826, the tone map of FIG. 36, the spatially varying map 3703, the spatially varying map 3803, the detail map of FIG. 40B, the noise map of FIG. 40B, the tone map of FIG. 40B, the saturation map of FIG. 40B, the hue map of FIG. 40B, the sharpness map of FIG. 41B, the noise map of FIG. 41B, the tone map of FIG. 41B, the saturation map of FIG. 41B, the hue map of FIG. 41B, the one or more maps of block 4254, other spatially varying maps described herein, other spatially fixed maps described herein, other maps described herein, other masks described herein, or any combination thereof. Examples of the image processing functions include noise reduction, noise addition, sharpness adjustment, detail adjustment, tone adjustment, color saturation adjustment, hue adjustment, any other image processing function described herein, any other image processing parameter described herein, or any combination thereof. In some examples, block 4204 of the process 4200 can correspond to block 4254 of the process 4250.

At block 4206, the process 4200 includes the imaging system generating, using the image data and the one or more maps as input to a machine learning system, a modified image. The modified image may be referred to as an output image. The modified image includes a characteristic based on the respective image processing function associated with each map of the one or more maps. In some cases, the machine learning system includes at least one neural network. In some examples, the process 4200 includes generating the one or more maps using an additional machine learning system that is different than the machine learning system used to generate the modified image. For instance, the auto-adjust ML system 1705 of FIG. 17 can be used to generate the one or more maps, and the image processing ML system 210 can be used to generate the modified image based on the input image and the one or more maps.

Examples of the modified image include the modified image(s) 215, the modified image 415, the image 510, the image 511, the image 512, the modified image 615, output image 710, the output image 711, and the output image 712, the modified image 815, the output image 1020, the output image 1021, the output image 1022, the modified image 1115, the modified image 1315, the modified image 1415, the output layer 1514, the output images 1608, the reference output images 1609, the output color image 2209, the RGB output 2308, the final output image 2309, the output RGB image of FIG. 24, the modified images of FIGS. 25A-25B, the modified images of FIGS. 26A-26B, the modified images of FIGS. 27A-27C, the output enhanced image 2808, the output enhanced image 2828, the output patch(es) of FIGS. 32-35, the output image 3715, the reference image 3716, the output image 3815, the reference image 3816, the automatically adjusted image of FIG. 39, the output image of FIGS. 40A-40B, the output image of FIG. 41A, the modified image of block 4206, other image data described herein, other images described herein, or a combination thereof. In some examples, block 4206 of the process 4200 can correspond to block 4256 of the process 4250.

The machine learning system of block 4206 can include one or more trained convolutional neural networks (CNNs), one or more CNNs, one or more trained neural networks (NNs), one or more NNs, one or more trained support vector machines (SVMs), one or more SVMs, one or more trained random forests, one or more random forests, one or more trained decision trees, one or more decision trees, one or more trained gradient boosting algorithms, one or more gradient boosting algorithms, one or more trained regression algorithms, one or more regression algorithms, or a combination thereof. The machine learning system of block 4206, and/or any of the machine learning elements listed above (that may be parts of the machine learning system), can be trained using supervised learning, unsupervised learning, reinforcement learning, deep learning, or a combination thereof.

Figure 42B:
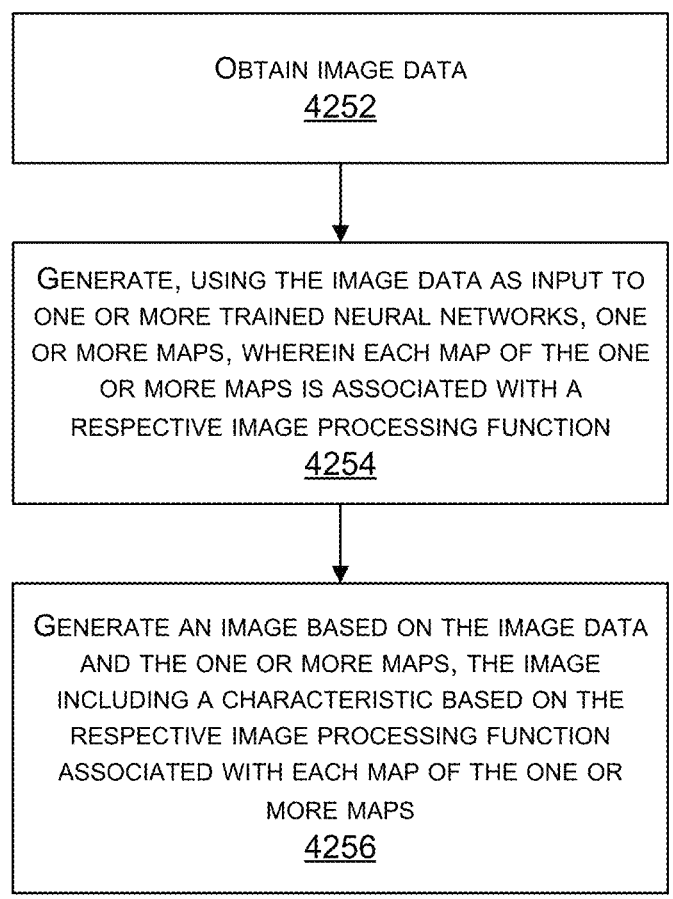
FIG. 42B is a flow diagram illustrating an example of a process for processing image data, in accordance with some examples.

FIG. 42B is a flowchart illustrating an example of a process 4250 for processing image data using one or more neural networks using the techniques described herein. The process 4250 may be performed by an imaging system. The imaging system may include, for example, the image capture and processing system 100, the image capture device 105A, the image processing device 105B, the image processor 150, the ISP 154, the host processor 152, the image processing ML system 210, the system of FIG. 14A, the system of FIG. 14B, the system of FIG. 14C, the system of FIG. 14D, the image processing system 1406, the auto-adjust ML system 1405, the downsampler 1418, the upsampler 1426, the neural network 1500, the neural network architecture 1900, the neural network architecture 2000, the neural network architecture 2100A, the neural network architecture 2100B, the neural network architecture 2100C, the neural network architecture 2100D, the spatial attention engine 2110, the channel attention engine 2115, the image sensor 2202, the pre-tuned ISP 2208, the machine learning (ML) ISP 2300, the neural network system 2303, the pre-processing engine 2307, the input interface 2301, the output interface 2305, the neural network architecture 2400, the trained machine learning model 2802, the imaging system that performs the process 4200, the computing system 4300, or a combination thereof.

At block 4252, the process 4250 includes the imaging system obtaining image data. In some implementations, the image data includes a processed image having a plurality of color components for each pixel of the image data. For instance, the image data can include one or more RGB images, one or more YUV images, or other color image(s) that has been previously captured and processed by a camera system, such as the image of a scene 110 generated by the image capture and processing system 100 shown in FIG. 1. Examples of the image data can include image data captured using the image capture and processing system 100, image data captured using the image capture device 105A and/or the image processing device 105B, the input image 202, the input image 302, the input image 402, the input image 602, the input image 802, the input image 1102, the input image 1302, the input image 1402, the downsampled input image 1422, the input layer 1510, the input images 1606, the input images 1606, the downsampled input images 1616, $I_{RGB}$ of FIG. 17, luminance channel $I_y$ of FIG. 17, the luminance channel 1820, the image patch 1825, the full image input 1826, the input image 2130, the color filtered raw input data 2204, the output color image 2209, the frame 2304 of raw image data, the raw image patch 2306, the RGB output 2308, the final output image 2309, the raw input image of FIG. 24, the output RGB image of FIG. 24, the input image of FIGS. 25A-25B, the input image of FIGS. 26A-26B, the input image of FIGS. 27A-27C, the image data 2804, the image data 2814, the input patch of FIGS. 32-35, the raw image 3702, the reference image 3716, the raw image 3802, the reference image 3816, the input image of FIG. 39, the input image of FIGS. 40A-40B, the input image of FIGS. 41A-41B, the raw image data of block 4202, other image data described herein, other images described herein, or a combination thereof. The imaging system can include an image sensor that captures the image data. The imaging system can include an image sensor connector coupled to the image sensor. Obtaining the image data in block 4252 can include obtaining the image data from the image sensor and/or through the image sensor connector.

In some examples, the image data includes an input image having a plurality of color components for each pixel of a plurality of pixels of the image data. The input image can already be at least partially processed, for example through demosaicking at an ISP 154. The input image can be captured and/or processed using the image capture and processing system 100, the image capture device 105A, the image processing device 105B, the image processor 150, the image sensor 130, the ISP 154, the host processor 152, the image sensor 2202, or a combination thereof. In some examples, the image data includes raw image data from one or more image sensors, the raw image data including at least one color component for each pixel of a plurality of pixels of the image data. Examples of the one or more image sensors can include the image sensor 130 and the image sensor 2202. Examples of the raw image data can include image data can include image data captured using the image capture and processing system 100, image data captured using the image capture device 105A, the input image 202, the input image 302, the input image 402, the input image 602, the input image 802, the input image 1102, the input image 1302, the input image 1402, the downsampled input image 1422, the input layer 1510, the input images 1606, the input images 1606, the downsampled input images 1616, $I_{RGB}$ of FIG. 17, luminance channel $I_y$ of FIG. 17, the luminance channel 1820, the image patch 1825, the full image input 1826, the input image 2130, the color filtered raw input data 2204, the frame 2304 of raw image data, the raw image patch 2306, the raw input image of FIG. 24, the input image of FIGS. 25A-25B, the input image of FIGS. 26A-26B, the input image of FIGS. 27A-27C, the image data 2804, the image data 2814, the input patch of FIGS. 32-35, the raw image 3702, the reference image 3716, the raw image 3802, the reference image 3816, the input image of FIG. 39, the input image of FIGS. 40A-40B, the input image of FIGS. 41A-41B, the raw image data of block 4202, other raw image data described herein, other image data described herein, other images described herein, or a combination thereof. The image data can include a single color component (e.g., red, green, or blue) for each pixel of the image data. The image data can include a multiple color components (e.g., red, green, and/or blue) for each pixel of the image data. In some cases, the image data is obtained from the one or more image sensors filtered by a color filter array, such as a Bayer color filter array. In some examples, the image data includes one or more patches of image data. A patch of image data includes a subset of a frame of image data, for example corresponding to one or more contiguous areas or regions. In some cases, generating the modified image includes generating a plurality of patches of output image data. Each patch of output image data can include a subset of pixels of the output image. In some examples, block 4252 of the process 4250 can correspond to block 4202 of the process 4200.

At block 4254, the process 4250 includes the imaging system generating, using the image data as input to one or more trained neural networks, one or more maps. Each map of the one or more maps is associated with a respective image processing function. In some examples, block 4254 of the process 4250 can correspond to block 4204 of the process 4200. Examples of the one or more trained neural networks include the image processing ML system 210, the auto-adjust ML system 1405, the neural network 1500, the auto-adjust ML system 1705, the local neural network 1806, the global neural network 1807, the neural network architecture 1900, the neural network architecture 2000, the neural network architecture 2100A, the neural network architecture 2100B, neural network architecture 2100C, the neural network architecture 2100D, the neural network system 2303, the neural network architecture 2400, the machine learning ISP 2300, the trained machine learning model 2802, one or more trained convolutional neural networks (CNNs), one or more CNNs, one or more trained neural networks (NNs), one or more NNs, one or more trained support vector machines (SVMs), one or more SVMs, one or more trained random forests, one or more random forests, one or more trained decision trees, one or more decision trees, one or more trained gradient boosting algorithms, one or more gradient boosting algorithms, one or more trained regression algorithms, one or more regression algorithms, any other trained neural networks described herein, any other neural networks described herein, any other trained machine learning models described herein, any other machine learning models described herein, any other trained machine learning systems described herein, any other machine learning systems described herein, or any combination thereof. The one or more trained neural networks of block 4254, and/or any of the machine learning elements listed above (that may be parts of the one or more trained neural networks of block 4254), can be trained using supervised learning, unsupervised learning, reinforcement learning, deep learning, or a combination thereof.

Examples of the one or more maps include the input saturation map 203, the spatial tuning map 303, the input noise map 404, the input sharpening map 604, the input tone map 804, the input saturation map 1104, the input hue map 1304, the spatially varying tuning maps 1404, the small spatially varying tuning maps 1424, the output layer 1514, the input tuning maps 1607, the output tuning maps 1618, the reference output tuning maps 1619, the spatially varying tuning maps omega ($\Omega$) of FIG. 17, the tuning maps 1804, the tuning parameters 2206, the tuning parameters 2806, the tuning parameters 2616, the tuning parameters 2826, the tone map of FIG. 36, the spatially varying map 3703, the spatially varying map 3803, the detail map of FIG. 40B, the noise map of FIG. 40B, the tone map of FIG. 40B, the saturation map of FIG. 40B, the hue map of FIG. 40B, the sharpness map of FIG. 41B, the noise map of FIG. 41B, the tone map of FIG. 41B, the saturation map of FIG. 41B, the hue map of FIG. 41B, the one or more maps of block 4204, other spatially varying maps described herein, other spatially fixed maps described herein, other maps described herein, other masks described herein, or any combination thereof. Examples of the image processing functions include noise reduction, noise addition, sharpness adjustment, detail adjustment, tone adjustment, color saturation adjustment, hue adjustment, any other image processing function described herein, any other image processing parameter described herein, or any combination thereof.

Each map of the one or more maps can includes a plurality of values and can be associated with an image processing function. Examples of the plurality of values can include the values V0-V56 of the spatial tuning map 303. Examples of the plurality of values can include the different values corresponding to the different regions of the input saturation map 203, the input noise map 404, the input sharpening map 604, the input tone map 804, the input saturation map 1104, the input hue map 1304, the spatially varying tuning maps 1404, the small spatially varying tuning maps 1424, the spatially varying map 3703, the spatially varying map 3803, the detail map of FIG. 40B, the noise map of FIG. 40B, the tone map of FIG. 40B, the saturation map of FIG. 40B, the hue map of FIG. 40B, the sharpness map of FIG. 41B, the noise map of FIG. 41B, the tone map of FIG. 41B, the saturation map of FIG. 41B, the hue map of FIG. 41B, and the one or more maps of block 4204. Each value of the plurality of values of the map can indicate a strength with which to apply the image processing function to a corresponding region of the image data. In some examples, a higher numerical value (e.g., 1) can indicate a stronger strength with which to apply the image processing function to the corresponding region of the image data, while a lower numerical value (e.g., 0) can indicate a weaker strength with which to apply the image processing function to the corresponding region of the image data. In some examples, a lower numerical value (e.g., 0) can indicate a stronger strength with which to apply the image processing function to the corresponding region of the image data, while a higher numerical value (e.g., 1) can indicate a weaker strength with which to apply the image processing function to the corresponding region of the image data. In some examples, a value (e.g., 0.5) may indicate application of the image processing function to the corresponding region of the image data at a strength of zero, which may result in a non-application of the image processing function and therefore no change to the image data using the image processing function. The corresponding region of the image data can correspond to a pixel of the image data of block 4202 and/or of the image of block 4256. The corresponding region of the image data can correspond to multiple pixels of the image data of block 4202 and/or of the image of block 4256, for example where the multiple pixels are binned, for instance to form a superpixel, to resample, to resize, and/or to rescale. The corresponding region of the image data can be a contiguous region. The multiple pixels can be in the contiguous region. The multiple pixels can be adjacent to one another.

Each value of the plurality of values of the map can indicate a direction with which to apply the image processing function to a corresponding region of the image data. In some examples, a numerical value above a threshold value (e.g., above 0.5) can indicate a positive direction with which to apply the image processing function to the corresponding region of the image data, while a numerical value below the threshold value (e.g., below 0.5) can indicate a negative direction with which to apply the image processing function to the corresponding region of the image data. In some examples, a numerical value above a threshold value (e.g., above 0.5) can indicate a negative direction with which to apply the image processing function to the corresponding region of the image data, while a numerical value below the threshold value (e.g., below 0.5) can indicate a positive direction with which to apply the image processing function to the corresponding region of the image data. The corresponding region of the image data can correspond to a pixel of the image data of block 4202 and/or of the image of block 4256. The corresponding region of the image data can correspond to multiple pixels of the image data of block 4202 and/or of the image of block 4256, for example where the multiple pixels are binned, for instance to form a superpixel, to resample, to resize, and/or to rescale. The corresponding region of the image data can be a contiguous region. The multiple pixels can be in the contiguous region. The multiple pixels can be adjacent to one another.

In some examples, the positive direction for a saturation adjustment can result in oversaturation, while the negative direction for a saturation adjustment can result in undersaturation or desaturation. In some examples, the positive direction for a tone adjustment can result in increasing brightness and/or luminosity, while the negative direction for a tone adjustment can result in decreasing brightness and/or luminosity (or vice versa). In some examples, the positive direction for a sharpness adjustment can result in increasing sharpness (e.g., decreasing blur), while the negative direction for a sharpness adjustment can result in decreasing sharpness (e.g., increasing blur) (or vice versa). In some examples, the positive direction for a noise adjustment can result in noise reduction, while the negative direction for a tone adjustment can result in noise generation and/or addition (or vice versa). In some examples, the positive and negative directions for a hue adjustment can correspond to different angles theta ($\theta$) of a hue modified vector 1218 as in the conceptual diagram 1216 of FIG. 12B. For instance, positive and negative directions for a hue adjustment can correspond to positive and negative angles theta ($\theta$) of a hue modified vector 1218 as in the conceptual diagram 1216 of FIG. 12B. In some examples, one or more of the image processing functions can be limited to processing in the positive direction as discussed herein, or can be limited to processing in the negative direction as discussed herein.

The one or more maps can include a plurality of maps. A first map of the plurality of maps can be associated with a first image processing function, while a second map of the plurality of maps can be associated with a second image processing function. The second image processing function can be different from the first image processing function. In some examples, one or more image processing functions associated with at least one of the plurality of maps include at least one of a noise reduction function, a sharpness adjustment function, a detail adjustment function, a tone adjustment function, a saturation adjustment function, a hue adjustment function, or a combination thereof. In one illustrative example, a noise map can be obtained that is associated with a noise reduction function, a sharpness map can be obtained that is associated with a sharpness adjustment function, a tone map can be obtained that is associated with a tone adjustment function, a saturation map can be obtained that is associated with a saturation adjustment function, and a hue map can be obtained that is associated with a hue adjustment function can be obtained.

The first map can include a first plurality of values, with each value of the first plurality of values of the first map indicating a strength and/or direction at which to apply the first image processing function to a corresponding region of the image data. The second map can include a second plurality of values, with each value of the second plurality of values of the second map indicating a strength and/or direction at which to apply the second image processing function to a corresponding region of the image data. The corresponding region of the image data can correspond to a pixel of the image data of block 4202 and/or of the image of block 4256. The corresponding region of the image data can correspond to multiple pixels of the image data of block 4202 and/or of the image of block 4256, for example where the multiple pixels are binned, for instance to form a superpixel, to resample, to resize, and/or to rescale. The corresponding region of the image data can be a contiguous region. The multiple pixels can be in the contiguous region. The multiple pixels can be adjacent to one another.

In some examples, the image data includes luminance channel data corresponding to an image. Examples of the luminance channel data can include of luminance channel $I_y$ of FIG. 17 and/or the luminance channel 1820. Using the image data as input to the one or more trained neural networks can include using the luminance channel data corresponding to the image as input to the one or more trained neural networks. In some examples, generating the image based on the image data includes generating the image based on the luminance channel data as well as chroma data corresponding to the image.

In some examples, the one or more trained neural networks output one or more affine coefficients based on use of the image data as input to the one or more trained neural networks. Examples of the affine coefficients include the affine coefficients a and b of FIG. 17. Examples of one or more trained neural networks outputting one or more affine coefficients include the auto-adjust ML system 1705, the neural network architecture 1900, the neural network architecture 2000, the neural network architecture 2100A, the neural network architecture 2100B, the neural network architecture 2100C, the neural network architecture 2100D, or a combination thereof. In some examples, the auto-adjust ML system 1405 can generate affine coefficients (e.g., a and/or b) and can generate the spatially varied tuning maps 1404 and/or the small spatially varied tuning maps 1424 based on the affine coefficients. Generating the one or more maps can include generating a first map at least by transforming the image data using the one or more affine coefficients. The image data can include luminance channel data corresponding to an image, so that transforming the image data using the one or more affine coefficients includes transforming the luminance channel data using the one or more affine coefficients. For example, FIG. 17 illustrates transformation of luminance channel data from the luminance channel $I_y$ using affine coefficients a and b of FIG. 17 to generate a tuning map Ω according to the equation $\Omega = a*I_y + b$. The one or more affine coefficients can include a multiplier, such as the multiplier a of FIG. 17. Transforming the image data using the one or more affine coefficients can include multiplying a luminance value of at least a subset of the image data by the multiplier. The one or more affine coefficients can include an offset, such as the offset a of FIG. 17. Transforming the image data using the one or more affine coefficients can include offsetting a luminance value of at least a subset of the image data by the offset. In some examples, the one or more trained neural networks output the one or more affine coefficients based also on a local linearity constraint that aligns one or more gradients in the first map with one or more gradients in the image data. Examples of the local linearity constraint can include the local linearity constraint 1720, which is based on the equation $\nabla\Omega = a*\nabla I_y$. In some examples, application of the one or more affine coefficients to the at least a subset of the image data (e.g., to the luminance data) to transform at least the subset of the image data (e.g., the luminance data) can by controlled by the local linearity constraint.

In some examples, the one or more trained neural networks of block 4254 directly generate and/or output the one or more maps in response to receiving the image data as input to the one or more trained neural networks. For instance, the one or more trained neural networks can generate and/or output the one or more maps directly based on the image, without generating and/or outputting the affine coefficients. The auto-adjust ML system 1405 can, for example, generate and/or output the spatially varied tuning maps 1404 and/or the small spatially varied tuning maps 1424 directly. In some examples, various neural networks and/or machine learning systems that re illustrated and/or described herein as generating and using affine coefficients can be modified to instead output the one or more maps directly, without first generating affine coefficients. For instance, the auto-adjust ML system 1705 of FIG. 17 and/or FIG. 18 can be modified to generate and/or output the tuning maps 1804 as its output layer directly, instead of or in addition to generating and/or outputting the affine coefficients 1822. The neural network architecture 1900 can be modified to generate and/or output the tuning maps 1804 as its output layer directly, instead of or in addition to generating and/or outputting the affine coefficients 1822. The neural network architecture 2100A can be modified to generate and/or output the tuning maps 1804 as its output layer directly, instead of or in addition to generating and/or outputting the affine coefficients 1822. The neural network architecture 2100B can be modified to generate and/or output the tuning maps 1804 as its output layer directly, instead of or in addition to generating and/or outputting the affine coefficients 1822.

Each map of the one or more maps can be spatially varied. Each map of the one or more maps can be spatially varied based on different types or categories of objects depicted in different regions of the image data. Examples of such maps include the input saturation map 203, the spatially varying map 3703, and the spatially varying map 3803, in which a region of the image data depicting a foreground flower and a region of the image data depicting a background map to different strengths and/or directions with which to apply one or more corresponding image processing function. In other examples, the maps can indicate that an image processing function can be applied at different strengths and/or directions in regions that depict different types or categories of objects, such as regions that depict people, faces, clothing, plants, sky, water, clouds, buildings, display screens, metals, plastics, concrete, bricks, hair, trees, textured surfaces, any other types or categories of objects discussed herein, or combinations thereof. Each map of the one or more maps can be spatially varied based on different colors in different regions of the image data. Each map of the one or more maps can be spatially varied based on different image attributes in different regions of the image data. For example, the input noise map 404 indicates that no denoising is to be performed in an area of the input image 402 that is already smooth, but indicates that relatively strong denoising is to be performed in an area of the input image 402 that is noisy.

At block 4256, the process 4250 includes the imaging system generating an image based on the image data and the one or more maps. The image includes a characteristic based on the respective image processing function associated with each map of the one or more maps. The image may be referred to as an output image, a modified image, or a combination thereof. Examples of the image include the modified image(s) 215, the modified image 415, the image 510, the image 511, the image 512, the modified image 615, output image 710, the output image 711, and the output image 712, the modified image 815, the output image 1020, the output image 1021, the output image 1022, the modified image 1115, the modified image 1315, the modified image 1415, the output layer 1514, the output images 1608, the reference output images 1609, the output color image 2209, the RGB output 2308, the final output image 2309, the output RGB image of FIG. 24, the modified images of FIGS. 25A-25B, the modified images of FIGS. 26A-26B, the modified images of FIGS. 27A-27C, the output enhanced image 2808, the output enhanced image 2828, the output patch(es) of FIGS. 32-35, the output image 3715, the reference image 3716, the output image 3815, the reference image 3816, the automatically adjusted image of FIG. 39, the output image of FIGS. 40A-40B, the output image of FIG. 41A, the modified image of block 4206, other image data described herein, other images described herein, or a combination thereof. In some examples, block 4256 of the process 4250 can correspond to block 4206 of the process 4200. The image can be generated using an image processor, such as the image capture and processing system 100, the image processing device 105B, the image processor 150, the ISP 154, the host processor 152, the image processing ML system 210, the image processing system 1406, the neural network 1500, the machine learning (ML) ISP 2300, the neural network system 2303, the pre-processing engine 2307, the input interface 2301, the output interface 2305, the neural network architecture 2400, the trained machine learning model 2802, the machine learning system of block 4206, or a combination thereof.

In some examples, generating the image based on the image data and the one or more maps includes using the image data and the one or more maps as inputs to a second set of one or more trained neural networks distinct from the one or more trained neural networks. Examples of the second set of one or more trained neural networks can include the image processing ML system 210, the image processing system 1406, the neural network 1500, the machine learning (ML) ISP 2300, the neural network system 2303, the neural network architecture 2400, the trained machine learning model 2802, the machine learning system of block 4206, or a combination thereof. In some examples, generating the image based on the image data and the one or more maps includes demosaicking the image data using the second set of one or more trained neural networks.

The second set of one or more trained neural networks can include one or more trained convolutional neural networks (CNNs), one or more CNNs, one or more trained neural networks (NNs), one or more NNs, one or more trained support vector machines (SVMs), one or more SVMs, one or more trained random forests, one or more random forests, one or more trained decision trees, one or more decision trees, one or more trained gradient boosting algorithms, one or more gradient boosting algorithms, one or more trained regression algorithms, one or more regression algorithms, or a combination thereof. The second set of one or more trained neural networks, and/or any of the machine learning elements listed above (that may be parts of the second set of one or more trained neural networks), can be trained using supervised learning, unsupervised learning, reinforcement learning, deep learning, or a combination thereof. In some examples, the second set of one or more trained neural networks can be the one or more trained neural networks of block 4254. In some examples, the second set of one or more trained neural networks can share at least one trained neural network in common with the one or more trained neural networks of block 4254. In some examples, the second set of one or more trained neural networks can be distinct from the one or more trained neural networks of block 4254.

The imaging system can include a display screen. The imaging system can include a display screen connector coupled to the display screen. The imaging system can display the image on the display screen, for example by sending the image to the display screen (and/or to a display controller) using the display screen connector. The imaging system can include a communication transceiver, which can be wired and/or wireless. The imaging system can transmit the image to a recipient device using the communication transceiver. The recipient device can be any type of computing system 4300 or any component thereof. The recipient device can be an output device, such as a device with a display screen and/or projector, which can display the image.

In some aspects, the imaging system can include: means for obtaining image data; means for generating, using the image data as input to one or more trained neural networks, one or more maps, wherein each map of the one or more maps is associated with a respective image processing function; and means for generating an image based on the image data and the one or more maps, the image including a characteristic based on the respective image processing function associated with each map of the one or more maps. In some examples, the means for obtaining the image data can include the image sensor 130, the image capture device 105A, the image capture and processing system 100, the image sensor 2202, or a combination thereof. In some examples, the means for generating the one or more maps can include the image processing device 105B, the image capture and processing system 100, the image processor 150, the ISP 154, the host processor 152, the image processing ML system 210, the auto-adjust ML system 1405, the neural network 1500, the auto-adjust ML system 1705, the local neural network 1806, the global neural network 1807, the neural network architecture 1900, the neural network architecture 2000, the neural network architecture 2100A, the neural network architecture 2100B, neural network architecture 2100C, the neural network architecture 2100D, the neural network system 2303, the neural network architecture 2400, the machine learning ISP 2300, the trained machine learning model 2802, or a combination thereof. In some examples, the means for generating the modified image can include the image processing device 105B, the image capture and processing system 100, the image processor 150, the ISP 154, the host processor 152, the image processing ML system 210, the image processing system 1406, the neural network 1500, the machine learning (ML) ISP 2300, the neural network system 2303, the pre-processing engine 2307, the input interface 2301, the output interface 2305, the neural network architecture 2400, the trained machine learning model 2802, the machine learning system of block 4206, or a combination thereof.

In some examples, the processes described herein (e.g., process 4200, the process 4250, and/or other process described herein) may be performed by a computing device or apparatus. In one example, the process 4200 and/or the process 4250 can be performed by the image processing ML system 210 of FIG. 2. In another example, the process 4200 and/or the process 4250 can be performed by a computing device with the computing system 4300 shown in FIG. 43. For instance, a computing device with the computing system 4300 shown in FIG. 43 can include the components of the image processing ML system 210 and can implement the operations of FIG. 43.

The computing device can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a television, and/or any other computing device with the resource capabilities to perform the processes described herein, including the process 4200 and/or the process 4250. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 4200 and the process 4250 are illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 4200, the process 4250 and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 43:
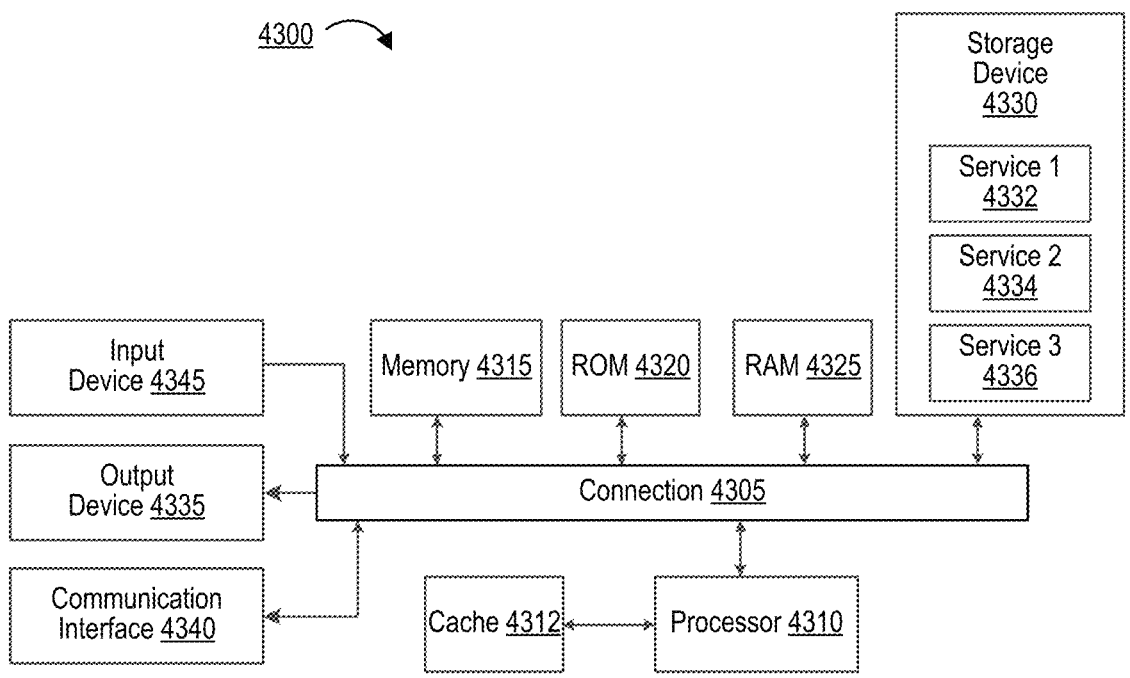
FIG. 43 is a diagram illustrating an example of a computing system for implementing certain aspects described herein.

FIG. 43 is a diagram illustrating an example of a system for implementing certain aspects of the present technology. In particular, FIG. 43 illustrates an example of computing system 4300, which can be for example any computing device making up internal computing system, a remote computing system, a camera, or any component thereof in which the components of the system are in communication with each other using connection 4305. Connection 4305 can be a physical connection using a bus, or a direct connection into processor 4310, such as in a chipset architecture. Connection 4305 can also be a virtual connection, networked connection, or logical connection.

In some embodiments, computing system 4300 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 4300 includes at least one processing unit (CPU or processor) 4310 and connection 4305 that couples various system components including system memory 4315, such as read-only memory (ROM) 4320 and random access memory (RAM) 4325 to processor 4310. Computing system 4300 can include a cache 4312 of high-speed memory connected directly with, in close proximity to, or integrated as part of processor 4310.

Processor 4310 can include any general purpose processor and a hardware service or software service, such as services 4332, 4334, and 4336 stored in storage device 4330, configured to control processor 4310 as well as a special-purpose processor where software instructions are incorporated into the actual processor design. Processor 4310 may essentially be a completely self-contained computing system, containing multiple cores or processors, a bus, memory controller, cache, etc. A multi-core processor may be symmetric or asymmetric.

To enable user interaction, computing system 4300 includes an input device 4345, which can represent any number of input mechanisms, such as a microphone for speech, a touch-sensitive screen for gesture or graphical input, keyboard, mouse, motion input, speech, etc. Computing system 4300 can also include output device 4335, which can be one or more of a number of output mechanisms. In some instances, multimodal systems can enable a user to provide multiple types of input/output to communicate with computing system 4300. Computing system 4300 can include communications interface 4340, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 4340 may also include one or more Global Navigation Satellite System (GNSS) receivers or transceivers that are used to determine a location of the computing system 4300 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 4330 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 4330 can include software services, servers, services, etc., that when the code that defines such software is executed by the processor 4310, it causes the system to perform a function. In some embodiments, a hardware service that performs a particular function can include the software component stored in a computer-readable medium in connection with the necessary hardware components, such as processor 4310, connection 4305, output device 4335, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative aspects of the disclosure include:

Aspect 1. A method for processing image data, the method comprising. obtaining image data; obtaining one or more maps, wherein each map of the one or more maps is associated with a respective image processing function; and generating, using the image data and the one or more maps as input to a machine learning system, a modified image, the modified image including a characteristic based on the respective image processing function associated with each map of the one or more maps.

Aspect 2. The method of Aspect 1, wherein a map of the one or more maps includes a plurality of values and is associated with an image processing function, each value of the plurality of values of the map indicating an amount of the image processing function to apply to a corresponding pixel of the image data.

Aspect 3. The method of any of Aspects 1 to 2, wherein one or more image processing functions associated with the one or more maps include at least one of a noise reduction function, a sharpness adjustment function, a tone adjustment function, a saturation adjustment function, and a hue adjustment function.

Aspect 4. The method of any of Aspects 1 to 3, wherein the one or more maps include a plurality of maps, a first map of the plurality of maps being associated with a first image processing function, and a second map of the plurality of maps being associated with a second image processing function.

Aspect 5. The method of Aspect 4, wherein the first map includes a first plurality of values, each value of the first plurality of values of the first map indicating an amount of the first image processing function to apply to a corresponding pixel of the image data, and wherein the second map includes a second plurality of values, each value of the second plurality of values of the second map indicating an amount of the second image processing function to apply to a corresponding pixel of the image data.

Aspect 6. The method of any one of Aspects 4 to 5, wherein a first image processing function associated with a first map of the plurality of maps includes one of a noise reduction function, a sharpness adjustment function, a tone adjustment function, a saturation adjustment function, and a hue adjustment function, and wherein a second image processing function associated with a second map of the plurality of maps includes a different one of the noise reduction function, the sharpness adjustment function, the tone adjustment function, the saturation adjustment function, and the hue adjustment function.

Aspect 7. The method of any one of Aspects 1 to 6, further comprising. generating the one or more maps using an additional machine learning system that is different than the machine learning system used to generate the modified image.

Aspect 8. The method of any one of Aspects 1 to 7, wherein the image data includes a processed image having a plurality of color components for each pixel of the image data.

Aspect 9. The method of any one of Aspects 1 to 7, wherein the image data includes raw image data from one or more image sensors, the raw image data including a single color component for each pixel of the image data.

Aspect 10. The method of Aspect 9, wherein the raw image data is obtained from the one or more image sensors filtered by a color filter array.

Aspect 11. The method of Aspect 10, wherein the color filter array includes a Bayer color filter array.

Aspect 12. The method of any one of Aspects 1 to 11, wherein the image data includes a patch of image data, the patch of image data including a subset of a frame of image data.

Aspect 13. The method of Aspect 12, wherein generating the modified image includes generating a plurality of patches of output image data, each patch of output image data including a subset of pixels of the output image.

Aspect 14. The method of any one of Aspects 1 to 13, wherein the machine learning system includes at least one neural network.

Aspect 15. An apparatus comprising a memory configured to store image data and a processor implemented in circuitry and configured to perform operations according to any of Aspects 1 to 14.

Aspect 16. The apparatus of Aspect 15, wherein the apparatus is a camera.

Aspect 17. The apparatus of Aspect 15, wherein the apparatus is a mobile device including a camera.

Aspect 18. The apparatus of any one of Aspects 15 to 17, further comprising a display configured to display one or more images.

Aspect 19. The apparatus of any one of Aspects 15 to 18, further comprising a camera configured to capture one or more images.

Aspect 20. A computer-readable storage medium storing instructions that when executed cause one or more processors of a device to perform the methods of any of Aspects 1 to 14.

Aspect 21. An apparatus comprising one or more means for performing operations according to any of Aspects 1 to 14.

Aspect 22. An apparatus for processing image data, the apparatus comprising means for performing operations according to any of Aspects to 1 to 14.

Aspect 23. A computer-readable storage medium storing instructions that, when executed, cause one or more processors to perform operations according to any of Aspects to 1 to 14.

Aspect 24. An apparatus for processing image data, the apparatus comprising: a memory; one or more processors coupled to the memory, the one or more processors configured to. obtain image data; generate, using the image data as input to one or more trained neural networks, one or more maps, wherein each map of the one or more maps is associated with a respective image processing function; generate an image based on the image data and the one or more maps, the image including a characteristic based on the respective image processing function associated with each map of the one or more maps.

Aspect 25. The apparatus of Aspect 24, wherein a map of the one or more maps includes a plurality of values and is associated with an image processing function, each value of the plurality of values of the map indicating a strength with which to apply the image processing function to a corresponding region of the image data.

Aspect 26. The apparatus of Aspect 25, wherein the corresponding region of the image data corresponds to a pixel of the image.

Aspect 27. The apparatus of any of Aspects 24 to 26, wherein the one or more maps include a plurality of maps, a first map of the plurality of maps being associated with a first image processing function, and a second map of the plurality of maps being associated with a second image processing function.

Aspect 28. The apparatus of Aspect 27, wherein one or more image processing functions associated with at least one of the plurality of maps include at least one of a noise reduction function, a sharpness adjustment function, a detail adjustment function, a tone adjustment function, a saturation adjustment function, and a hue adjustment function.

Aspect 29. The apparatus of any one of Aspects 27 to 28, wherein the first map includes a first plurality of values, each value of the first plurality of values of the first map indicating a strength at which to apply the first image processing function to a corresponding region of the image data, and wherein the second map includes a second plurality of values, each value of the second plurality of values of the second map indicating a strength at which to apply the second image processing function to a corresponding region of the image data.

Aspect 30. The apparatus of any of Aspects 24 to 29, wherein the image data includes luminance channel data corresponding to an image, wherein using the image data as input to the one or more trained neural networks includes using the luminance channel data corresponding to the image as input to the one or more trained neural networks.

Aspect 31. The apparatus of Aspect 30, wherein generating the image based on the image data includes generating the image based on the luminance channel data as well as chroma data corresponding to the image.

Aspect 32. The apparatus of any of Aspects 30 to 31, wherein the one or more trained neural networks output one or more affine coefficients based on use of the image data as input to the one or more trained neural networks, wherein generating the one or more maps includes generating a first map at least by transforming the image data using the one or more affine coefficients.

Aspect 33. The apparatus of any of Aspects 30 to 32, wherein the image data includes luminance channel data corresponding to an image, wherein transforming the image data using the one or more affine coefficients includes transforming the luminance channel data using the one or more affine coefficients.

Aspect 34. The apparatus of any of Aspects 30 to 33, wherein the one or more affine coefficients include a multiplier, wherein transforming the image data using the one or more affine coefficients includes multiplying a luminance value of at least a subset of the image data by the multiplier.

Aspect 35. The apparatus of any of Aspects 30 to 34, wherein the one or more affine coefficients include an offset, wherein transforming the image data using the one or more affine coefficients includes offsetting a luminance value of at least a subset of the image data by the offset.

Aspect 36. The apparatus of any of Aspects 30 to 35, wherein the one or more trained neural networks output the one or more affine coefficients based also on a local linearity constraint that aligns one or more gradients in the first map with one or more gradients in the image data.

Aspect 37. The apparatus of any of Aspects 24 to 36, wherein, to generate the image based on the image data and the one or more maps, the one or more processors are configured to use the image data and the one or more maps as inputs to a second set of one or more trained neural networks distinct from the one or more trained neural networks.

Aspect 38. The apparatus of Aspect 37, wherein, to generate the image based on the image data and the one or more maps, the one or more processors are configured to demosaic the image data using the second set of one or more trained neural networks.

Aspect 39. The apparatus of any of Aspects 24 to 38, wherein each map of the one or more maps is spatially varied based on different types of objects depicted in the image data.

Aspect 40. The apparatus of any of Aspects 24 to 39, wherein the image data includes an input image having a plurality of color components for each pixel of a plurality of pixels of the image data.

Aspect 41. The apparatus of any of Aspects 24 to 40, wherein the image data includes raw image data from one or more image sensors, the raw image data including at least one color component for each pixel of a plurality of pixels of the image data.

Aspect 42. The apparatus of any of Aspects 24 to 41, further comprising: an image sensor that captures the image data, wherein obtaining the image data includes obtaining the image data from the image sensor.

Aspect 43. The apparatus of any of Aspects 24 to 42, further comprising: a display screen, wherein the one or more processors are configured to display the image on the display screen.

Aspect 44. The apparatus of any of Aspects 24 to 43, further comprising: a communication transceiver, wherein the one or more processors are configured to transmit the image to a recipient device using the communication transceiver.

Aspect 45. A method for processing image data, the method comprising: obtaining image data; generating, using the image data as input to one or more trained neural networks, one or more maps, wherein each map of the one or more maps is associated with a respective image processing function; generating an image based on the image data and the one or more maps, the image including a characteristic based on the respective image processing function associated with each map of the one or more maps.

Aspect 46. The method of Aspect 45, wherein a map of the one or more maps includes a plurality of values and is associated with an image processing function, each value of the plurality of values of the map indicating a strength with which to apply the image processing function to a corresponding region of the image data.

Aspect 47. The method of Aspect 46, wherein the corresponding region of the image data corresponds to a pixel of the image.

Aspect 48. The method of any of Aspects 45 to 47, wherein the one or more maps include a plurality of maps, a first map of the plurality of maps being associated with a first image processing function, and a second map of the plurality of maps being associated with a second image processing function.

Aspect 49. The method of Aspect 48, wherein one or more image processing functions associated with at least one of the plurality of maps include at least one of a noise reduction function, a sharpness adjustment function, a detail adjustment function, a tone adjustment function, a saturation adjustment function, and a hue adjustment function.

Aspect 50. The method of any of Aspects 48 to 49, wherein the first map includes a first plurality of values, each value of the first plurality of values of the first map indicating a strength at which to apply the first image processing function to a corresponding region of the image data, and wherein the second map includes a second plurality of values, each value of the second plurality of values of the second map indicating a strength at which to apply the second image processing function to a corresponding region of the image data.

Aspect 51. The method of any of Aspects 45 to 50, wherein the image data includes luminance channel data corresponding to an image, wherein using the image data as input to the one or more trained neural networks includes using the luminance channel data corresponding to the image as input to the one or more trained neural networks.

Aspect 52. The method of Aspect 51, wherein generating the image based on the image data includes generating the image based on the luminance channel data as well as chroma data corresponding to the image.

Aspect 53. The method of any of Aspects 45 to 52, wherein the one or more trained neural networks output one or more affine coefficients based on use of the image data as input to the one or more trained neural networks, wherein generating the one or more maps includes generating a first map at least by transforming the image data using the one or more affine coefficients.

Aspect 54. The method of Aspect 53, wherein the image data includes luminance channel data corresponding to an image, wherein transforming the image data using the one or more affine coefficients includes transforming the luminance channel data using the one or more affine coefficients.

Aspect 55. The method of any of Aspects 53 to 54, wherein the one or more affine coefficients include a multiplier, wherein transforming the image data using the one or more affine coefficients includes multiplying a luminance value of at least a subset of the image data by the multiplier.

Aspect 56. The method of any of Aspects 53 to 55, wherein the one or more affine coefficients include an offset, wherein transforming the image data using the one or more affine coefficients includes offsetting a luminance value of at least a subset of the image data by the offset.

Aspect 57. The method of any of Aspects 53 to 56, wherein the one or more trained neural networks output the one or more affine coefficients based also on a local linearity constraint that aligns one or more gradients in the first map with one or more gradients in the image data.

Aspect 58. The method of any of Aspects 45 to 57, wherein generating the image based on the image data and the one or more maps includes using the image data and the one or more maps as inputs to a second set of one or more trained neural networks distinct from the one or more trained neural networks.

Aspect 59. The method of Aspect 58, wherein generating the image based on the image data and the one or more maps includes demosaicking the image data using the second set of one or more trained neural networks.

Aspect 60. The method of any of Aspects 45 to 59, wherein each map of the one or more maps is spatially varied based on different types of objects depicted in the image data.

Aspect 61. The method of any of Aspects 45 to 60, wherein the image data includes an input image having a plurality of color components for each pixel of a plurality of pixels of the image data.

Aspect 62. The method of any of Aspects 45 to 61, wherein the image data includes raw image data from one or more image sensors, the raw image data including at least one color component for each pixel of a plurality of pixels of the image data.

Aspect 63. The method of any of Aspects 45 to 62, wherein obtaining the image data includes obtaining the image data from an image sensor.

Aspect 64. The method of any of Aspects 45 to 63, further comprising: displaying the image on a display screen.

Aspect 65. The method of any of Aspects 45 to 64, further comprising: transmitting the image to a recipient device using a communication transceiver.

Aspect 66. A computer-readable storage medium storing instructions that when executed cause one or more processors of a device to perform the methods of any of Aspects 45 to 64.

Aspect 67. An apparatus comprising one or more means for performing operations according to any of Aspects 45 to 64.

Aspect 68. An apparatus for processing image data, the apparatus comprising means for performing operations according to any of Aspects to 45 to 64.

Aspect 69: A computer-readable storage medium storing instructions that, when executed, cause one or more processors to perform operations according to any of Aspects to 45 to 64.

Aspect 70. An apparatus for processing image data, the apparatus comprising: a memory; one or more processors coupled to the memory, the one or more processors configured to. obtain image data; generate, using the image data as input to a machine learning system, one or more maps, wherein each map of the one or more maps is associated with a respective image processing function; generate an image based on the image data and the one or more maps, the image including a characteristic based on the respective image processing function associated with each map of the one or more maps.

Aspect 71. The apparatus of Aspect 70, wherein a map of the one or more maps includes a plurality of values and is associated with an image processing function, each value of the plurality of values of the map indicating a strength with which to apply the image processing function to a corresponding region of the image data.

Aspect 72. The apparatus of Aspect 71, wherein the corresponding region of the image data corresponds to a pixel of the image.

Aspect 73. The apparatus of any of Aspects 70 to 72, wherein the one or more maps include a plurality of maps, a first map of the plurality of maps being associated with a first image processing function, and a second map of the plurality of maps being associated with a second image processing function.

Aspect 74. The apparatus of Aspect 73, wherein one or more image processing functions associated with at least one of the plurality of maps include at least one of a noise reduction function, a sharpness adjustment function, a detail adjustment function, a tone adjustment function, a saturation adjustment function, and a hue adjustment function.

Aspect 75. The apparatus of any one of Aspects 73 to 74, wherein the first map includes a first plurality of values, each value of the first plurality of values of the first map indicating a strength at which to apply the first image processing function to a corresponding region of the image data, and wherein the second map includes a second plurality of values, each value of the second plurality of values of the second map indicating a strength at which to apply the second image processing function to a corresponding region of the image data.

Aspect 76. The apparatus of any of Aspects 70 to 29, wherein the image data includes luminance channel data corresponding to an image, wherein using the image data as input to the machine learning system includes using the luminance channel data corresponding to the image as input to the machine learning system.

Aspect 77. The apparatus of Aspect 76, wherein generating the image based on the image data includes generating the image based on the luminance channel data as well as chroma data corresponding to the image.

Aspect 78. The apparatus of any of Aspects 76 to 77, wherein the machine learning system output one or more affine coefficients based on use of the image data as input to the machine learning system, wherein generating the one or more maps includes generating a first map at least by transforming the image data using the one or more affine coefficients.

Aspect 79. The apparatus of any of Aspects 76 to 78, wherein the image data includes luminance channel data corresponding to an image, wherein transforming the image data using the one or more affine coefficients includes transforming the luminance channel data using the one or more affine coefficients.

Aspect 80. The apparatus of any of Aspects 76 to 79, wherein the one or more affine coefficients include a multiplier, wherein transforming the image data using the one or more affine coefficients includes multiplying a luminance value of at least a subset of the image data by the multiplier.

Aspect 81. The apparatus of any of Aspects 76 to 80, wherein the one or more affine coefficients include an offset, wherein transforming the image data using the one or more affine coefficients includes offsetting a luminance value of at least a subset of the image data by the offset.

Aspect 82. The apparatus of any of Aspects 76 to 81, wherein the machine learning system output the one or more affine coefficients based also on a local linearity constraint that aligns one or more gradients in the first map with one or more gradients in the image data.

Aspect 83. The apparatus of any of Aspects 70 to 82, wherein, to generate the image based on the image data and the one or more maps, the one or more processors are configured to use the image data and the one or more maps as inputs to a second set of machine learning system distinct from the machine learning system.

Aspect 84. The apparatus of Aspect 83, wherein, to generate the image based on the image data and the one or more maps, the one or more processors are configured to demosaic the image data using the second set of machine learning system.

Aspect 85. The apparatus of any of Aspects 70 to 84, wherein each map of the one or more maps is spatially varied based on different types of objects depicted in the image data.

Aspect 86. The apparatus of any of Aspects 70 to 85, wherein the image data includes an input image having a plurality of color components for each pixel of a plurality of pixels of the image data.

Aspect 87. The apparatus of any of Aspects 70 to 86, wherein the image data includes raw image data from one or more image sensors, the raw image data including at least one color component for each pixel of a plurality of pixels of the image data.

Aspect 88. The apparatus of any of Aspects 70 to 87, further comprising: an image sensor that captures the image data, wherein obtaining the image data includes obtaining the image data from the image sensor.

Aspect 89. The apparatus of any of Aspects 70 to 88, further comprising: a display screen, wherein the one or more processors are configured to display the image on the display screen.

Aspect 90. The apparatus of any of Aspects 70 to 89, further comprising: a communication transceiver, wherein the one or more processors are configured to transmit the image to a recipient device using the communication transceiver.

Aspect 91. A method for processing image data, the method comprising: obtaining image data; generating, using the image data as input to a machine learning system, one or more maps, wherein each map of the one or more maps is associated with a respective image processing function; generating an image based on the image data and the one or more maps, the image including a characteristic based on the respective image processing function associated with each map of the one or more maps.

Aspect 92. The method of Aspect 91, wherein a map of the one or more maps includes a plurality of values and is associated with an image processing function, each value of the plurality of values of the map indicating a strength with which to apply the image processing function to a corresponding region of the image data.

Aspect 93. The method of Aspect 92, wherein the corresponding region of the image data corresponds to a pixel of the image.

Aspect 94. The method of any of Aspects 91 to 93, wherein the one or more maps include a plurality of maps, a first map of the plurality of maps being associated with a first image processing function, and a second map of the plurality of maps being associated with a second image processing function.

Aspect 95. The method of Aspect 94, wherein one or more image processing functions associated with at least one of the plurality of maps include at least one of a noise reduction function, a sharpness adjustment function, a detail adjustment function, a tone adjustment function, a saturation adjustment function, and a hue adjustment function.

Aspect 96. The method of any of Aspects 94 to 95, wherein the first map includes a first plurality of values, each value of the first plurality of values of the first map indicating a strength at which to apply the first image processing function to a corresponding region of the image data, and wherein the second map includes a second plurality of values, each value of the second plurality of values of the second map indicating a strength at which to apply the second image processing function to a corresponding region of the image data.

Aspect 97. The method of any of Aspects 91 to 96, wherein the image data includes luminance channel data corresponding to an image, wherein using the image data as input to the machine learning system includes using the luminance channel data corresponding to the image as input to the machine learning system.

Aspect 98. The method of Aspect 97, wherein generating the image based on the image data includes generating the image based on the luminance channel data as well as chroma data corresponding to the image.

Aspect 99. The method of any of Aspects 91 to 98, wherein the machine learning system output one or more affine coefficients based on use of the image data as input to the machine learning system, wherein generating the one or more maps includes generating a first map at least by transforming the image data using the one or more affine coefficients.

Aspect 100. The method of Aspect 99, wherein the image data includes luminance channel data corresponding to an image, wherein transforming the image data using the one or more affine coefficients includes transforming the luminance channel data using the one or more affine coefficients.

Aspect 101. The method of any of Aspects 99 to 100, wherein the one or more affine coefficients include a multiplier, wherein transforming the image data using the one or more affine coefficients includes multiplying a luminance value of at least a subset of the image data by the multiplier.

Aspect 102. The method of any of Aspects 99 to 101, wherein the one or more affine coefficients include an offset, wherein transforming the image data using the one or more affine coefficients includes offsetting a luminance value of at least a subset of the image data by the offset.

Aspect 103. The method of any of Aspects 99 to 102, wherein the machine learning system output the one or more affine coefficients based also on a local linearity constraint that aligns one or more gradients in the first map with one or more gradients in the image data.

Aspect 104. The method of any of Aspects 91 to 103, wherein generating the image based on the image data and the one or more maps includes using the image data and the one or more maps as inputs to a second set of machine learning system distinct from the machine learning system.

Aspect 105. The method of Aspect 104, wherein generating the image based on the image data and the one or more maps includes demosaicking the image data using the second set of machine learning system.

Aspect 106. The method of any of Aspects 91 to 105, wherein each map of the one or more maps is spatially varied based on different types of objects depicted in the image data.

Aspect 107. The method of any of Aspects 91 to 106, wherein the image data includes an input image having a plurality of color components for each pixel of a plurality of pixels of the image data.

Aspect 108. The method of any of Aspects 91 to 107, wherein the image data includes raw image data from one or more image sensors, the raw image data including at least one color component for each pixel of a plurality of pixels of the image data.

Aspect 109. The method of any of Aspects 91 to 108, wherein obtaining the image data includes obtaining the image data from an image sensor.

Aspect 110. The method of any of Aspects 91 to 109, further comprising: displaying the image on a display screen.

Aspect 111. The method of any of Aspects 91 to 110, further comprising: transmitting the image to a recipient device using a communication transceiver.

Aspect 112. A computer-readable storage medium storing instructions that when executed cause one or more processors of a device to perform the methods of any of Aspects 91 to 111.

Aspect 113. An apparatus comprising one or more means for performing operations according to any of Aspects 91 to 111.

Aspect 114. An apparatus for processing image data, the apparatus comprising means for performing operations according to any of Aspects to 91 to 111.

Aspect 115: A computer-readable storage medium storing instructions that, when executed, cause one or more processors to perform operations according to any of Aspects to 91 to 111.

What is claimed is:

1. An apparatus for processing image data, the apparatus comprising:
   at least one memory; and
   at least one processor coupled to the at least one memory, the at least one processor configured to:
      obtain image data;
      generate, using the image data as input to at least one trained neural network, a plurality of affine coefficients based on use of the image data as input to the at least one trained neural network;
      transform the image data using the plurality of affine coefficients and enforce at least one local linearity constraint to generate at least one map, wherein the at least one map is associated with an image processing function, wherein the at least one local linearity constraint is configured to set a pixel value difference between pixels of a map gradient in the at least one map based on a pixel value difference between pixels of an image gradient in the image data to increase alignment between the map gradient and the image gradient; and
      modify a characteristic of the image data using the image processing function according to the at least one map to generate an image.

2. The apparatus of claim 1, wherein a map of the at least one map includes a plurality of values and is associated with an image processing function, each value of the plurality of values indicating a strength with which to apply the image processing function to a corresponding region of the image data.

3. The apparatus of claim 2, wherein the corresponding region of the image data corresponds to a pixel of the image.

4. The apparatus of claim 1, wherein the at least one map includes a plurality of maps, a first map of the plurality of maps being associated with a first image processing function, and a second map of the plurality of maps being associated with a second image processing function.

5. The apparatus of claim 4, wherein at least one image processing function associated with at least one of the plurality of maps includes at least one of a noise reduction function, a sharpness adjustment function, a detail adjustment function, a tone adjustment function, a saturation adjustment function, or a hue adjustment function.

6. The apparatus of claim 4, wherein the first map includes a first plurality of values, each value of the first plurality of values of the first map indicating a strength at which to apply the first image processing function to a corresponding region of the image data, and wherein the second map includes a second plurality of values, each value of the second plurality of values of the second map indicating a strength at which to apply the second image processing function to a corresponding region of the image data.

7. The apparatus of claim 1, wherein the image data includes luminance channel data corresponding to an image, wherein using the image data as input to the at least one trained neural network includes using the luminance channel data corresponding to the image as input to the at least one trained neural network.

8. The apparatus of claim 7, wherein generating the image based on the image data includes generating the image based on the luminance channel data as well as chroma data corresponding to the image.

9. The apparatus of claim 1, wherein the image data includes luminance channel data corresponding to an image, wherein transforming the image data using the plurality of affine coefficients includes transforming the luminance channel data using the plurality of affine coefficients.

10. The apparatus of claim 1, wherein the plurality of affine coefficients include a multiplier, wherein transforming the image data using the plurality of affine coefficients includes multiplying a luminance value of at least a subset of the image data by the multiplier.

11. The apparatus of claim 1, wherein the plurality of affine coefficients include an offset, wherein transforming the image data using the plurality of affine coefficients includes offsetting a luminance value of at least a subset of the image data by the offset.

12. The apparatus of claim 1, wherein the at least one local linearity constraint is configured to reduce at least one halo effect in the at least one map.

13. The apparatus of claim 1, wherein, to generate the image based on the image data and the at least one map, the at least one processor is configured to use the image data and the at least one map as inputs to at least a second trained neural network distinct from the at least one trained neural network.

14. The apparatus of claim 13, wherein, to generate the image based on the image data and the at least one map, the at least one processor is configured to demosaic the image data using at least the second trained neural network.

15. The apparatus of claim 1, wherein each map of the at least one map is spatially varied based on different types of objects depicted in the image data.

16. The apparatus of claim 1, wherein the image data includes an input image having a plurality of color components for each pixel of a plurality of pixels of the image data.

17. The apparatus of claim 1, wherein the image data includes raw image data from at least one image sensor, the raw image data including at least one color component for each pixel of a plurality of pixels of the image data.

18. The apparatus of claim 1, further comprising:
an image sensor that captures the image data, wherein obtaining the image data includes obtaining the image data from the image sensor.

19. The apparatus of claim 1, further comprising:
a display screen, wherein the at least one processor is configured to display the image on the display screen.

20. The apparatus of claim 1, further comprising:
a communication transceiver, wherein the at least one processor is configured to transmit the image to a recipient device using the communication transceiver.

21. The apparatus of claim 1, wherein at least one edge from the image data is preserved in the at least one map.

22. A method for processing image data, the method comprising:
obtaining image data;
generating, using the image data as input to at least one trained neural network, a plurality of affine coefficients based on use of the image data as input to the at least one trained neural network;
transforming the image data using the plurality of affine coefficients and enforcing at least one local linearity constraint to generate at least one map, wherein the at least one map is associated with an image processing function, wherein the at least one local linearity constraint is configured to set a pixel value difference between pixels of a map gradient in the at least one map based on a pixel value difference between pixels of an image gradient in the image data to increase alignment between the map gradient and the image gradient; and
modifying a characteristic of the image data using the image processing function according to the at least one map to generate an image.

23. The method of claim 22, wherein a map of the at least one map includes a plurality of values and is associated with an image processing function, each value of the plurality of values indicating a strength with which to apply the image processing function to a corresponding region of the image data.

24. The method of claim 22, wherein the at least one map include a plurality of maps, a first map of the plurality of maps being associated with a first image processing function, and a second map of the plurality of maps being associated with a second image processing function.

25. The method of claim 22, wherein the image data includes luminance channel data corresponding to an image, wherein using the image data as input to the at least one trained neural network includes using the luminance channel data corresponding to the image as input to the at least one trained neural network.

26. The method of claim 22, wherein the plurality of affine coefficients include a multiplier, wherein transforming the image data using the plurality of affine coefficients includes multiplying a luminance value of at least a subset of the image data by the multiplier.

27. The method of claim 22, wherein the plurality of affine coefficients include an offset, wherein transforming the image data using the plurality of affine coefficients includes offsetting a luminance value of at least a subset of the image data by the offset.

28. The method of claim 22, wherein generating the image based on the image data and the at least one map includes using the image data and the at least one map as inputs to at least a second trained neural network distinct from the at least one trained neural network.

29. The method of claim 22, wherein each map of the at least one map is spatially varied based on different types of objects depicted in the image data.

30. The method of claim 22, wherein the image data includes luminance channel data corresponding to an image, wherein transforming the image data using the plurality of affine coefficients includes transforming the luminance channel data using the plurality of affine coefficients.

* * * * *